United States Patent
Walker et al.

(10) Patent No.: US 7,039,603 B2
(45) Date of Patent: May 2, 2006

(54) SETTLEMENT SYSTEMS AND METHODS WHEREIN A BUYER TAKES POSSESSION AT A RETAILER OF A PRODUCT PURCHASED USING A COMMUNICATION NETWORK

(75) Inventors: Jay S. Walker, Ridgefield, CT (US); Jonothan Otto, New York, NY (US); Andrew S. Van Luchene, Norwalk, CT (US); Magdalena Mik, Greenwich, CT (US); Daniel E. Tedesco, New Canaan, CT (US); Ian Levitan, Westmount (CA)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/348,566

(22) Filed: Jul. 7, 1999

(65) Prior Publication Data
US 2002/0178071 A1 Nov. 28, 2002

Related U.S. Application Data

(63) Continuation-in-part of application No. 09/337,906, filed on Jun. 22, 1999, now Pat. No. 6,754,636, which is a continuation-in-part of application No. 09/190,744, filed on Nov. 12, 1998, now abandoned, and a continuation of application No. 09/083,345, filed on May 22, 1998, now abandoned, which is a continuation-in-part of application No. 08/889,503, filed on Jul. 8, 1997, now Pat. No. 6,249,772, and a continuation-in-part of application No. 08/889,319, filed on Jul. 8, 1997, now Pat. No. 6,085,169, which is a continuation of application No. 08/707,660, filed on Sep. 4, 1996, now Pat. No. 5,794,207.

(51) Int. Cl.
*G06F 17/60* (2006.01)

(52) U.S. Cl. .............. 705/26; 705/14; 705/20; 705/27; 705/39; 705/75

(58) Field of Classification Search ............ 705/26, 705/27, 44, 8, 9, 10, 37, 21
See application file for complete search history.

(56) References Cited

U.S. PATENT DOCUMENTS

| 3,691,527 A | 9/1972 | Yamamoto |
| 4,237,537 A | 12/1980 | Pitches et al. |
| 4,341,951 A | 7/1982 | Benton |
| 4,554,446 A | 11/1985 | Murphy et al. |
| 4,734,858 A | 3/1988 | Schlafly |

(Continued)

FOREIGN PATENT DOCUMENTS

| CA | 2070736 A1 | 6/1992 |
| CA | 2217739 A1 | 4/1996 |

(Continued)

OTHER PUBLICATIONS

Quinn, Jane Bryant, "New Cars for Less", Newsweek; Oct. 23, 1978; Section: The Columnist; at p. 80.

(Continued)

*Primary Examiner*—Wynn W. Coggins
*Assistant Examiner*—Jaime E. Zurita
(74) *Attorney, Agent, or Firm*—Michael D. Downs

(57) ABSTRACT

Settlement systems and methods are provided wherein a buyer takes possession of a product at a retailer. In one embodiment, a purchasing system arranges through a communication network for a buyer to purchase a product from a seller at a first price. The purchasing system also arranges for the buyer to take possession of the product at a retailer that offers the product for sale at a second price. Payment of an amount based on the first price is received from the buyer, and the purchasing system arranges for the retailer to receive payment of an amount based on a settlement price in exchange for providing the product to the buyer.

97 Claims, 37 Drawing Sheets

U.S. PATENT DOCUMENTS

| | | |
|---|---|---|
| 4,737,910 A | 4/1988 | Kimbrow |
| 4,766,548 A | 8/1988 | Cedrone et al. |
| 4,799,156 A | 1/1989 | Shavit et al. |
| 4,882,675 A | 11/1989 | Nichtberger et al. |
| 4,947,028 A | 8/1990 | Gorog |
| 4,992,940 A | 2/1991 | Dworkin |
| 5,010,485 A | 4/1991 | Bigari |
| 5,064,999 A | 11/1991 | Okamoto et al. |
| 5,117,354 A | 5/1992 | Long et al. |
| 5,176,224 A | 1/1993 | Spector ................... 186/52 |
| 5,191,410 A | 3/1993 | McCalley et al. |
| 5,253,165 A | 10/1993 | Leiseca et al. |
| 5,256,863 A | 10/1993 | Ferguson et al. |
| 5,305,195 A | 4/1994 | Murphy |
| 5,319,542 A | 6/1994 | King, Jr. et al. |
| 5,353,218 A | 10/1994 | De Lapa et al. ............ 364/401 |
| 5,367,452 A | 11/1994 | Gallery et al. |
| 5,434,394 A | 7/1995 | Roach et al. |
| 5,452,344 A | 9/1995 | Larson |
| 5,495,412 A | 2/1996 | Thiessen |
| 5,513,117 A | 4/1996 | Small |
| 5,515,268 A | 5/1996 | Yoda |
| 5,526,257 A | 6/1996 | Lerner |
| 5,537,314 A | 7/1996 | Kanter |
| 5,546,316 A | 8/1996 | Buckley et al. |
| 5,550,746 A | 8/1996 | Jacobs |
| 5,557,721 A | 9/1996 | Fite et al. |
| 5,590,197 A | 12/1996 | Chen et al. |
| 5,592,375 A | 1/1997 | Salmon et al. |
| 5,592,378 A | 1/1997 | Cameron et al. |
| 5,611,051 A | 3/1997 | Pirelli |
| 5,612,527 A | 3/1997 | Ovadia |
| 5,631,724 A | 5/1997 | Sawada et al. |
| 5,637,859 A | 6/1997 | Menoud |
| 5,692,132 A | 11/1997 | Hogan |
| 5,701,252 A | 12/1997 | Facchin et al. |
| 5,708,782 A | 1/1998 | Larson et al. |
| 5,710,886 A | 1/1998 | Christensen et al. |
| 5,710,887 A | 1/1998 | Chelliah et al. |
| 5,713,795 A | 2/1998 | Kohorn ................... 463/17 |
| 5,727,163 A | 3/1998 | Bezos |
| 5,727,164 A | 3/1998 | Kaye et al. |
| 5,734,150 A | 3/1998 | Brown et al. |
| 5,739,512 A | 4/1998 | Tognazzini |
| 5,754,653 A | 5/1998 | Canfield |
| 5,758,328 A | 5/1998 | Giovannoli |
| 5,761,648 A | 6/1998 | Golden et al. |
| 5,768,142 A | 6/1998 | Jacobs ................... 364/479.01 |
| 5,774,870 A | 6/1998 | Storey |
| 5,774,874 A | 6/1998 | Veeneman et al. |
| 5,791,991 A | 8/1998 | Small |
| 5,794,207 A | 8/1998 | Walker et al. ................ 705/23 |
| 5,799,284 A | 8/1998 | Bourquin |
| 5,806,044 A | 9/1998 | Powell |
| 5,809,144 A | 9/1998 | Sirbu et al. |
| 5,816,918 A | 10/1998 | Kelly et al. ................... 463/16 |
| 5,822,736 A | 10/1998 | Hartman et al. |
| 5,832,457 A | 11/1998 | O'Brien et al. |
| 5,842,178 A | 11/1998 | Giovannoli |
| 5,845,259 A | 12/1998 | West et al. |
| 5,845,265 A * | 12/1998 | Woolston ................... 705/37 |
| 5,848,399 A | 12/1998 | Burke |
| 5,855,007 A | 12/1998 | Jovicic et al. |
| 5,857,175 A | 1/1999 | Day et al. |
| 5,864,604 A | 1/1999 | Moen et al. |
| 5,870,716 A | 2/1999 | Sugiyama et al. |
| 5,870,717 A | 2/1999 | Wiecha |
| 5,870,719 A | 2/1999 | Maritzen et al. |
| 5,875,110 A | 2/1999 | Jacobs |
| 5,878,139 A | 3/1999 | Rosen |
| 5,878,401 A | 3/1999 | Joseph |
| 5,883,810 A | 3/1999 | Franklin et al. |
| 5,887,271 A | 3/1999 | Powell |
| 5,890,136 A | 3/1999 | Kipp |
| 5,907,830 A | 5/1999 | Engel et al. |
| 5,923,016 A | 7/1999 | Fredregill et al. |
| 5,924,078 A | 7/1999 | Naftzger |
| 5,924,080 A | 7/1999 | Johnson |
| 5,924,082 A | 7/1999 | Silverman et al. ............ 705/37 |
| 5,963,939 A | 10/1999 | McCann et al. |
| 5,970,469 A * | 10/1999 | Scroggie et al. ............. 705/14 |
| 5,988,346 A | 11/1999 | Tedesco et al. |
| 6,014,634 A | 1/2000 | Scroggie et al. |
| 6,035,284 A | 3/2000 | Straub et al. |
| 6,038,551 A | 3/2000 | Barlow et al. |
| 6,058,373 A | 5/2000 | Blinn et al. ................... 705/26 |
| 6,058,375 A | 5/2000 | Park |
| 6,061,660 A | 5/2000 | Eggleston et al. ............ 705/14 |
| 6,073,840 A | 6/2000 | Marion |
| 6,085,168 A | 7/2000 | Mori et al. |
| 6,119,099 A | 9/2000 | Walker et al. |
| 6,131,085 A | 10/2000 | Rossides ................... 705/1 |
| 6,134,534 A | 10/2000 | Walker et al. |
| 6,167,382 A | 12/2000 | Sparks et al. ................ 705/26 |
| 6,192,349 B1 | 2/2001 | Husemann et al. |
| 6,193,154 B1 | 2/2001 | Phillips et al. |
| 6,193,155 B1 | 2/2001 | Walker et al. |
| 6,199,014 B1 | 3/2001 | Walker et al. |
| 6,205,435 B1 | 3/2001 | Biffar |
| 6,236,971 B1 | 5/2001 | Stefik et al. |
| 6,247,047 B1 | 6/2001 | Wolff ................... 709/219 |
| 6,249,772 B1 | 6/2001 | Walker et al. |
| 6,260,024 B1 | 7/2001 | Shkedy |
| 6,266,651 B1 | 7/2001 | Woolston |
| 6,330,544 B1 | 12/2001 | Walker et al. |
| 6,370,513 B1 | 4/2002 | Kolawa et al. |
| 6,460,036 B1 * | 10/2002 | Herz ................... 707/10 |
| 6,512,570 B1 | 1/2003 | Garfinkle et al. ............. 355/40 |

FOREIGN PATENT DOCUMENTS

| | | |
|---|---|---|
| EP | 0 779 587 A2 | 9/1996 |
| EP | 0 779 587 A3 | 9/1996 |
| EP | 0 817 138 A1 | 1/1998 |
| JP | 08137951 | 5/1996 |
| JP | 10187820 | 7/1998 |
| JP | 10214284 | 8/1998 |
| JP | 10240830 | 9/1998 |
| JP | 10269049 | 10/1998 |
| JP | 11088560 A | 3/1999 |
| WO | WO 96/32701 | 10/1996 |
| WO | WO 97/16797 | 5/1997 |
| WO | WO 97/16897 | 5/1997 |
| WO | WO 97/21200 | 6/1997 |
| WO | WO 97/23838 | 7/1997 |
| WO | WO 9735441 | 9/1997 |
| WO | WO 97/44749 | 11/1997 |
| WO | WO 98/06050 | 2/1998 |
| WO | WO 98/15907 | 4/1998 |
| WO | WO 98/19260 | 5/1998 |
| WO | WO 98/21713 | 5/1998 |
| WO | WO 98/48388 | 10/1998 |
| WO | WO 98/48563 | 10/1998 |
| WO | WO 98/49658 | 11/1998 |
| WO | WO 99/04326 | 1/1999 |
| WO | WO 99/07121 | 2/1999 |
| WO | WO 99/09508 | 2/1999 |

OTHER PUBLICATIONS

Hilts, Paul, "Technology meets commerce; electronic publishing; includes articles on the World Wide Web and the annual Military Book Show; ABA '96", Publishers Weekly, Section: vol. 243; No. 28; p. 43; ISSN: 0000–0019; Jul. 8, 1996.

"About CyberSlice", (http://www.cyberslice.com/cgi–bin/WebObjects/CyberSlice:2@httpserv01/), download date: May 6, 1997.

"My Auto Broker—Online Auto Broker", (http://www.adverlink.com/myautobroker/), download date: May 28, 1997.

"PriceWatch", (http://icon.co.za/–robo/prod01.htm), download date: Jun. 9, 1997.

"Reaching out in new directions—introducing U$A Value Exchange", First Data Corp. Merchant Services, Brochure.

PCT International Search Report for Application No. PCT/US 97/13588, dated Dec. 4, 1997.

Anthony Joseph, "Baby the engine, and other saving tips", The Christian Science Monitor, Nov. 4, 1986; Section: Autos '87 Pullout; p. B10.

"Six vendors sign on for early electronic commerce venture", Phillips Business Information, Inc. Voice Technology News, Dec. 13, 1994; No. 25, vol. 6; ISSN: 1045–1498.

"Coupons & more", welcome to coolsavings.com—Copyright 1996–1999. (http://208.134.230.42/cgi–win/temp-prs.exe/first.htm).

Judith Evans, "Who was that masked Cybershopper?; MasterCard–Visa Agreement on Credit Card Security May Make ON–LINE Commerce Fly", The Washington Post, View Related Topics; Feb. 2, 1996, Final Edition; Section: Financial; p. F01.

"First Virtual Holdings Releases Beta Software for Server Transactions on Microsoft Merchant Server", PR Newswire, Mar. 31, 1997; Section: Finacial News.

"The easy, pain–free way to buy or lease your next car", What is autoseek; (http://www.autoseek.com/#what) download date: May 28, 1997.

Nora Lockwood Tooher, "Macy's new gift card gets trial run in Warwick", The Providence Journal–Bulletin; Oct. 1, 1998; Section: Business, p. 1E.

Denise Caruso, "Digital Commerce the boom in on–line shopping adds a twist to the old quandary of how to tax interstate purchases", The New York Times, View Related Topics, Dec. 28, 1998; Late Edition—Final; Section: C; p. 3; col. 5; Business/Financial Desk.

James Fallon, "Safeway puts ordering into Customers'palms", Executive Technology, Jan. 1999.

"A personal shopping organizer for the web savvy consumer. My KillerApp offers a personalized shopping experience to meet the unique needs of every individual user". (http://www.killerapp.com/html/main/pr0004.html).

"SaveSmart—How saveSmart Works for Consumers"; (http://savesmart.com/consumer/consumer–howitworks.html), download date: Jan. 17, 1999.

"WebVoucher", (www.pinex.co.uk/webvoucher/), download date: Mar. 14, 1999.

"Welcome to Planet U, providers of U–pons—Internet Coupons"; (http://www.planetu.com/), download date: Mar. 16, 1999.

"Webcerificate, the perfect gift–giving solution . . . It's quick! It's Easy! It's Secure!"; (http://www.webcertificate.com:443/webcert/faq–detail.asp), download date: May 20, 1999.

"Kmart expands inventory via in–store kiosks", Jun. 20, 1999, RT*News*; (www.retailtech.com).

David Lazarus, "E–Commerce, Japanese style", Wired online page, Jun. 7, 1999.

"Mercata—Group Buying Power"; (http://www.mercata.com/cgi–bin/mercata/mercata/v1/pages/home.jsp), download date: Jun. 7, 1999.

"Wal–Mart vs. Amazon: The fight begins", Yahoo News, Jun. 9, 1999.

"Circuit City to Integrate E–Commerce with store shopping; retailer's E–superstore–www.circuitcity.com– to open in Jul.", PR Newswire, Jun. 15, 1999; Section: Financial News.

James Frederick, "Walgreens gears for opening of its own Internet pharmacy", Drug Store News, Chain Pharmacy, A Lebhar–Friedman Publication, Jul. 19, 1999.

Shop the Marketplace, 1–800–flowers.com; (http://www.1800flowers.com/flowers/welcome.asp), download date: Aug. 3, 1999.

"The Leader in Internet Shopping Systems for Supermarkets and Drug Stores", groceries online. Copyright 1996 Groceries Online, Inc. (http://www.groceries–online.com/), download date: Aug. 3, 1999.

"Internet Wine Gift Company Offers Answer to Recent Legislation", Yahoo!.FINANCE, *PRNewswire*, Company Press Release; Aug. 11, 1999.

Shea, Barbara, "Read Fine Print When Comparing Car Rentals", St. Louis Post–Dispatch, Feb. 9, 1997, Section: Travel & Leisure, p. 04T.

Website: "United Buying Services", (http www inform umd edu/muc/clubinfo/ubs html), download date: Apr. 15, 2003.

Naik, Gautam, "In Digital Dorm, Click on Return for Soda", The Wall Street Journal Online, undated.

"Brother Industries is pushing ahead with its new PC software vending machine operation in a bid to boost revenues in the filed to 10 billion yen by 1995", IDC Japan Report, Aug. 30, 1991, Section: vol. 17, p. 53.

"FAQ: CSH Coke Machine Information", FAQ, May 23, 1994, vol. 1.2, (http //www cs uu nl/wais/html/na–dir/csh–coke–machine–info html).

Maras, Elliot, "1995: downsizing adds costs; new strategies sought", Automatic Merchandiser, Aug. 1996, pp. 20–22, 24, 26, 28, 30, 32, 34, 36, 38, 40, 44, Section: State of the Industry Report.

Website: "Computer Science House Projects: Drink Machine", (http //www csh rit edu/proj/drink html), download date: Jan. 29, 1998.

Desjardins, Doug, "Hollywood's investment in online video retailer gets mixed reviews", Video Store, Aug. 9, 1998, vol. 20, No. 32, p. 1+, ISSN: 0195–1750.

Godwin, Nadine, "New software was key lure in $17 million agency buyout.", Travel Weekly, Nov. 26, 1984, Section: vol. 43, p. 45, ISSN: 0041–2082.

Tellis, Gerad J., "Beyond the Many Faces of Price: An Integration of Pricing Strategies", Journal of Marketing, Oct. 1986, pp. 146–160.

Kuttner, Robert, "Computers May Turn the World into One Big commodities Pit.", Business Week, Sep. 11, 1989, Section: Economic Viewpoint, No. 3123, p. 17.

Del Rosso, Laura, "Firm proposes ticket–bidding system; Marketel explores electronic auction of travel; Marketel International", Travel Weekly, Nov. 13, 1989, Section: No. 91, vol. 48, p. 1, ISSN: 0041–2082.

Weatherford, Lawrence R. and Bodily, Samuel E., "A Taxonomy and Research Overview of Perishable–Asset Revenue Management: Yield Management, Overbooking, and Pricing", Operations Research, Sep.–Oct. 1992, vol. 40, No. 5, pp. 831–844.

Spencer, Milton H. and Amos, Jr., Orley M., "Contemporary Economics, Eight Edition", Worth Publishers, Copyright 1993.

Rajendran, K.N. and Tellis, Gerard J., "Contextual and Temporal Components of Reference Price", Journal of Marketing, Jan. 1994, pp. 22–34.

Bronnenberg, Bart J., "Limited Choice Sets, Local Price Response, and Implied Measures of Price Competition", Journal of Marketing Research, Spring 1996, Section: vol. XXXIII, p. 163.

Adyanthaya, Surain, "Revenue Management: the Black Art." Interavia Business & Technology, Sep. 1998, Section: No. 623, vol. 53, p. 43, ISSN: 0983–1592.

Woolley, Scott, "I got it cheaper than you", Forbes, Nov. 2, 1998, Section: Management, Strategies, Trends, p. 82.

Press Release, "Priceline.com Delivers Savings For Flexible Travelers In Side–By–Side Price Compairson", Priceline.com, Stamford, CT, May 28, 1999.

Website: "Pricing, The Professional Pricing Society Conference Agenda", (http // www pricing–advisor com/conf_agn htm), download date: Jun. 19, 1999.

Odlyzko, Andrew, "The Bumpy Road of Electronic Commerce", (http //aace Virginia edu/aace/conf/webnet/html/ao htm), download date: Jul. 1, 1999.

Website: "DealTime com: The Ultimate Online Shopping Service", (http www dealtime com/about/aboutbodyhome asp?B=dealtime&AID=0), download date: Oct. 20, 1999.

Kephart, Jeff, "Price Dynamics of Vertically; Introduction", (http //www research ibm com/infoecon . . . ), download date: Nov. 11, 1999.

Website: "Frictionless Commerce Incorporated: Solutions", (http www frictionless com/solutions html), download date: Nov. 11, 1999.

Office Action for Application Serial No. 09/348,566, Examiner James Zurita, mailed Oct. 1, 2003, pp. 3–5.

* cited by examiner

| PRODUCT IDENTIFIER 702 | MINIMUM ACCEPTABLE PRICE 704 | SELLER IDENTIFIER 706 | RETAILER IDENTTIFIER 708 |
|---|---|---|---|
| P132-01 | $110 | S13204 | R771-41; R993-03; R218-99; R982-19 |
| P132-01 | $190 | S40290 | R753-93 |
| P098-75 | $250 | S80513 | R679-99; R103-33; R218-99; R628-41 |
| P195-33 | $95 | S80513 | R679-99; R107-45; R091-10 |

FIG. 7

| PRODUCT IDENTIFIER 802 | SUBSIDY AMOUNT 804 | SELLER IDENTIFIER 806 |
|---|---|---|
| P132-01 | $50 | S13204 |
| P098-75 | $50 | S12340 |
| P195-33 | $30 | S80513 |
| P713-05 | $75 | S23456 |
| P042-19 | $70 | S45678 |
| P911-44 | $25 | S67890 |
| P555-02 | $10 | S23456 |

FIG. 8

| PRODUCT IDENTIFIER 902 | RETAILER IDENTIFIER 904 | SETTLEMENT PRICE 906 |
|---|---|---|
| P132-01 | R218-99 | $150 |
| P132-01 | R982-19 | $145 |
| P132-01 | R084-34 | $160 |
| P132-01 | R753-93 | $150 |
| P098-75 | R218-99 | $300 |
| P098-75 | R075-15 | $300 |
| P195-33 | R873-93 | $125 |

| RETAILER IDENTIFIER 1102 | RETAILER NAME 1104 | RETAILER TYPE 1106 | RETAILER ADDRESS 1108 |
|---|---|---|---|
| R031-29 | WALMAK STORE #1920 | SINGLE STORE | 10 SOUTH ST. NEW TOWN, USA |
| R192-05 | SIRCUIT CITY STORE #8132 | SINGLE STORE | 2930 HIGH BLVD. CITYVILLE, USA |
| R302-11 | JOE'S ELECTRONICS | SINGLE STORE | 89 COUNTRY LN. PORT SHIP, USA |
| R718-93 | WALMAK STORE #2311 | SINGLE STORE | 357 LONG HWY. METROPOLIS, USA |
| R012-39 | SEERS | ALL STORES | N/A |

FIG. 11

| SELLER IDENTIFIER 1202 | SELLER NAME 1204 | SELLER TYPE 1206 | SELLER ADDRESS 1208 |
|---|---|---|---|
| S12345 | WALMAK | RETAILER | E-MAIL |
| S23456 | SONI | MANUFACTURER | HTTP |
| S34567 | PANATRONIC | MANUFACTURER | CITY +STATE |
| S45678 | AIWER | MANUFACTURER | FILEPATH |
| S56789 | WALMAK STORE #892 | RETAILER | E-MAIL |
| S67890 | TOHIBA | MANUFACTURER | E-MAIL |

FIG. 12

| AUTHORIZED RETAILER IDENTIFIER 1316 | REDEMPTION RETAILER IDENTIFIER 1317 | PRODUCT IDENTIFIER 1318 | AUTHORIZED AMOUNT 1320 | CHARGED AMOUNT 1322 | PAYMENT IDENTIFIER 1324 |
|---|---|---|---|---|---|
| N/A | N/A | P098-75 | N/A | N/A | 2222-3333-4444-5555 |
| R031-29; R192-05; R302-11 | R192-05 | P909-09 | $220 | N/A | 3333-4444-5555-6666 |
| R031-29; R718-93 | R031-29 | P201-45 | $330 | $319.50 | 4444-555-6666-7777 |
| R192-05; R302-11; R012-39 | R012-39 | P444-04 | $110 | $105 | 5555-6666-7777-8888 |

| RETAILER IDENTIFIER 1402 | TOTAL PAID BY, TO DATE 1404 | TOTAL PAID TO, TO DATE 1406 | CURRENT AMOUNT OWED BY 1408 | CURRENT AMOUNT DUE TO 1410 | LAST BILLING DATE 1412 |
|---|---|---|---|---|---|
| R031-29 | $89,700 | $934,930 | $450 | $4,925 | 4/15/99 |
| R192-05 | $53,250 | $723,900 | $367 | $4,150 | 4/15/99 |
| R302-11 | $28,973 | $400,340 | $890 | $10,500 | 4/15/99 |

FIG. 14

| SELLER IDENTIFIER 1502 | TOTAL PAID BY, TO DATE 1504 | TOTAL PAID TO, TO DATE 1506 | CURRENT AMOUNT OWED BY 1508 | CURRENT AMOUNT DUE TO 1510 | LAST BILLING DATE 1512 |
|---|---|---|---|---|---|
| S12345 | $319,750 | $30,900 | $10,900 | $2,100 | 4/15/99 |
| S23456 | $567,890 | $55,670 | $69,450 | $7,300 | 4/15/99 |
| S34567 | $650,025 | $65,900 | $32,700 | $2,560 | 4/15/99 |

FIG. 15

| PRODUCT IDENTIFIER 1602 | RETAIL PRICE 1604 | SETTLEMENT PRICE 1606 |
|---|---|---|
| P304-44 | $220 | $200 |
| P089-55 | $270 | $250 |
| P999-99 | $75 | $75 |
| P133-44 | $180 | $175 |
| P132-01 | $160 | $150 |
| P195-33 | $130 | $125 |

| OFFER CODE 1701 | REDEMPTION CODE 1702 | PRODUCT IDENTIFIER 1704 | BUYER'S PRICE 1706 | STATUS 1708 |
|---|---|---|---|---|
| O321-213 | 1876-3290-0187 | P404-99 | $200 | PENDING |
| O977-123 | 1111-2222-3333-4444 | P555-11 | $350 | REDEEMED |
| O413-321 | 7401-3872-0283 | P707-33 | $150 | REDEEMED |
| O091-112 | 5362-9102-6251 | P732-44 | $200 | REDEEMED |
| O769-063 | 3427-1902-8172 | P320-82 | $125 | PENDING |

FIG. 17

| RETAILER TRANSACTION IDENTIFIER 1802 | REDEMPTION IDENTIFIER 1804 | PRODUCT IDENTIFIER 1806 | EXPECTED PAYMENT 1808 | PAYMENT STATUS 1810 |
|---|---|---|---|---|
| TR-000-333-111 | 2418-0011-5555 | P404-99 | $200 | RECEIVED |
| TR-111-222-333 | P555-11 | $350 | REDEEMED | REDEEMED |
| TR-666-777-888 | P707-33 | $150 | REDEEMED | REDEEMED |

FIG. 18

| PRODUCT IDENTIFIER 1902 | SUBSIDY AMOUNT 1904 | QUANTITY SOLD 1906 |
|---|---|---|
| P132-01 | $50 | 1,730 |
| P098-75 | $60 | 4,235 |
| P195-33 | $25 | 708 |
| P713-05 | $10 | 410 |
| P042-19 | $30 | 2,175 |

| ISSUER IDENTIFIER 2002 | ISSUER NAME 2004 | ISSUER ADDRESS 2006 |
|---|---|---|
| 5555 | CITIRANK | FILEPATH |
| 3333 | MBRA | FILEPATH |
| 2222 | NABANKO | FILEPATH |
| 9999 | FIRST EBA | FILEPATH |
| 1111 | CENTRAL SYSTEM | FILEPATH |

| ISSUER IDENTIFIER 2102 | AMOUNT OWED 2104 | PAYMENT DUE DATE 2106 |
|---|---|---|
| 5555 | $30,900 | 5/15/99 |
| 3333 | $23,750 | 5/15/99 |
| 2222 | $43,900 | 5/15/99 |
| 9999 | $75,070 | 5/15/99 |
| 1111 | $46,345 | 5/15/99 |

FIG. 21

| RETAILER IDENTIFIER 2202 | ISSUER IDENTIFIER 2204 | AMOUNT DUE 2206 | ISSUER IDENTIFIER 2208 | AMOUNT DUE 2210 |
|---|---|---|---|---|
| R031-29 | 5555 | $10,000 | 1111 | $10,345 |
| R192-05 | 3333 | $23,750 | 5555 | $20,900 |
| R302-11 | 1111 | $16,000 | 9999 | $50,020 |
| R718-93 | 9999 | $25,050 | 1111 | $10,000 |
| R012-39 | 2222 | $43,900 | 1111 | $10,000 |

FIG. 22

| THIRD PARTY SUBSIDY IDENTFIER 2302 | THIRD PARTY SUBSIDY DESCRIPTION 2304 | THIRD PARTY SUBSIDY AMOUNT 2306 | THIRD PARTY IDENTIFIER 2308 |
|---|---|---|---|
| A33-11 | APPLY FOR MBRA GOLD CARD | $20 | 1672 |
| A33-12 | 6-MONTH SUBSCRIPTION TO SCIENCE MAGAZINE | $10 | 4523 |
| A33-13 | OPEN ACCOUNT WITH E-BARTER | $30 | 7839 |

| THIRD PARTY IDENTIFIER 2402 | THIRD PARTY ADDRESS 2404 | AMOUNT DUE FROM THIRD PARTY 2406 |
|---|---|---|
| 1672 | FILEPATH | $14,900 |
| 4523 | E-MAIL | $23,500 |
| 7839 | CITY + STATE | $17,800 |

FIG. 24

SETTLEMENT SYSTEMS AND METHODS WHEREIN A BUYER TAKES POSSESSION AT A RETAILER OF A PRODUCT PURCHASED USING A COMMUNICATION NETWORK

CROSS-REFERENCE TO RELATED APPLICATIONS

The present application is a continuation-in-part of U.S. patent application Ser. No. 09/337,906 filed Jun. 22, 1999 and entitled "Purchasing Systems and Methods Wherein a Buyer Takes Possession at a Retailer of a Product Purchased Using a Communication Network", which issued as U.S. Pat. No. 6,754,636 B1 on Jun. 22, 2004; which is a continuation-in-part of U.S. patent applications Ser. No. 08/889,503 filed Jul. 8, 1997 and entitled "System and Process for Local Acquisition of Products Priced Online", which issued as U.S. Pat. No. 6,249,772 Jun. 19, 2001; Ser. No. 08/889,319 filed Jul. 8, 1997 and entitled "Conditional Purchase Offer Management System", which issued as U.S. Pat. No. 6,085,169 on Jul. 4, 2000; now abandoned Ser. No. 09/190,744 filed Nov. 2, 1998 and entitled "Method and Apparatus for A Cryptographically Assisted Commercial Network System Designed to Facilitate Buyer-Driven Conditional Purchase Offers", which is a continuation of Ser. No. 08/707,660 now U.S. Pat. No. 5,794,207, filed Sep. 4, 1996; and now abandoned Ser. No. 09/083,345 filed May 22, 1998 and entitled "Method and Apparatus for Managing Remote Vending Machine Transactions". The entire contents of these applications are hereby incorporated by reference.

The present application is also related to the subject matter of now abandoned U.S. patent applications Ser. No. 08/943,483 filed Oct. 3, 1997 and entitled "System and Method for Facilitating Acceptance of Conditional Purchase Offers"; now abandoned Ser. No. 08/858,738 filed May 19, 1997 and entitled "System and Process for Issuing and Managing Forced Redemption Vouchers Having Alias Account Numbers"; and Ser. No. 08/997,680 filed Dec. 23, 1997 and entitled "Method and Apparatus for Issuing and Managing Gift Certificates", which issued as U.S. Pat. No 6,193,115 on Feb. 27, 2001. The entire contents of these applications are hereby incorporated by reference.

FIELD OF THE INVENTION

The present invention relates to the sale of products. In particular, the present invention relates to settlement systems and methods wherein a buyer takes possession at a retailer of a product purchased using a communication network.

BACKGROUND OF THE INVENTION

Typically, a buyer visits one or more retailers to shop for a product. When the buyer finds the product he or she is looking for, at a reasonable price, the buyer purchases the product from the retailer. This traditional method of providing products to buyers, however, may require that the buyer visit a number of retailers to determine what should be considered a reasonable price for the product.

Moreover, the traditional method of selling a product to a buyer requires that a retailer attract buyers, such as by spending money on advertising. For example, when a new retail store opens for business, many buyers will not know what products the store sells. In addition, traditional methods do not let a product manufacturer establish a pricing relationship directly with buyers when the product is provided to buyers through one or more retailers. For example, a manufacturer may sell a product to a retailer (perhaps through a distributor) that ultimately decides the price at which the product is sold to buyers.

Recently, products have been sold to buyers through communication networks, such as with online transactions completed through the Internet. Internet sales have been growing steadily over the past few years, and are expected to continue increasing because buyers are attracted to the ease and convenience of shopping online. For example, a buyer can shop online from the comfort of home at any time of day or night.

Another advantage of online shopping is that pricing comparisons are less time consuming. For example, a Web service can compile prices from various sources (e.g., Web merchants and/or retail stores that are not online) for various products. This lets a buyer easily find and select, for example, a retail store that offers the lowest price for a product. Although this will save a buyer time, only regular retail prices (which the buyer would eventually be able to find without the Web site) are typically reported—without providing any other pricing advantage. As price information becomes more accessible, buyers are growing more price sensitive and demand that products be sold at lower prices.

Having a product shipped to a buyer, which is the conventional mode of delivering a product purchased online, presents several drawbacks. For example, many buyers are not home during the day and cannot sign for, or otherwise arrange to receive, the product from a delivery service. In addition, the shipping service itself presents an additional cost that, depending on the product, may offset any savings made possible by shopping online. Finally, some products simply cannot be delivered at all, such as a service provided to buyers.

With respect to a buyer, another disadvantage of online shopping is the delay involved with receiving a product. The online shopping community has not effectively captured the impulsive and impatient buyer market, because a buyer is more likely to impulsively purchase a product when he or she can take immediate possession (instead of waiting several days for delivery). In other words, a buyer who wants a product immediately is likely to visit a retailer and not buy the product online.

With respect to retail stores that are not online, online shopping presents additional problems. For example, the store is typically left completely out of any online shopping transaction. In addition to losing the potential profit from the sale of the product itself, the store loses any chance of selling the buyer additional items during a visit, such as peripherals for the product or even unrelated items that attract the buyer's attention while he or she is in the store. This would still be a problem even if the store invested the time and money required to establish an online shopping service. Moreover, the store's online service may simply shift sales that would have otherwise occurred at the actual store (as opposed to attracting new buyers).

With respect to manufacturers, the availability of online shopping does little to solve the problem of establishing a pricing relationship directly with buyers. Some manufacturers have attempted to establish such a relationship by establishing an online shopping service. However, manufacturers that establish such a service compete directly with their retailer's traditional distribution channel and therefore risk alienating retailers that also sell the manufacturer's product. Additionally, establishing such a service requires a manufacturer to take on additional cost and responsibility in attracting and servicing customers directly.

In U.S. patent application Ser. No. 09/337,906 filed Jun. 22, 1999 and entitled "Purchasing Systems and Methods Wherein a Buyer Takes Possession at a Retailer of a Product Purchased Using a Communication Network", applicants disclose methods and systems wherein a purchasing system solves many of the problems discussed above. However, when a buyer purchases a product using such a purchasing system, a need exists for further systems and methods to distribute payments, or "settle," between, for example, the purchasing system, the buyer, the seller and the retailer.

SUMMARY OF THE INVENTION

To alleviate the problems inherent in the prior art and to facilitate the distribution of payments when a buyer purchases a product using a purchasing system, the present invention introduces settlement systems and methods wherein a buyer takes possession at a retailer of a product purchased using a communication network.

In one embodiment of the present invention, a purchasing system arranges through a communication network for a buyer to purchase a product from a seller at a first price. The purchasing system also arranges for the buyer to take possession of the product at a retailer that offers the product for sale at a second price. Payment of an amount based on the first price is received from the buyer, and the purchasing system arranges for the retailer to receive payment of an amount based on a settlement price in exchange for providing the product to the buyer.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 7 is a tabular representation of a portion of a product database according to an embodiment of the present invention.

FIG. 8 is a tabular representation of a portion of a subsidy database according to an embodiment of the present invention.

FIG. 9 is a tabular representation of a portion of a settlement price database according to an embodiment of the present invention.

FIG. 11 is a tabular representation of a portion of a retailer database according to an embodiment of the present invention.

FIG. 12 is a tabular representation of a portion of a seller database according to an embodiment of the present invention.

FIGS. 13A and 13B are a tabular representation of a portion of an accepted offer database stored at a purchasing system device according to an embodiment of the present invention.

FIG. 14 is a tabular representation of a portion of a retailer account database stored at a purchasing system device according to an embodiment of the present invention.

FIG. 15 is a tabular representation of a portion of a seller account database according to an embodiment of the present invention.

FIG. 16 is a tabular representation of a portion of a pricing database according to an embodiment of the present invention.

FIG. 17 is a tabular representation of a portion of an accepted offer database stored at a retailer device according to an embodiment of the present invention.

FIG. 18 is a tabular representation of a portion of a purchasing system account database according to an embodiment of the present invention.

FIG. 19 is a tabular representation of a portion of a seller product database according to an embodiment of the present invention.

FIG. 20 is a tabular representation of a portion of an issuer database according to an embodiment of the present invention.

FIG. 21 is a tabular representation of a portion of an issuer account database according to an embodiment of the present invention.

FIG. 22 is a tabular representation of a portion of a retailer account database stored at a credit card processing system device according to an embodiment of the present invention.

FIG. 23 is a tabular representation of a portion of a third party subsidy database according to an embodiment of the present invention.

FIG. 24 is a tabular representation of a portion of a third party account database according to an embodiment of the present invention.

DETAILED DESCRIPTION OF THE INVENTION

The present invention is directed to settlement systems and methods wherein a buyer takes possession of a product at a retailer. Turning now in detail to the drawings, FIGS. 1A to 1C are block diagrams illustrating the distribution of payments according to embodiments of the present invention.

Figure 1A:
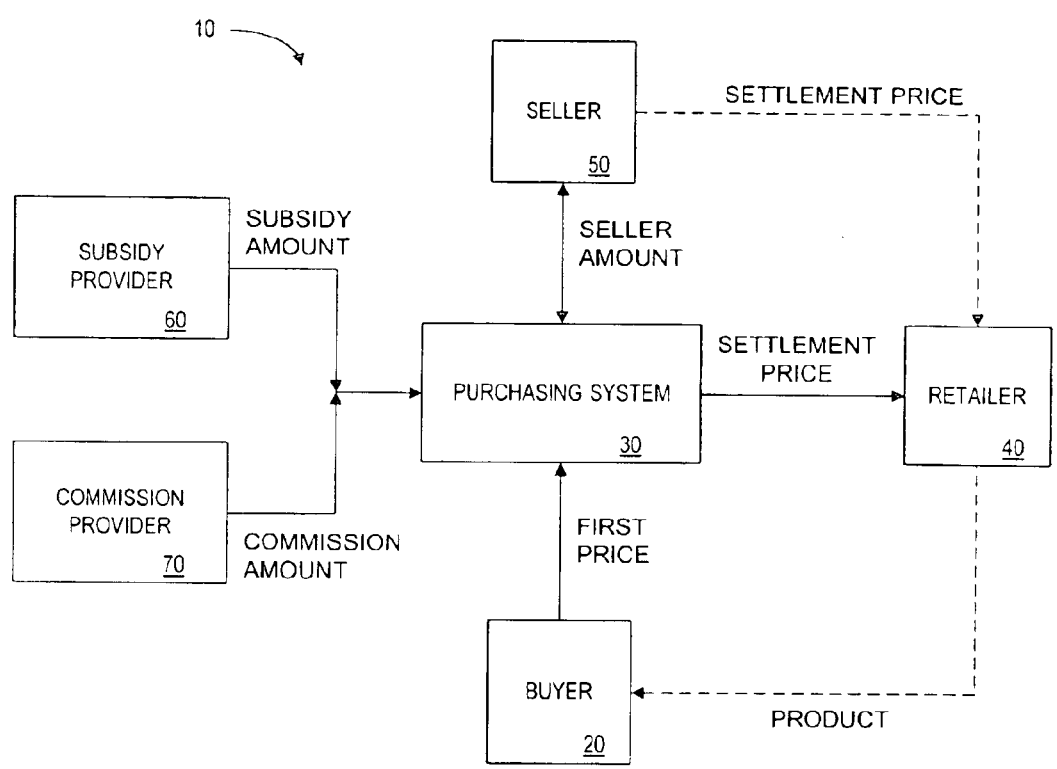
FIGS. 1A to 1C are block diagrams illustrating the distribution of payments between a purchasing system, a buyer, a seller and a retailer according to embodiments of the present invention.
Figure 1B:
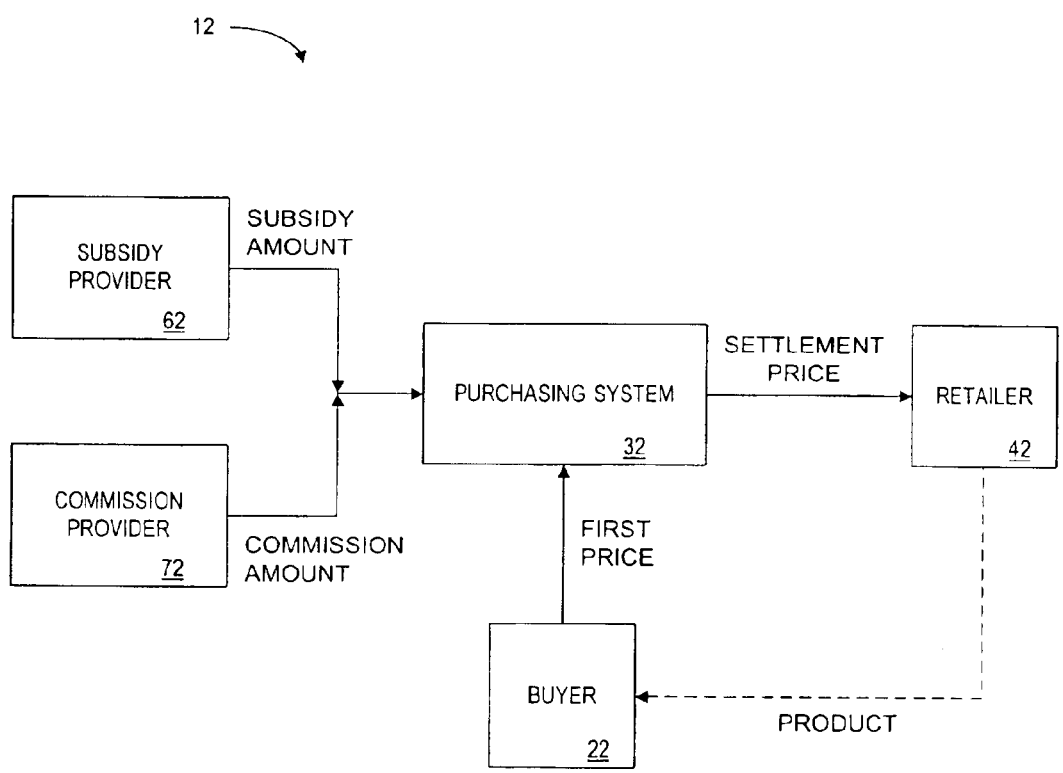
Figure 1C:
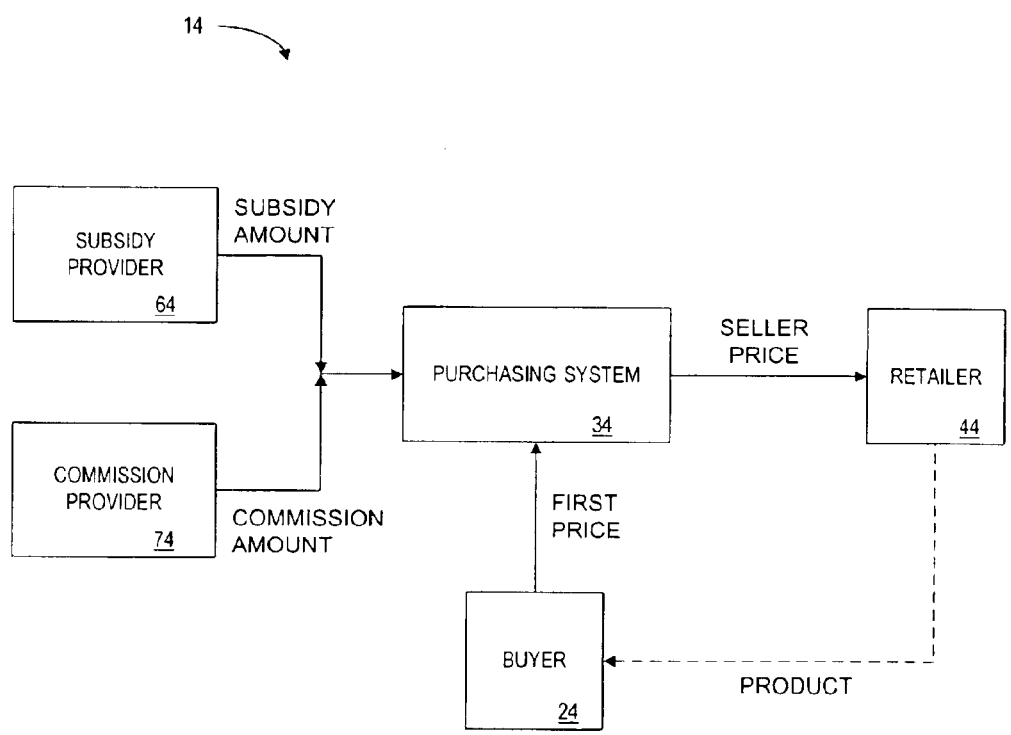

The settlement system 10 illustrated in FIG. 1A includes a purchasing system 30 that arranges for a buyer 20 to purchase a "product" from a seller 50 at a first price. As used herein, a "product" may be, for example, a new or used consumer product such as an electronic device. A product may also be any other good or service that a buyer can take possession of at a retailer 40. In the case of a service, the product may be, for example, a car tune-up that the buyer "takes possession of at" (i.e., receives the service from) a car service center. A product may also be a package of multiple items and/or services. For example, a product may be a television and a Video Cassette Recorder (VCR). In this case, the purchasing system 30 may arrange for the buyer to take possession of both items at a single retailer 40 or at different retailers.

Note that, as used herein, a "retailer" may be any entity capable of providing a product to a buyer. For example, a retailer might be a single retail shop, a chain of consumer electronic "superstores," one or more retail stores within a chain, a franchiser, a franchiser, or even a warehouse where products are stored.

The actual amount provided from the buyer 20 to the purchasing system 30 may not be equal to the first price. For example, the first price may be adjusted based on an applicable tax or penalty, as will be described. In general, from the perspective of the buyer 20, a payment of an amount associated with the first price is provided to the purchasing system 30 in exchange for the right to take possession of the product at the retailer 40.

According to one embodiment of the present invention, the retailer 40 agrees to provide the product to the buyer 20 in exchange for a "settlement" price. The settlement price may be, for example, a second price at which the retailer 40 normally offers the product for sale (i.e., the "retail" price). Note that according to one embodiment of the present invention, the settlement price is a predetermined amount agreed to between, for example, the retailer 40 and the purchasing system 30.

The retailer 40 may accept a settlement price lower than the retail price in order to, for example, have an opportunity to sell additional products to the buyer 20 when the buyer visits the retailer 40 to take possession of the product. The retailer 40 may instead require payment of a settlement price higher than the retail price in order to, for example, compensate the retailer 40 for the expense of processing a transaction involving the purchasing system 30. In either case, the settlement price may be based on, for example, a percentage of the retail price or the retail price adjusted by a predetermined amount. Of course, the settlement price does not need to be a function of the retail price.

According to one embodiment of the present invention, the purchasing system 30 provides a payment of an amount based on the settlement price to the retailer 40. According to another embodiment of the present invention, the seller 50 provides a payment of an amount based on the settlement price to the retailer 40 (as shown by a dashed line in FIG. 1A).

According to an embodiment of the present invention, the settlement price provided to the retailer 40 may not be equal to the first price provided by the buyer 20. As a result, payment of a "seller amount" may need to be exchanged between the seller 50 of the product and the purchasing system 30. For example, the buyer 20 may purchase a television from the seller 50 for $100. The retailer 40 may provide the television to the buyer in exchange for payment of a settlement price of $90. In this case, the purchasing system 30 may receive the first price ($100) from the buyer 20, provide the settlement price ($90) to the retailer 40 and provide a seller amount to the seller 50 based on the difference between the first price and the settlement price (i.e., $10). If the retailer 40 had instead required payment of a $120 settlement price, the seller 50 may have provided payment of a seller amount ($20) to the purchasing system 30 instead.

According to another embodiment of the present invention, the buyer 20 agrees to purchase the product at a first price and the seller agrees to sell the product at a "seller" price which may be different from the first price. In this case, the purchasing system 30 may profit from the difference between the seller price and the buyer price, if any. As shown in FIG. 1A, the purchasing system may also receive payment of a commission amount from a commission provider 70. The commission provider 70 may be, for example, the buyer 20, the seller 50, the retailer 40, a product manufacturer or a combination thereof. The commission amount may be, for example, a percentage of the first price, the seller price or the settlement price, or a predetermined amount.

According to another embodiment of the present invention, a subsidy provider 60 provides payment of a subsidy amount to subsidize the purchase of the product by the buyer 20. The subsidy provider 60 may be, for example, the seller 50, the retailer 40, a product manufacturer, a third party or the purchasing system 30.

By way of example, consider a buyer 20 who arranges through the purchasing system 30 to purchase a 35 millimeter (mm) camera from a seller 50 for $150. The purchasing system 30 determines that the camera is available at a retailer for a settlement price of $175. A subsidy provider 60, such as the manufacture of the camera, has agreed to provide a $35 subsidy for each camera sold. In this case, the purchasing system 30 "settles" the transaction by receiving $150 from the buyer 20 and $35 from the subsidy provider 60 and providing $175 to the retailer 40. In such a scenario, the purchasing system 30 has collected payment of $185 ($150 from the buyer 20 and $35 from the subsidy provider 60) and provided payment of $175, leaving it with an excess of $10. The purchasing system 30 may retain this $10 as profit, provide the $10 to the manufacturer of the product, store the $10 in associate with the buyer for use as a subsidy amount in a future transaction of the buyer, or any combination thereof.

The settlement system 12 illustrated in FIG. 1B includes a purchasing system 32 that sells a product to a buyer 22 at a first price. That is, the purchasing system 32 is also acting as the seller 50 shown in FIG. 1A. As before, the retailer 42 agrees to provide the product to the buyer 22 in exchange for payment of a settlement price, and the purchasing system may receive additional payments from a subsidy provider 62 and a commission provider 72.

The settlement system 14 illustrated in FIG. 1C includes a purchasing system 34 that arranges for a retailer 44 to sell a product to a buyer 24 at a first price. That is, the retailer 44 is also acting as the seller 50 shown in FIG. 1A. As before, the purchasing system may receive additional payments from a subsidy provider 64 and a commission provider 74. In this case, however, the retailer 44 agrees to provide the product to the buyer 24 in exchange for payment of a seller price (which may be equal to or based on the first price), not a settlement price.

Thus, the present invention comprises a settlement system and method for collecting and distributing funds amongst buyers, sellers, and retailers participating in transactions through a purchasing system.

Settlement Systems

Figure 1D:
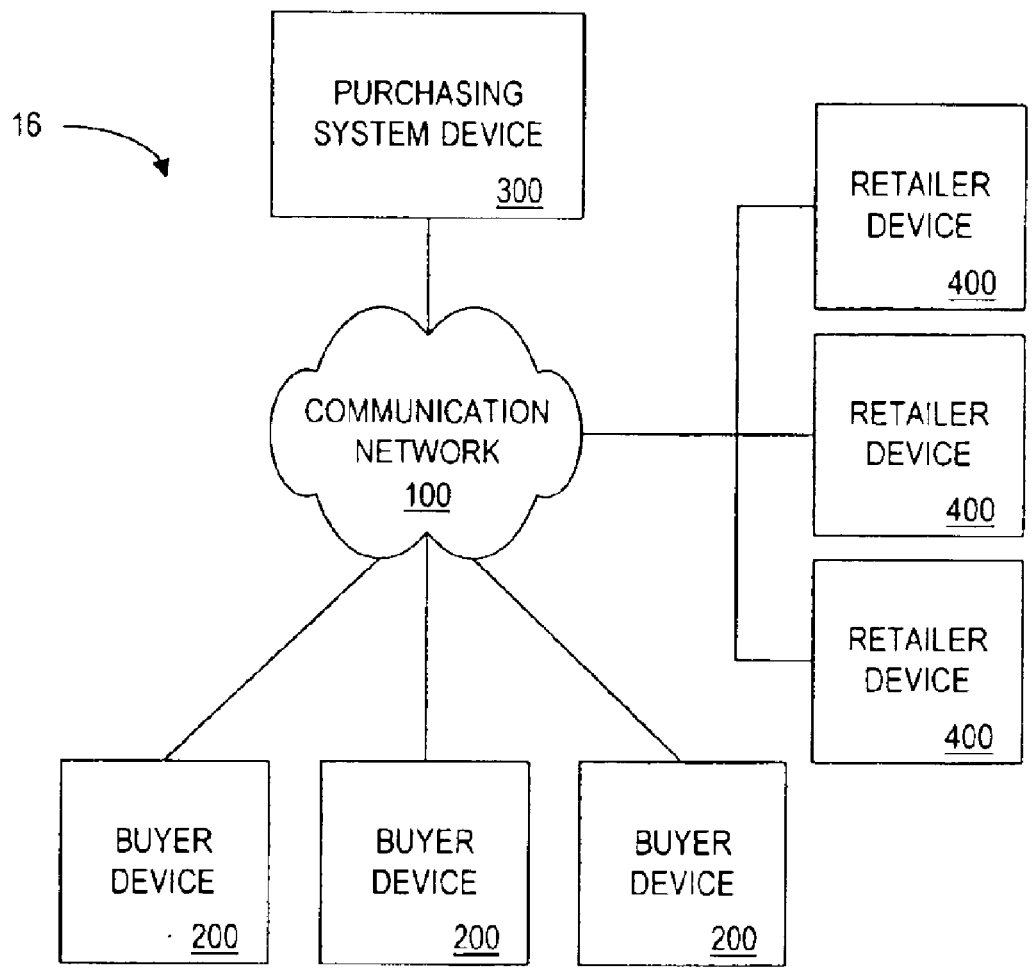
FIGS. 1D to 1E are block diagrams of settlement systems in which a buyer takes possession of a product at a retailer according to embodiments of the present invention.
Figure 1E:
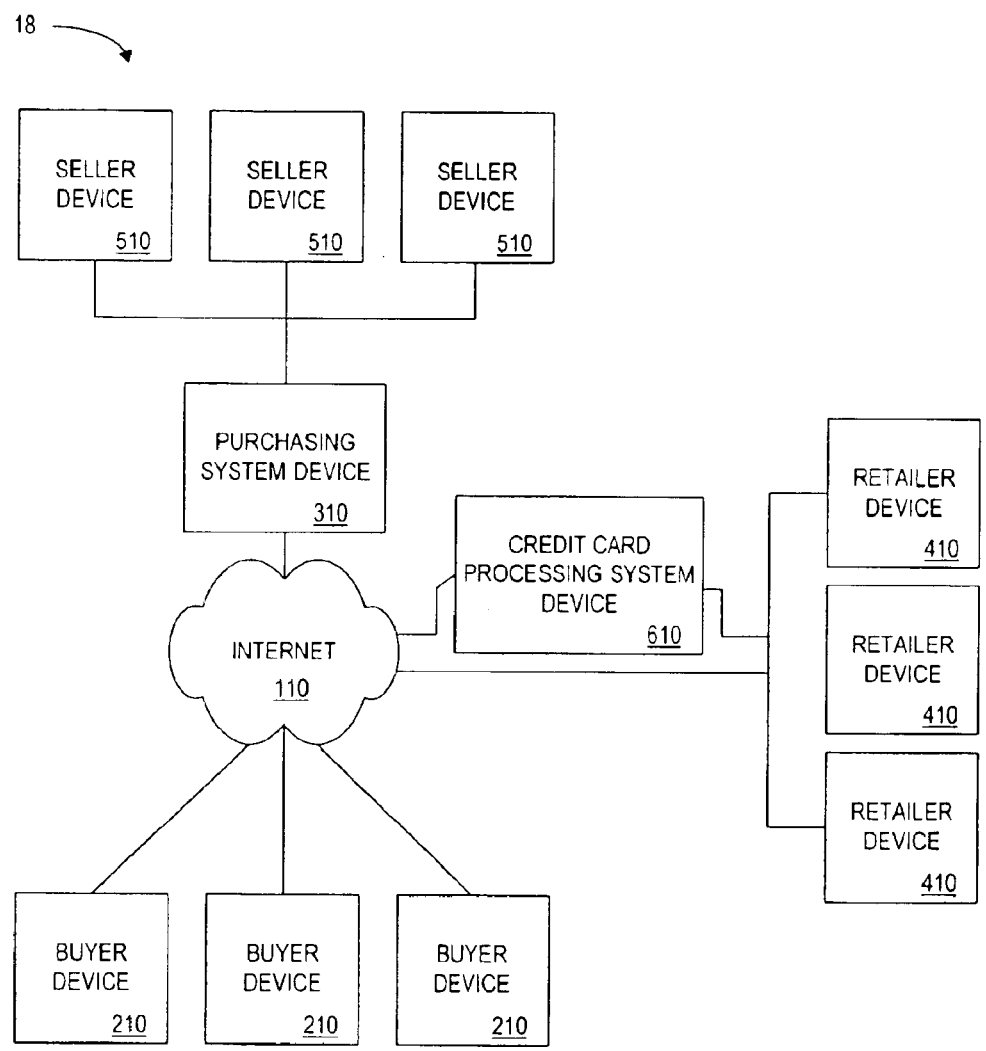

FIGS. 1D to 1E are block diagrams of settlement systems in which a buyer takes possession of a product at a retailer according to embodiments of the present invention.

The system 16 shown in FIG. 1D includes a number of buyer devices 200 coupled to a purchasing system device 300 through a communication network 100. The buyer devices 200 may be, for example, Personal Computers (PCs), Personal Digital Assistants (PDAs), wired or wireless telephones, one-way or two-way pagers, kiosks, Automated Teller Machines (ATMs), watches enabled to communicate with the network 100, or any other appropriate communication device. The communication network 100 may be, for example, a Local Area Network (LAN), a Wide Area Network (WAN), a wireless network, a Public Switched Telephone Network (PSTN), or an Internet Protocol (IP) network such as the Internet, an intranet or an extranet.

According to one embodiment of the present invention, the purchasing system device 300 receives a buyer offer, including a buyer-defined offer price, related to a product to be purchased. The buyer offer may be "binding" in that if a seller agrees (perhaps within a predefined period of time from the time the buyer submits his or her offer), to accept the offer the buyer cannot revoke the offer. The buyer provides a payment identifier when submitting his or her offer and agrees that the purchasing system may automatically utilize the payment identifier to collect the buyer defined offer price if a seller accepts the offer. One example of a buyer offer, called a Conditional Purchase Offer (CPO), is described in U.S. Pat. No. 5,794,207 and U.S. patent application Ser. No. 08/889,319, the entire contents of which are hereby incorporated by reference. A CPO may be, for example, an electronic message from a buyer including an offer price for a product. If a seller agrees to the CPO, the buyer pays the offer amount to the purchasing system and takes possession of the product at a retailer. The purchasing system, in turn, provides a payment of the settlement price to the retailer.

In addition to an offer price, the buyer offer can include other information, such as a product category, a product class, one or more product features, or a product manufacturer and product identifier (e.g., model number). For example, the buyer offer may indicate that the buyer will pay $500 (the offer price) for a television (the product category) made by a well-respected manufacturer and having a 32 inch screen (the product class) and surround sound (a product feature).

The buyer offer may be received from a buyer device 200 through the communication network 100, and the purchasing system device 300 arranges for the buyer to purchase the product from a "seller," such as the product manufacturer, a retailer, the purchasing system or any other party. The purchasing system device 300 also arranges for the buyer to take possession of the product at a retailer.

According to an embodiment of the present invention, the buyer pays the purchasing system in exchange for the right to take possession of the product at the retailer. The retailer receives a payment, which may or may not be based on the amount paid by the buyer, from a party other than the buyer, such as the purchasing system or product manufacturer, in exchange for providing the product to the buyer.

In another embodiment of the present invention, the purchasing system device 300 communicates with the buyer device 200 through the communication network 100 to establish a first price for a product between the buyer and a seller. The purchasing system device 300 also arranges for the buyer to take possession of the product at a retailer, different from the seller, that offers the product for sale at a second price. Verification information, which enables the retailer to authorize the buyer to take possession of the product, is transmitted from the purchasing system device 300 to a retailer device 400. The verification information may be, for example, a one way hash function transmitted to the retailer (either once or periodically). The retailer can then evaluate a redemption code provided by the buyer, using the one way hash function, to determine if the buyer is authorized to take possession of the product.

The verification information may also be, for example, a response to information (sent from the retailer device 400 to the purchasing system device 300) about an attempt to take possession of a product, or a batch of authorized codes sent to the retailer device 400 each night. The buyer provides a payment, based on the first price, to the purchasing system in exchange for the right to take possession of the product at the retailer. The purchasing system, in turn, provides payment to the retailer for allowing the buyer to take possession of the product.

According to another embodiment of the present invention, the purchasing system device 300 arranges for a buyer to purchase a product and transmits redemption information, including a "redemption code," to the buyer device 200, such as through the communication network 100. As used herein, a "redemption code" may be, for example, a unique alphanumeric sequence of digits. In general, however, the redemption code may be anything capable of being identified, such as a one or two dimensional bar code, that represents the right of the buyer to take possession of the product at a retailer. As used herein, the phrase "bar code" includes any machine readable information. The redemption information can also include information that enables the creation of a voucher. For example, a printer attached to a PC may be used to print a voucher including the redemption code.

According to still another embodiment of the present invention, information related to an attempt to take possession of the product, including the redemption code, is sent from a retailer device 400 to the purchasing system device 300. In this case, the purchasing system device 300 sends back a verification, authorizing the buyer to take possession of the product, to the retailer device 400. Although FIG. 1D shows the purchasing system device 300 communicating with the retailer device 400 through the same communication network 100 used by the buyer device 200, those skilled in the art will recognize that a different communication network may be used instead.

A more detailed description of one embodiment of the present invention will now be provided with respect to FIG. 1E. As before, the system 18 includes a number of buyer devices 210 (such as PCs executing browser application software) coupled to a remote purchasing system device 310 (such as a Web server) through the Internet 110. The purchasing system device 310 also communicates through the Internet 110 with a number of seller devices 510 and retailer devices 410. Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

Although embodiments of the present invention will be described with respect to information exchanged using a Web site, according to other embodiments of the present invention information may instead be exchanged using, for example: a telephone; a facsimile machine; e-mail; a WebTV interface; a cable network interface, or a wireless device. Information exchanged between a buyer and purchasing system device 310, as well as between a retailer and the purchasing system device 310, may also use a Voice Response Unit (VRU) or Interactive VRU (IVRU). Examples of IVRUs include the Vision 2001 and the Insight IVR/Web from Interactive Voice Technologies, Corp. and the OmniVox for Windows NT from APEX Voice Communications. An IVRU lets a user of a DTMF (Dual Tone Multi-Frequency) tone generating telephone, also known as "push button" telephone, communicate with a computer. The DTMF signals received from a user's telephone are interpreted by an IVRU server, and the server may also communicate with the user by generating and transmitting voice or other audio signals, such as a list of IVRU menu options.

The purchasing system device 310 arranges for the buyer to purchase the product, for example, when a buyer offer is received from a buyer device 200 through the communication network 100.

Based on the buyer offer information, the purchasing system device 310 may select a particular product (such as a manufacturer and model number) from a plurality of possible products. In addition to the buyer offer information, the purchasing system device 310 may also consider other factors when selecting a particular product, such as, for example: (i) the expected availability of products at retailers; (ii) the actual availability of product at retailers—which may be done by communicating with the retailer devices 410; (iii) retail prices of products at various retailers—which again may be done by communicating with the retailer devices 410; (iv) subsidy information associated with products; and (v) retailer settlement prices. As used herein, a "subsidy" is an amount a party (such as a manufacturer, a retailer or the purchasing system) is willing to contribute towards the buyer's purchase of a product.

The purchasing system device 310 may likewise select one or more retailers from a plurality of possible retailers. In this case, the purchasing system device 310 may consider, for example: (i) the location (e.g., address) of the buyer; (ii) the location of the retailers; (ii) the expected availability of the product at various retailers; (iii) the actual availability of the product at various retailers; (iv) retail prices of the product at the retailers; (iv) retailer subsidy information; and (v) retailer settlement prices.

To determine whether or not the buyer offer is acceptable and/or how the buyer offer will be accepted (e.g., which product at which retailer), the purchasing system device 310 may compare the offer price with the settlement price associated with a product that successfully meets the buyer's offer information. A potential seller may also have a minimum acceptable price, which is the lowest price that the seller (as opposed to the retailer or the purchasing system) will let the product be sold for (e.g., to prevent brand name dilution).

In making this comparison, the purchasing system device 310 may also take into account supplemental price information, such as a manufacturer subsidy amount, a retailer subsidy amount, a purchasing system subsidy amount, and/or a "third-party" subsidy amount associated with the product. As used herein, a third-party subsidy amount may be, for example, an amount that a third-party agrees to provide towards the purchase of a product in exchange for a promise regarding, an action by, or information about the buyer. For example, a credit card issuer may agree to add $50 towards the purchase of a home stereo if a buyer submits a credit card application to the issuer. See, for example, U.S. patent application Ser. No. 08/943,483 filed Oct. 3, 1997 and entitled "System and Method for Facilitating Acceptance of Conditional Purchase Offers", the entire contents of which are hereby incorporated by reference.

According to embodiments of the present invention, the purchasing system device 310 arranges for the buyer to take possession of the product at a retailer. This may be done, for example, by sending to the buyer redemption information, including a redemption code such as a "pseudo" credit card number, debit card number or a checking account number. A redemption code may be a "pseudo" credit card number if, for example, it can be entered into (and processed by) a retailer device, such as a Card Authorization Terminal (CAT) device, as if it was a real credit card number. In this case, the purchasing system device 310 may authorize the buyer to take possession of the product using a credit authorization request received from a credit card processing system device 610.

The redemption information can also include a condition that must be met by the buyer, such as a geographic limitation or an expiration date. Penalty information, such as a 10% increase in the price of the product charged to the buyer, may also be included in the event the buyer violates one of the conditions of the sale. The redemption information may also enable the creation of a coupon-like voucher. For example, the redemption information may let the buyer print out a voucher that can be presented to the retailer when taking possession of the product.

Note that the redemption information may include information associated with a number of products, as well as a number of retailers. For example, a single voucher might indicate that the buyer can take possession of a VCR at either of three local retailers. In this case, the redemption code may be redeemable for one of several different products, depending on the retailer at which the buyer takes possession of the product. Accordingly, the redemption information (e.g., a voucher), may include several different Stock Keeping Unit (SKU) numbers, model names and/or model numbers. According to another embodiment, the voucher may include several separate products (e.g., a television or a VCR) or several equivalent products (e.g., several different television brands, more than one of which may be available at a single retailer).

The redemption information may also include supplemental offer information. For example, the voucher may include an offer to purchase a pack of three VCR tapes for $1 to the buyer if the buyer takes possession of the VCR at a particular retailer.

When the buyer presents the voucher to a retailer, the retailer device 410 sends information related to an attempt to take possession of the product (such as the redemption code included on the voucher) to the purchasing system device 310. The retailer devices 410 may comprise, for example, inventory systems that periodically update the purchasing system device 310 and/or Point Of Sale (POS) devices, such as a POS controller that communicate with POS terminals (not shown in FIG. 1B) and the purchasing system device 310 during the redemption process. A POS terminal may include an optical bar code scanner to read bar codes on products and/or vouchers and a card reader to read cards such as magnetic strip cards that have magnetizable strips or surfaces on which data can be recorded. One such card reader is the OMNI™ 1450 payment terminal, manufactured by VeriFone, Inc., which includes a built-in, magnetic-stripe reader, a Personal Identification Number entry pad (e.g., one used buy a buyer to enter a debit card PIN) and an integrated smart card reader.

The purchasing system device 310 may communicate with the retailer device 410 in substantially real time during the redemption of a voucher. That is, a POS controller may connect to the purchasing system device 310 when a buyer is attempting to take possession of the product. In another embodiment, the retailer device 410 and the purchasing system device 310 communicate periodically, such as every night at midnight. For example, the purchasing system device 310 may communicate with each retailer device 410 each day regarding buyer redemption codes, redeemable at the retailer, that have been issued. Likewise, the retailer device 410 can in turn transmit to the purchasing system device 310 a list of the redemption codes that have been redeemed at the retailer that day. In some embodiments, the retailer is the seller who accepts a buyer's offer. In such an embodiment, the retailer device 410 could also perform the function of, or be in communication with another server that performs the function of, a potential seller. For example, the retailer device 410 may be in communication with or perform at least some of the functions of the seller device 510.

When the retailer device 410 sends information related to an attempt to take possession of the product (such as a redemption code) to the purchasing system device 310, the information can be used to authorize the buyer to take possession of the product. That is, the purchasing system device 310 can send a verification back to the retailer device 410 authorizing the retailer to let the buyer take possession of the product. The purchasing system device 310 may also provide a payment to the retailer in exchange for providing the product to the buyer. In this case, of course, the amount paid to the retailer may or may not be equal to the offer amount paid by the buyer. For example, suppose the purchasing system arranges for a buyer to purchase a television for $300, and the buyer takes possession of the television at a retailer (one of several indicated on the voucher) that typically sells that television for $320. In this case, the purchasing system may pay the full retail price (i.e., $320) to the retailer.

The purchasing system device 310 may communicate with the seller devices 510, for example, to send information about a buyer offer in attempt to find a seller. The purchasing system device 310 may also communicate with the seller devices 510 to determine and distribute seller amounts (e.g., the amount owed to or due from the seller as a result of a sale made through the purchasing system). Such a determination and distribution may be made, for example, on a sale-by-sale or periodic (e.g., batch) basis.

Note that some or all of the actions associated with the purchasing system device 310 may be performed by a retailer, a product manufacturer, or a party other than the retailer and product manufacturer.

Buyer Device

Figure 2:
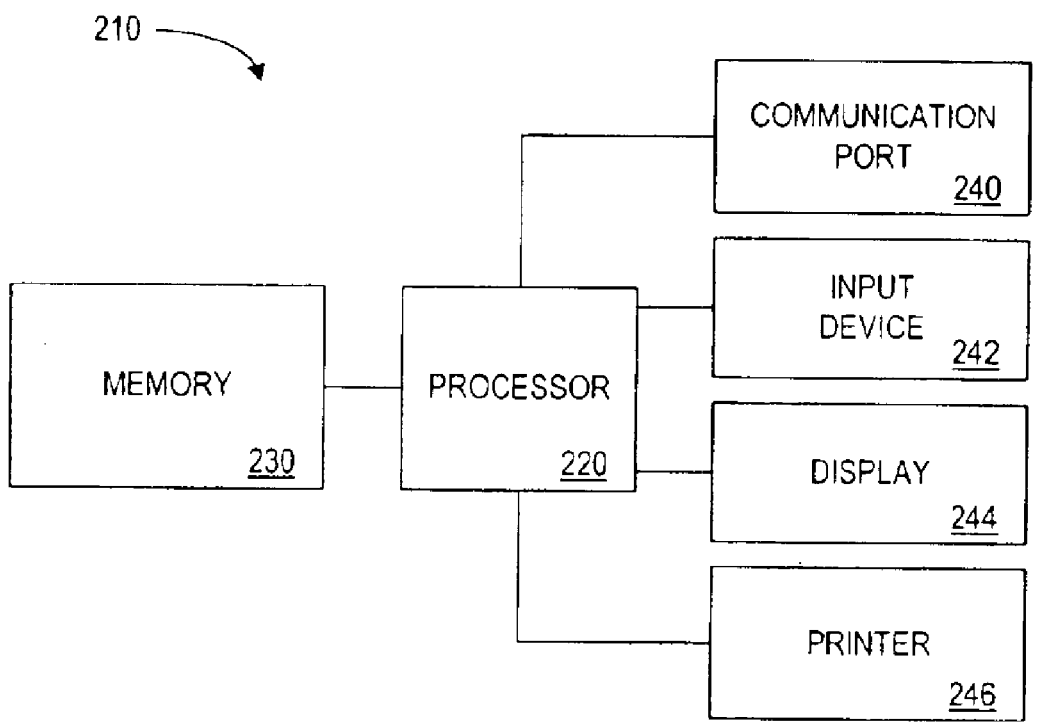
FIG. 2 is a block schematic diagrams of a buyer device according to an embodiment of the present invention.

FIG. 2 illustrates a buyer device 210 that is descriptive of the buyer device shown in FIG. 1E according to one embodiment of the present invention. The buyer device 210 comprises a processor 220, such as one or more Pentium® processors, coupled to: a communication port 240 configured to communicate through a communication network (not shown in FIG. 2); an input device 242 (such as a keyboard or mouse); a display 244; and a printer 246. The communication port 240 may be used to communicate with, for example the purchasing system device 310.

By way of example, the program may be a Web browser application used by a buyer to "visit" a purchasing system Web site. The buyer can arrange with the purchasing system to purchase a product from a seller at a first price, and to pay an amount based on the first price to the purchasing system. The buyer may receive redemption information from the purchasing system, such as information that lets the buyer print out a voucher using the printer 246. The buyer could then provide the voucher to a retailer that offers the product for sale at a second price and take possession of the product.

The printer 246 shown in FIG. 2 is optional. If the buyer device 210 does not have the printer 246 attached, the buyer may write down a redemption code. For example, the buyer may write down a redemption code and input it using a kiosk at the retailer. The kiosk could then communicate with the purchasing system device 310, such as through an Internet connection, and print a voucher for the buyer.

According to another embodiment of the present invention, the buyer can take possession of the product without using a printed voucher. For example, the buyer may simply tell the POS terminal operator the redemption code. The operator inputs the redemption code using the POS terminal and the process continues as if the buyer had used a printed voucher. Also, if the buyer stores the redemption code in the buyer device 210 or a portable buyer device (e.g., a PDA or magnetic stripe card), the buyer may communicate the redemption code directly from the buyer device to the POS terminal, such as by using an Infra-Red (IR) communication link.

Purchasing System Device

Figure 3:
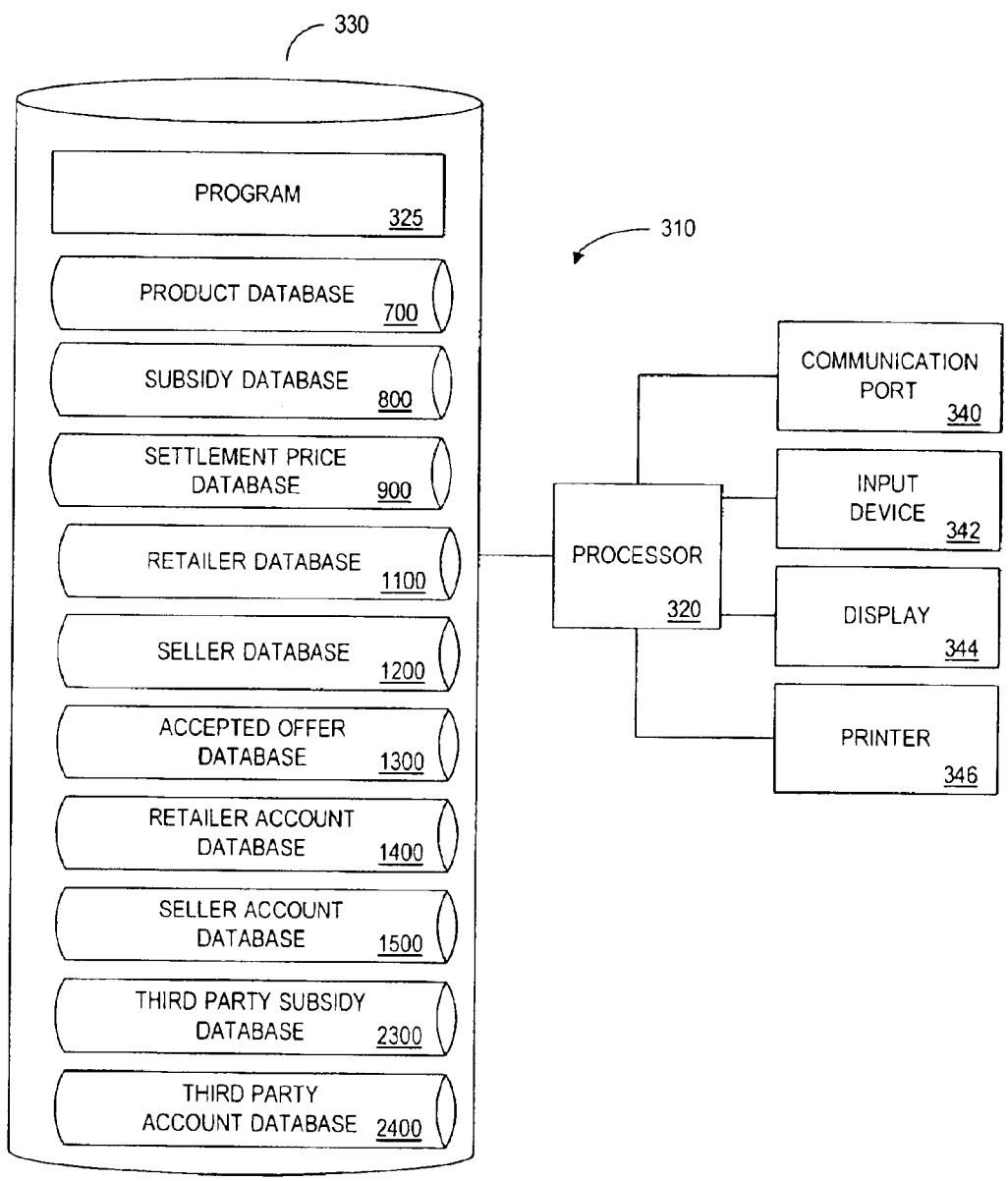
FIG. 3 is a block schematic diagram of a purchasing system device according to an embodiment of the present invention.

FIG. 3 illustrates a purchasing system device 310 that is descriptive of the purchasing system device shown in FIG. 1E according to one embodiment of the present invention. The purchasing system device 310 comprises a processor 320, such as one or more Pentium® processors, coupled to: a communication port 340 configured to communicate through a communication network (not shown in FIG. 3); an input device 342 (such as a keyboard or mouse); a display 344; and a printer 346. The communication port 340 may be used to communicate with, for example: (i) a plurality of seller devices 510; (ii) a plurality of buyer devices 210; and/or (iii) a plurality of retailer devices 410. The sellers may comprise, for example, product manufacturers and/or retailers. The buyers may comprise, for example, individuals who access a Web site and submit offers to purchase products (i.e., buyer offers). Such a Web site could be hosted by a server at the purchasing system device 310 or hosted by a server coupled to the purchasing system device 310.

The processor 320 is also in communication with a data storage device 330. The data storage device 330 (as well as the other storage devices disclosed herein) may comprise any appropriate combination of magnetic, optical and/or semiconductor memory, and may include Random Access Memory (RAM), Read-Only Memory (ROM) and/or a hard disk. The processor 320 and the storage device 330 may each be (i) located entirely within a single computer or other computing device; (ii) connected to each other by a remote communication medium, such as a serial port cable, telephone line or wireless frequency transceiver; or (iii) a combination thereof. In one embodiment, the purchasing system device 310 may comprise one or more computers that are connected to a remote server computer for maintaining databases.

The data storage device 330 stores a program 325 for controlling the processor 320. The processor 320 performs the instructions of the program 325, and thereby operates in accordance with the present invention, and particularly in accordance with the methods described in detail herein. For example, the processor may arrange through the communications port 340 for a buyer to purchase a product from a seller at a first price, and to take possession of the product at a retailer, different from the seller, that offers the product for sale at a second price. The processor 320 may also arrange for the purchasing system to receive from the buyer a payment of an amount based on the first price, and arrange for the retailer to receive payment of an amount based on a settlement price in exchange for providing the product to the buyer.

The program 325 (as well as the other programs disclosed herein) may be stored in a compressed, uncompiled and/or encrypted format. The program 325 furthermore includes program elements that may be necessary, such as an operating system, a database management system and "device drivers" used by the processor 320 to interface with peripheral devices. Appropriate device drivers and other necessary program elements are known to those skilled in the art and are not described in detail herein.

As shown in FIG. 3, the storage device 330 also stores: a product database 700 (described in detail with respect to FIG. 7); a subsidy database 800 (described in detail with respect to FIG. 8); a settlement price database 900 (described in detail with respect to FIG. 9); a retailer database 1100 (described in detail with respect to FIG. 11); a seller database 1200 (described in detail with respect to FIG. 12); an accepted offer database 1300 (described in detail with respect to FIG. 13); a retailer account database 1400 (described in detail with respect to FIG. 14); a seller account database 1500 (described in detail with respect to FIG. 15); a third party subsidy database 2300 (described in detail with respect to FIG. 23); and a third party account database 2400 (described in detail with respect to FIG. 24). The schematic illustrations and accompanying descriptions of these and other databases presented herein are exemplary, and any number of other database arrangements could be employed besides those suggested by the figures.

As will now be described, the purchasing system device 310 shown in FIG. 3 lets a buyer establish a price for a product online (e.g., through the Internet) with a seller (e.g., a product manufacturer or a retailer) before taking possession of, or "picking up," the product at a convenient retailer. The purchasing system device 310 may issue the buyer a redemption code, such as code included on a printed voucher, that is redeemable for the product at one or more "participating" local retailers. That is, the purchasing system has agreements with these retailers such that the retailers agree to honor purchasing system vouchers for specific products.

According to an embodiment of the present invention, each participating retailer establishes "settlement prices" for those products it will exchange for vouchers. The settlement price is the amount that the purchasing system must provide to the retailer in exchange for honoring a voucher. A retailer may set the settlement price below, at or above the product's retail price. The retailer may, for example, set the settlement price below the retail price for a give product to increase the likelihood of the purchasing system accepting a buyer's offer for the product and arranging for the buyer to take possession of the product at the retailer, thus generating additional traffic for the retailer (i.e., the buyers who come to the store to take possession of product purchased through the purchasing system).

In another embodiment of the present invention, a product manufacturer (acting as a seller) can bypass a retailer's pricing structure and establish a price for a product directly with a buyer without the burden of delivering the product to the buyer. Similarly, an embodiment of the present invention lets a retailer (acting as a seller) establish a price for a product with a particular buyer without lowering the price for the product typically charged at a retail store. This can attract new buyers without giving a discounted price to all customers who visit the retail store.

According to an embodiment of the present invention, the purchasing system device 310 arranges for a buyer to purchase a product from a seller at a first price. This may be done, for example, by receiving a buyer offer, included a buyer-defined first price, and information about the product to be purchased. Note that, as used herein, information may be "received" by, for example: (1) the purchasing system device 310 from a buyer device 210; or (2) a software application or module within the purchasing system device 310 from another software application, module or any other source. The purchasing system device 310 may then decide whether or not a buyer offer will be accepted or information about the buyer offer may be routed to one or more seller devices 510. Systems and methods related to such a decision are more filly described in U.S. patent application Ser. No. 09/337,906 filed Jun. 22, 1999 and entitled "Purchasing Systems and Methods Wherein a Buyer Takes Possession at a Retailer of a Product Purchased Using a Communication Network".

A buyer offer received by the purchasing system device 310 may include, for example: (i) product requirements; (ii) a buyer-defined offer price; and (iii) a payment identifier (e.g., a credit card account number). The buyer can specify product requirements by providing, for example: (i) a category of product (e.g., a television); (ii) a class of product (e.g., class 1 encompassing the top three manufacturers or all 21 inch screen televisions); (iii) a product manufacturer of a product; (iv) a model number of a product; and/or (v) features that the product must include (e.g., surround sound).

The buyer's product requirements determine which products stored in the product database 700 (if any) can be used to accept the buyer offer. If the purchasing system device 310 finds a product that matches the buyer's offer, the purchasing system device 310 decides whether or not to accept the offer (such as by comparing the buyer price, adjusted for any subsidies, with the settlement price).

According to another embodiment of the present invention, the purchasing system device 310 arranges for a buyer to purchase a particular product by offering a product at a seller-defined price to the buyer. The buyer then simply indicates that the price is acceptable and arranges to purchase the product (e.g., by providing a payment identifier). According to still another embodiment of the present invention, the purchasing system offers a product having at least one product requirement (e.g., a 27" television and surround sound from a well-known manufacturer) at a seller-defined price to the buyer without specifying the particular product that will be used to fulfill the requirement. In this case, the product requirements may be selected by the buyer, the purchasing system or a seller.

The purchasing system device 310 also arranges for a buyer to take possession of the product at a retailer that offers the product for sale at a second price. This may be done, for example, by sending redemption information to the buyer, including a redemption code and information that enables the creation of a purchasing system voucher.

According to an embodiment of the present invention, the purchasing system receives from the buyer a payment of an amount based on the first price. The payment may be received, for example, using a payment identifier supplied by the buyer. The payment may be received, for example, at a time based on when the purchasing system device arranges for the buyer to purchase the product. The payment may instead be received, if desired, at a time based on when the buyer takes possession of the product at the retailer (in which case the buyer may not be charged interest until after he or she takes possession of the product).

The purchasing system device 310 also arranges for the retailer to receive payment of an amount based on a settlement price in exchange for providing the product to the buyer, such as by communicating with the retailer device 410.

Retailer Device

Figure 4:
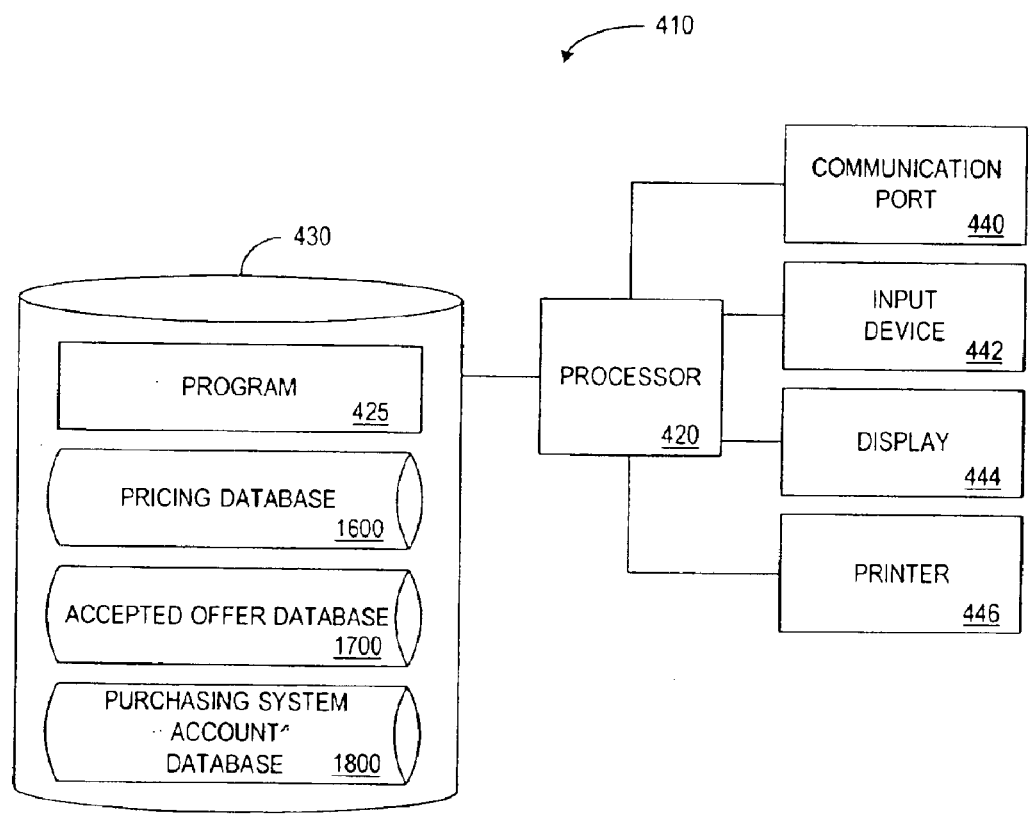
FIG. 4 is a block schematic diagram of a retailer device according to an embodiment of the present invention.

FIG. 4 is a block schematic diagram of a retailer device 410 according to an embodiment of the present invention. The retailer device 410 includes a processor 420 (e.g., one or more Pentium® computers) coupled to: a communication port 440 (which may be used to communicate through a communication network, not shown in FIG. 4); an input device 442 (such as a keyboard, a mouse, a touch screen, an entry pad, a bar code reader, a magnetic stripe reader and a smart card reader); a display 444 (such as a monitor or alphanumeric display); and a printer 446 (such as a printer capable of printing a receipt or coupon). The processor 420 is also coupled to a storage device 430 that stores a program 425 containing instructions adapted to be executed by the processor 420 to perform at least one embodiment of the present invention.

The processor 420 of the retailer device 410 may also communicate with a POS controller and/or a number of POS terminals (not shown in FIG. 4). In another embodiment, the retailer device 410 itself may be a POS controller or a POS terminal.

As shown in FIG. 4, the storage device 430 also contains a pricing database 1600 (described in detail with respect to FIG. 16); an accepted offer database 1700 (described in detail with respect to FIG. 17); and a purchasing system account database 1800 (described in detail with respect to FIG. 18).

The accepted offer database 1700 may include, for example, buyer offers made through the purchasing system that have been accepted. The purchasing system account database 1800 may include, for example, an amount of payment expected in exchange for providing a product to a buyer. The pricing database 1600 may include, for example: the products the retailer will provide to buyers that purchase the product through the purchasing system: a retail price for each of those products; and a settlement price for each of those products. The settlement price may be used, for example, to determine the amount of payment the retailer expects from the purchasing system in exchange for providing a product to a buyer. If the retailer is the seller that accepted a buyer offer, the settlement price may not be needed.

In addition, a retailer that participates in the purchasing system as both a seller and a product provider may need to determine, when a given product is being provided to a buyer, whether or not the retailer is acting as the seller. This may be done using a database or by communicating with the purchasing system device 310. For example, a retailer may both: (i) sell a particular television through a purchasing system; and (ii) let buyers, who purchased the television through the purchasing system from a different seller, take possession of the television at the retailer's store. In this case, when a buyer visits the retailer to take possession of a product, it must be determined whether the retailer should receive from the purchasing system: (i) a seller price (which may be equal to or based on the first price established by the buyer through the purchasing system); (ii) the buyer price (if the retailer, acting as a seller, sold the television to the buyer through the purchasing system); or (iii) the settlement price (if the retailer is merely letting the buyer take possession of the television at the retailer's store).

Seller Device

Figure 5:
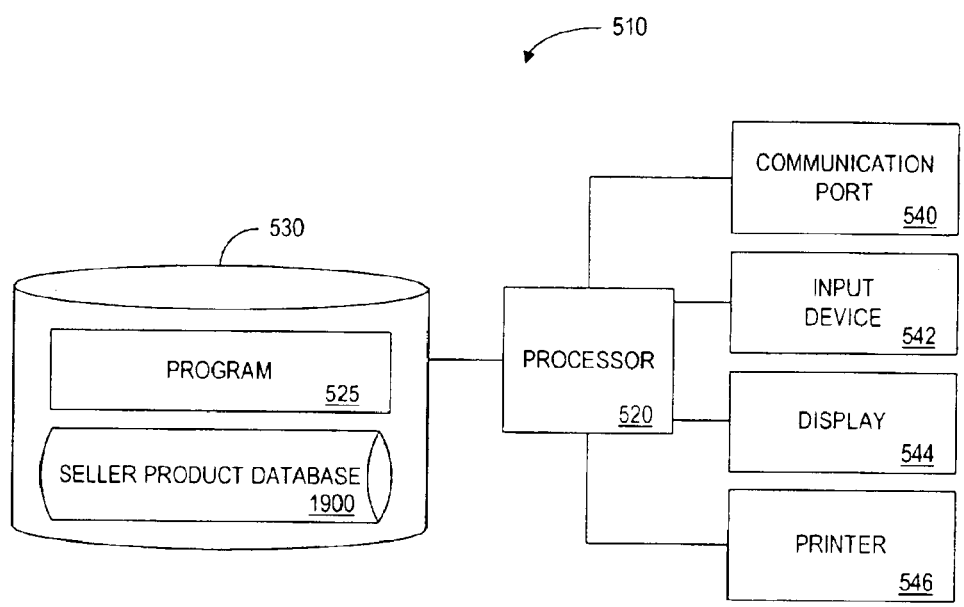
FIG. 5 is a block schematic diagram of a seller device according to an embodiment of the present invention.

FIG. 5 is a block schematic diagram of a seller device 510 according to an embodiment of the present invention. The seller device 510 includes a processor 520 (such as one or more Pentium® processors) coupled to: a communication port 540 (which may be configured to communicate through a communication network, not shown in FIG. 5); an input device 542 (such as a keyboard or mouse); a display 544 (such as a monitor); and a printer 546 (such as a laser printer). The processor 520 is also coupled to a storage device 530 that stores a program 525 containing instructions adapted to be executed by the processor 520 to perform at least one embodiment of the present invention.

The seller device 510 communicates with the purchasing system device 310 using the communication port 540, for example, to send information to be added to the product database 700. The information may include, for example: (i) what products the seller wants sold through the purchasing system; (ii) the settlement price that the seller is willing to accept for each of the products (if the seller is the retailer); (iii) in one embodiment, the quantity of a product that is available for sale through the purchasing system and/or the region in which the product or quantity of the product is available; and (iv) a minimum acceptable price (e.g., when the seller is a product manufacturer). The seller device 510 may receive such data from the seller's personnel via the input device 542. Alternatively, the seller device 510 may, based on a program or subroutine, determine: (i) what products to offer for sale through the purchasing system; (ii) the settlement prices for those products; and (iii) the quantity and regions of availability of the products. The seller device 510 may make such a determination based on, for example, the seller's current inventory and revenue management rules or predetermined rules input by the seller's personnel. Note that the seller may determine which products to offer a subsidy amount for based on current or predicted sales or other market conditions (e.g., a new model being introduced). The seller may also indicate subsidy information on a transaction basis (e.g., how much of a subsidy the seller is willing to provide for each product sold through the purchasing system) and/or on a product basis (e.g., a maximum amount the seller is willing to provide across a number of products sold).

The seller device 510 additionally receives data from the purchasing system device 310 through the communication port 540. The received data may include: (i) the amount of payment owed by (or due to) the seller for products sold through the purchasing system; and (ii) reports regarding the demand for products and prices offered for the products from buyers using the purchasing system device 310. Such data may be provided to the seller's personnel on the display 544 or reports printed out with the printer 546.

As shown in FIG. 5, the storage device 530 also contains a seller product database 1900 (described in detail with respect to FIG. 19), which may identify the products available for sale through the purchasing system device 310. The seller device 510 may also store the "collected demand" for products (or for product descriptions that match the seller's products) directly as buyer offers are received from the purchasing system device 310. For example, the purchasing system device 310 may have 100 outstanding offers for a particular television model at a certain average price. While a seller may not wish to sell a single television at that price, it may agree to do so because the sale will involve 100 televisions (and therefore provide sufficient profit).

According to one embodiment of the present invention, when a buyer offer is received by the seller device 510, the seller device 510 queries the seller product database 1900 to determine, for example, whether: (i) there is a record whose product description successfully fulfills the product specified in the buyer's offer; and (ii) the offer price is at least equal to minimum acceptable price for that product. If the query results in a product that fulfills the buyer's offer, the seller accepts the offer and transmits the acceptance to the purchasing system device 310.

A seller may add inventory to the seller product database 1900 database: (i) automatically, for example, based on market conditions, such as the seller's current inventory or sales data (e.g., how many units of a particular product have sold within a predefined time period); or (ii) manually, on an ad hoc basis (e.g., based on current sales and inventory or on what the seller currently wishes to promote). According to one embodiment, when inventory of a product remains essentially stagnant for a predefined amount of time (i.e., the product is not selling well), the product is automatically made available to the purchasing system or the minimum acceptable price associated with that product may be reduced (such as by 10%).

Note that in the case where the retailer is the seller, the seller device 510 and the retailer device may be the same device, and the storage device 530 may contain the databases shown both in FIGS. 4 and 5. In other words, the functions of the seller device 510 and the retailer device 410 may be combined into one device or divided amongst the seller devices 510 and retailer devices 410 in ways other than described herein.

Credit Card Processing System Device

Figure 6:
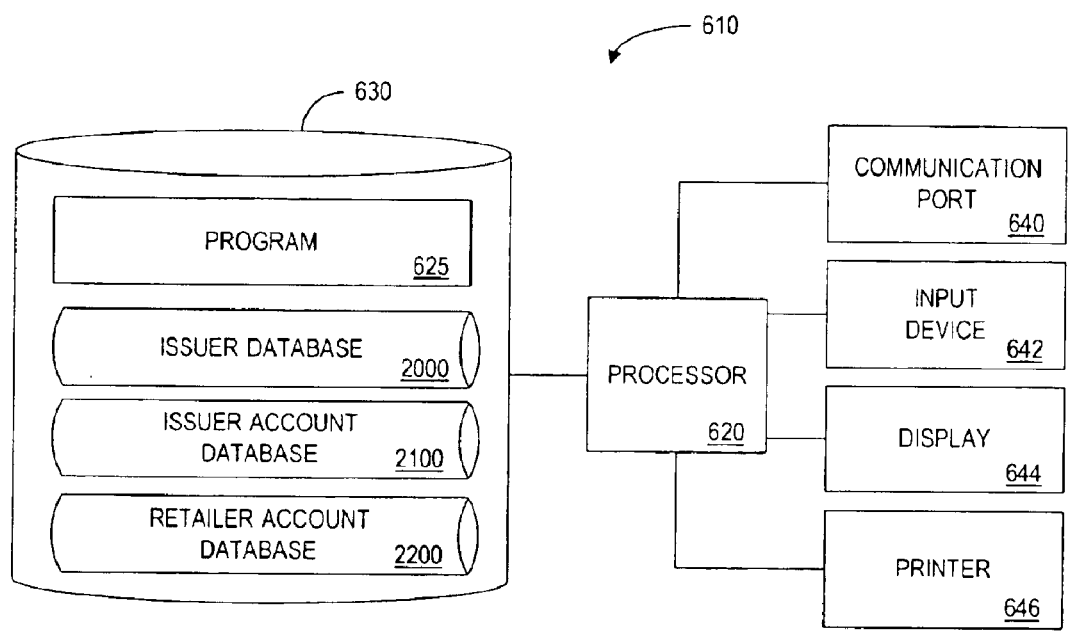
FIG. 6 is a block schematic diagram of a credit card processing system device according to an embodiment of the present invention.

FIG. 6 is a block schematic diagram of a credit card processing system device 610 according to one embodiment of the present invention. The credit card processing system device 610 includes a processor 620 (such as one or more Pentium® processors) coupled to: a communication port 640 (which may be configured to communicate through a communication network, not shown in FIG. 6); an input device 642 (e.g., a keyboard and mouse); a display 644 (e.g., a monitor); and a printer 646. The processor 620 is also coupled to a storage device 630 that stores a program 625 containing instructions adapted to be executed by the processor 620 to perform at least one embodiment of the present invention.

The credit card processing system device 610 communicates with the purchasing system device 310 and the retailer device 410 using the communication port 640.

As shown in FIG. 6, the storage device 630 also contains an issuer database 2000 (described in detail with respect to FIG. 20); an issuer account database 2100 (described in detail with respect to FIG. 21); and a retailer account database 2200 (described in detail with respect to FIG. 22).

One embodiment of the present invention is directed to the use of a pseudo payment identifier, such as a pseudo credit card number, as a redemption code. In the conventional credit card market, each credit card issuer is assigned a unique four digit identifier. When a customer uses a credit card at a retailer, the retailer transmits the customer's account number (a sixteen digit number) to the credit card issuer through a CAT to authorize the purchase. The retailer authorizes: (i) that the customer has an account with the issuer that is in good standing (e.g., the card has not been reported stolen); and (ii) there is enough available funds in the account to cover the present purchase. The retailer sends the purchase amount, the credit card number, and the retailer identifier along with the request for authorization. The request for authorization is transmitted to a credit card processing system that determines the issuer of the credit card account (using the first four digits of the account number), and, in many cases, forwards the request for authorization to the appropriate issuer. The issuer checks the account, based on the account number received, and sends an approval or denial signal to the credit card processing system, which forwards the signal to the retailer. If the transaction is approved, the issuer may also place a "freeze" on the amount of funds in the customer's account equal to the transmitted purchase amount. As used here, a freeze is any pre-authorization of a charge that will be made to the buyer's account at a later time.

Note that the customer's account has not been actually charged at this point. Subsequently, on a periodic basis (e.g. once per night or week), the retailer sends a Record of Charge (ROC) to the credit card processing system, which transmits the ROC to the appropriate issuer for collection of funds. The credit card processing system transmits the funds received from the issuer to the retailer, and the issuer charges the appropriate customer accounts for the appropriate amounts, based on the received ROC. That is, the freeze or authorization for the purchase amount is removed from the account and replaced with an actual charge. The actual charge may be less than the authorized amount (e.g., the retailer may have authorized more than the actual purchase amount).

Note that the participating retailers may not have a direct (e.g., Internet) connection to the purchasing system. According to one embodiment of the present invention, the retailer uses the credit card networks and methods described above to authorize a redemption code.

For example, the purchasing system may register with the credit card processing system as an issuer, and be assigned a unique four digit code. The purchasing system then issues redemption codes that are in the format of a conventional sixteen digit credit card account code, with the first four digits identifying the purchasing system. When a customer arrives at a retailer to take possession of a product, the retailer enters the redemption code into the CAT as if it was a conventional credit card account number. The retailer transmit the redemption code and an appropriated retailer identifier to a credit card processing system. The credit card processing system recognizes that the purchasing system is the "issuer" of the card (by the first four digits of the redemption code) and transmits a request for authorization to the purchasing system, including the redemption code and the retailer identifier. The purchasing system retrieves the buyer's record, based on the received redemption code, and checks to see whether the redemption code is valid (e.g. has been issued but not yet redeemed), and that the received retailer identifier identifies one of the retailer identifiers stored in association with the redemption code. If so, the purchasing system marks the redemption code as "redeemed" and transmits an approval, or authorization, signal to the credit card processing system, which then forwards it to the retailer. When the retailer receives the authorization, the buyer is authorized to take possession of the product. The retailer may also store the redemption code, product identifier, and other transaction data for subsequent settlement with the purchasing system.

According to another embodiment of the present invention, the retailer treats the purchasing system voucher as a ROC. That is, the retailer periodically sends redeemed purchasing system vouchers to the credit card processing system for collection of funds. The credit card processing system forwards both conventional ROCs and purchasing system vouchers to the appropriate issuer as indicated by account identifiers. Accordingly, the credit card processing system forwards the purchasing system vouchers to the purchasing system.

When the purchasing system receives a voucher, it charges the buyer's account as appropriate. According to one embodiment, the purchasing system freezes the funds in the buyer's account upon accepting the buyer's offer and does not charge the account until it receives the voucher from the retailer. Alternatively, the purchasing system charges the buyer's account: (i) when the buyer's offer is approved; or (ii) when the request for authorization is received from a retailer. The purchasing system transfers the appropriate amount of funds to the retailer (e.g. the total of the settlement prices for the products included on the received vouchers). If necessary, the purchasing system may also collect or transmit funds to the manufacturer at this time.

Note that a retailer may want to determine the validity of a voucher at the POS to prevent fraudulent use, such as over-redemption of a voucher, by unscrupulous buyers. For example, consider a buyer who establishes a $200 price with a manufacturer for a television. A hold is put on the buyer's credit card for $200, and a voucher for the television is issued to the buyer. The buyer prints out three copies of the voucher and redeems all three at various retailers, and each of the retailer settles with the purchasing system device 310 off-line or through a back channel at the end of the day. The purchasing system device 310 determines that it now owes the retailers an additional $400 (for the two additional, unauthorized transactions). However, the purchasing system device 310 may find that the additional $400 charge cannot be authorized because the buyer is over his or her credit limit. One advantage of the embodiments of the present invention that utilize the banking network to verify redemption codes is that a retailer can verify a redemption code at the POS without additional equipment other than what the retailer typically uses in conventional transactions. According to this embodiment, the retailer may communicate with the purchasing system 310 at the time of redemption over the existing banking network using a CAT that is typically connected to each POS at the retailer. Of course, the retailer may instead communicate directly with the purchasing system at the time of redemption through other networks, such as the Internet. Note also that each issued and outstanding pseudo credit card number redemption code may be associated with a unique transaction, and, according to one embodiment of the present invention, the purchasing system device 310 tracks available pseudo credit card numbers. In another embodiment, a printed voucher may include: (i) the issued redemption code in the format of a payment number; (ii) the product identifier and description; and (iii) the retailers at which the redemption code is redeemable. Note that a redemption code may be associated with either a single retailer or a number of retailers.

Product Database

As will now be described, FIG. 7 is a tabular representation of a portion of a product database 700 that may be stored at the purchasing system device 310 (as described with respect to FIG. 3) according to an embodiment of the present invention. The table 700 includes entries defining products that may be sold through the purchasing system. The table 700 also defines fields 702, 704, 706, 708 for each of the entries. The fields specify: a product identifier 702; a minimum acceptable price 704; a seller identifier 706; and a retailer identifier 708. Those skilled in the art will understand that the table 700 (as well as the other tables discussed herein) may include any number of entries and fields and data arrangements other than that described with respect to FIG. 7 (as well as described with respect to the other FIGS. included herein).

The product identifier 702 may be, for example, an alphanumeric field that uniquely identifies each product available through the purchasing system. The product identifier 702 may identify a specific product (e.g., a particular television), a specific type of product (e.g., a particular product manufacturer and model number), or a plurality of products that fulfill a product requirement (e.g., televisions with 25" to 27" screens).

The minimum acceptable price 704 is the amount below which the product will not be sold. The minimum acceptable price 704 may be set by the seller or by the purchasing system, based on, for example, the settlement price and a subsidy amount provided by the seller. The minimum acceptable price may be used, for example, by a product manufacturer to protect against brand name dilution.

The seller identifier 706 may be, for example, an alphanumeric field that uniquely identifies the seller of the product, and the retailer identifier 708 may be an alphanumeric field that uniquely identifies one or more retailers at which a buyer can take possession of the product associated with the product identifier 702. The retailer identifier 708, which may be provided by the seller, can represent retail stores at which a product is usually available. The retailer identifier may, for example, identify a particular retailer store (e.g., based on retailer name and address) or may identify a chain of sores (e.g., just name, regardless of address). The purchasing system may also generate this list by asking a retail store which products are available at that store. The list could also be based on, for example, the product category (e.g., televisions should be available at a consumer electronics superstore) or historical inventory patterns and trends of known retailers. The list could be based on which retailers have agreed to let purchasing system buyers take possession of the product (corresponding to the product identifier) in exchange for a settlement price. The list could further include retailers who have agreed to act as sellers of the corresponding product. For example, product "132-01" can be obtained at any of the five retailers listed in the retailer identifier 708 (i.e., in the first two records).

According to another embodiment of the present invention, the seller (e.g., the product manufacturer) may also provide a subsidy amount (not shown in FIG. 7). Note that both the purchasing system and the manufacturer may have a minimum acceptable price associated with a product. In this case, both prices may be stored or only the higher of the two prices may be stored.

It should be noted that some products may be picked up at one of several retailers, as indicated by the multiple entries in the retailer identifier field 708. However, if the retailer is the seller, the retailer identifier field may only contain a single entry for that retailer (as shown in the second entry in the table 700).

It should be noted that product "P132-01" has two different associated minimum selling prices, one associated with a retailer seller and one associated with a manufacturer seller (as shown in by the first two entries in the table 700). If the purchasing system generates revenue from the margin between the buyer's price and the settlement price, a buyer offer may be accepted using the lowest possible minimum acceptable price 704. Considering product "P132-01", for example, if a buyer names a price of $200 and one seller has an associated minimum acceptable price 704 of $110 and another seller has a minimum acceptable price 704 of $190, the purchasing system may accept the buyer offer using the seller with the $110 minimum selling price, because that may increase the purchasing system's profit.

The minimum acceptable price 704 may be set by the purchasing system in another embodiment of the present invention based on, for example, the settlement price(s) associated with the product and any subsidy amounts associated with the product. For example, a product having a settlement price of $200 and a subsidy amount of $20 may be assigned a minimum acceptable price 704 of $220.

Subsidy Database

Referring to FIG. 8, a table 800 represents an embodiment of the subsidy database that may be stored at the purchasing system device 310 (FIG. 3). The table 800 includes entries defining products that may be sold through the purchasing system. The table 800 also defines fields 802, 804, 806 for each of the entries. The fields specify: a product identifier 802; a subsidy amount 804; and a seller identifier 806.

In addition to the product identifier 802 (which may be based on, or similar to, the product identifier 702 described with respect to FIG. 7) and the seller identifier 806 (which may be based on, or similar to, the product identifier 706 described with respect to FIG. 7), the table 800 includes the subsidy amount 804 the seller is willing to provide to the purchasing system to subsidize a buyer's purchase of the product. For example, the seller "S13204" shown in FIG. 8 will provide $50 towards a buyer's purchase of a product with the identifier of "P132-01."

Note that a product may be available from different sellers who provide different subsidy amounts. Note also that a seller may in fact offer no subsidy amount for a product. In this case, the product/seller may not be stored in the subsidy database—or may be stored with a subsidy amount 804 of "$0." The seller may also, according to one embodiment of the present invention, provide a maximum subsidy amount per period of time (e.g., $50 per purchase up to $5,000 per month). This information could be tracked by the purchasing system device 310.

According to one embodiment of the present invention, the purchasing system may not need to use all of a subsidy amount (including a subsidy amount from a seller or a third party subsidy amount) to arrange for a buyer to purchase a product. In this case, the portion of the subsidy amount that is not needed may be, for example, kept by the purchasing system (e.g., for an additional profit) or provided to the buyer. According to another embodiment, the portion of the subsidy amount that is not needed for the present transaction may be placed into an account associated with the buyer. In this way, the buyer may be allowed to use this extra amount to subsidize another purchase made through the purchasing system.

Note also that a seller may set a minimum acceptable price (e.g., to prevent name brand dilution) and yet still agree to provide subsidies toward purchases of the product to increase sales volume.

Settlement Price Database

Referring to FIG. 9, a table 900 represents an embodiment of the settlement price database that may be stored at the purchasing system device 310 (FIG. 3). The table 900 includes entries defining products that may be sold through the purchasing system. The table 900 also defines fields 902, 904, 906 for each of the entries. The fields specify: a product identifier 902; a retailer identifier 904; and a settlement price 906.

In addition to the product identifier 902 (which may correspond to, be based on, or similar to, the product identifier 702 described with respect to FIG. 7), the table 900 includes the retailer identifier 904 which uniquely identifies a retailer at which the product is, or should be, available and a settlement price 906 representing the amount that must be provided to the retailer in exchange for providing the corresponding product to the buyer. For example, $150 must be provided to the retailer "R218-99" shown in FIG. 9 in exchange for providing a product with the identifier of "P132-01" to a buyer. Note that a product may be available from different retailers who require different settlement prices.

According to an embodiment of the present invention, the purchasing system device 310 uses this database to determine the amount of payment to be provided to the retailer at which a buyer took possession of a product. In other embodiments, this database may be used by the purchasing system device 310 to select retailers, such as to determine the lowest settlement price associated with a product. For example, if a buyer offer price of $175 was accepted by the manufacturer and retailer A has an agreement to receive $200 for the offered product, while retailer B has an agreement to receive $210, the purchasing system device 310 may determine that the buyer may only take possession of the product at retailer A to minimize the loss to the manufacturer—and possibly to boost revenue earned by the purchasing system for its role as a transaction facilitator.

Note that in addition to an arrangement between the retailer and the purchasing system to specify, for example, a product and the settlement price, the retailer may also have an arrangement directly with a product manufacturer. An arrangement between a retailer and a manufacturer may specify an additional subsidy amount that the manufacturer will provide to the retailer for one or more of the manufacturer's products. This, of course, could result in the retailer agreeing to accept a lower settlement price from the purchasing system.

By way of example, consider a retailer that typically sells a particular manufacturer and model television for a retail price of $200. The retailer can enter into an agreement with the purchasing system to honor vouchers for that television in exchange for a settlement price of $180. The retailer might agree to accept $180 to increase sales, or potential sales, from buyers sent to store by the purchasing system.

The retailer may also make an agreement with the television manufacturer to receive $10 for each television provided to a buyer when a redemption code is redeemed. The manufacturer may, for example, provide such a subsidy to encourage the retailer to agree to a lower settlement price with the purchasing system—increasing the likelihood that the television will be sold through the purchasing system device 310. Note that the settlement price does not need to be less than the retail price, and the manufacturer could provide a subsidy directly to the purchasing system instead of, or in addition to, the retailer.

Figure 10:
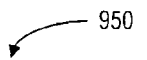
FIG. 10 is a tabular representation of portions of the product, subsidy and settlement price databases according to an embodiment of the present invention.
Figure 10:
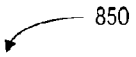
Figure 10:
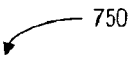

FIG. 10 illustrates the first record 750 from the product database 700, the first record 850 from the subsidy database 800, and the first four records 950 from the settlement price database 900, to illustrate how a minimum acceptable price may be calculated by the purchasing system device 310.

As shown in the subsidy database record 850, the subsidy amount for the product "P132-01" is $50. As shown in the product database records 950, the settlement prices from various retailers for this product are $150, $145, $160, and $150. Thus, the highest settlement price the purchasing system may have to provide to a retailer for the product is $160. If a buyer takes possession of the product at retailer "R084-34," the purchasing system may need $110 from the buyer to break even on the sale (i.e., $110 from the buyer+ $50 subsidy from the manufacturer=$160, which is the settlement price for retailer "R084-34). Accordingly, the purchasing system device 310 set the minimum acceptable price at $110 as shown in the product database record 750. If the buyer takes possession of the product at retailer "R218-99," "R982-19" or "R753-93," the purchasing system would derive a profit of $10, $15, and $10, respectively (assuming the purchasing system keeps the difference).

According to one embodiment of the present invention, the purchasing system only collects an amount required to break even on the transaction (although a separate commission fee may be charged). Thus, the purchasing system may not collect the entire subsidy amount available from the seller, but instead collect only as much as the purchasing system needs to avoid a loss. In other words, the subsidy amount may be a maximum subsidy amount that the purchasing system may collect.

The purchasing system may even determine that a loss is acceptable on some transactions, and thus lower the minimum acceptable price. The purchasing system may, for example, determine the minimum acceptable price based on an average or lowest settlement price.

Retailer Database

Referring to FIG. 11, a table 1100 represents an embodiment of the retailer database that may be stored at the purchasing system device 310 (FIG. 3). The table 1100 includes entries defining a particular retailer at which a buyer make take possession of a product purchased through the purchasing system. The table 1100 also defines fields 1102, 1104, 1106, 1108 for each of the entries. The fields specify: a retailer identifier 1102; a retailer name 1104; a retailer type 1106; and a retailer address 1108.

The retailer database 1100 may be used by the purchasing system device 310 to retrieve information about a retailer. In particular, the retailer database 1100 may store identifiers and contact information of retailers, as well as the retailer type 1106 reflecting whether only a single store (as opposed to or all stores) in a chain participate in the purchasing system program. According to another embodiment of the present invention, instead of indicating which individual stores in a chain participate, the retailer database 1100 may store an indication which stores in a chain do not participate, or store a separate table of all available stores in a chain.

The purchasing system device 310 can use this database, for example, to retrieve retailer contact information to be printed on the voucher. The information may be also used to determine if a retailer is close enough to a buyer to be included on the voucher, using algorithms which are well known in the art.

Seller Database

Referring to FIG. 12, a table 1200 represents an embodiment of the seller database that may be stored at the purchasing system device 310 (FIG. 3). The table 1200 includes entries defining a seller that sells products through the purchasing system. The table 1200 also defines fields 1202, 1204, 1206 and 1208 for each of the entries. The fields specify: a seller identifier 1202; a seller name 1204; a seller type 1206; and a seller address 1208.

The purchasing system device 310 may use the seller database 1200 to determine the seller type (i.e., whether the seller is a manufacturer or a retailer) and other information pertaining to a seller (such as the seller address for offer routing purposes or billing).

The seller database 1200 may be used, for example, to determine whether a number of settlement prices (in the case of a manufacturer seller type) or a single price (associated with a retailer seller type) should be used when determining whether or not a buyer offer will be accepted. In addition, when the purchasing system authorizes a retailer to provide a product to a buyer, this database may be used to determine whether or not the seller is the retailer (such as by using the seller type 1206). In the case of a seller other than the retailer, the settlement price is provided to the retailer. On the other hand, when the retailer also acted as the seller, a seller price (which may be based on, or equal to, the first price) may instead be provided to the retailer. If the seller was a retailer—but not the same retailer at which the buyer took possession of the product—the settlement price may still be provided to the retailer at which the buyer took possession of the product.

Accepted Offer Database (Stored at Purchasing System Device)

Figure 13A:

Referring to FIGS. 13A and 13B, a table 1300 represents an embodiment of the accepted offer database 1300 that may be stored at the purchasing system device 310 (FIG. 3). The table 1300 includes entries defining a transaction (i.e., a buyer's purchase of a product through the purchasing system). The table 1300 also defines fields 1301, 1302, 1304, 1306, 1308, 1310, 1312, 1314, 1316, 1317, 1318, 1320, 1322, 1324 for each of the entries. The fields specify: an offer identifier 1301; a redemption code 1302; a buyer name 1304; a buyer e-mail address 1306; a buyer postal address 1308; a buyer's price 1310; an offer status 1312; a seller identifier 1314; an authorized retailer identifier 1316; a redemption retailer identifier 1317; a product identifier 1318; an authorized amount 1320; a charged amount 1322; and a payment identifier 1324.

When a buyer offer is accepted by a seller, or fulfilled by the purchasing system, the purchasing system device 310 may communicate the acceptance to the appropriate buyer device 210 and store the details of the accepted offer in the accepted offer database 1300. For example, the offer identifier 1301, the redemption code 1302, the buyer name 1304, the buyer e-mail address 1306, the buyer postal address 1308, the buyer's price 1310, the seller identifier 1314, the authorized retailer identifier 1316, the product identifier 1318 and the payment identifier 1324 may all be stored at this time. In addition, the offer status 1312 may be updated at this time (e.g., to "accepted").

The purchasing system device 310 may then collect payment from the buyer, such as by using the payment identifier 1324. For example, a bold may be immediately placed on the buyer's funds (e.g., authorizing a credit line of the credit card account) for the offer price and the amount authorized 1320. The buyer's account may not actually be charged, as reflected in the charged amount 1322, until the buyer takes possession of the product. The purchasing system device 310 may instead charge the buyer's account when the offer is accepted, if desired.

It should be noted that the amount of funds charged or put on hold (i.e., authorized or "frozen") may be greater than the offer price. For example, an expected sales tax, such as a tax based on the buyer's home address, may be added to the offer price. In addition, the amount of frozen funds may be greater than offer price to account for unforeseen circumstances that may subsequently occur. For example, a penalty may be imposed on the buyer if the buyer does not take possession of the product by a certain date or within a predetermined period of time. The amount of the penalty, in this case, may be based on a cost associated with shipping the product to the buyer.

As a result, in one embodiment of the present invention, if the purchasing system device 310 charges the buyer's account when the offer is accepted, the charged amount 1322 may not be correct based on the actual redemption conditions of the transaction at the retailer. For example, the retailer may determine that the buyer has waited too long to take possession of the product and a penalty amount needs to be assessed to the buyer. In this case, the purchasing system device 310 may place an additional charge on the buyer's account to correct the amount.

In another example, the buyer may arrive at the retailer to take possession of a product purchased through the purchasing system only to realize that the retailer is currently offering the product at a clearance price below the first price (e.g., the price the buyer agreed to pay for the product through the purchasing system). The purchasing system may have not been aware of the retailer's plans to offer the product at the clearance price which the first price was established with the buyer. In such a case, the purchasing system may determine the difference between the clearance price and the first price and refund the buyer the difference (plus any resulting difference in the sales tax). The settlement system may provide such a refund to the customer by placing a credit equal to the difference (and any difference in sales tax) onto the buyer's financial account that was originally charged for the purchase.

If any penalty is imposed on the buyer the penalty amount could be disbursed to, for example: (i) the settlement system; (ii) the retailer at which the buyer takes possession of the product; (iii) the retails at which the buyer could have taken possession of the product; (iv) the seller (e.g., a product manufacturer); or (v) any combination thereof.

According to an embodiment of the present invention, collecting payment (based on the actual redemption conditions) may comprise charging the offer price using the payment identifier 1324 (e.g., associated with a credit card account, debit account, checking account or electronic currency protocol) provided with the buyer offer. According to another embodiment, the appropriate amount is charged to a financial account provided by the buyer at the retailer (which may be different from the payment identifier stored in this database) when the buyer takes possession of the product.

Note that when a buyer goes to a retailer to take possession of a product, it is possible that he or she will find that the retailer's in-store price is less than the price arranged with the purchasing system (e.g., the item may be on sale). In this case, the purchasing system can guarantee, if desired, the buyer that he or she will be charged the lower of the two prices. Thus, the purchasing system device 310 may compare the product's retail price at the time of redemption with the buyer's price 1310, and make sure that the buyer's financial account is only charged the lower of the two prices. In the case where the buyer was charged for the product at the time the sale was arranged with the purchasing system, the purchasing system may credit the difference back to the buyer's account.

Additionally, the purchasing system device 310 may distribute payment, such as by using an Electronic Fund Transfer (EFT) transaction, to the retailer that provided the product to the buyer (i.e., one of the retailers listed in the authorized retailer identifier 1316) when the purchasing system receives an indication that the buyer has taken possession of the product. If the buyer offer was accepted by a seller (besides the retailer), the purchasing system device 310 can also collect any payment necessary (e.g., a subsidy from the manufacturer). For example, this may be the case when the amount paid to the retailer by the purchasing system exceeds the buyer's price 1310.

The purchasing system device 310 might also collect an additional payment from the seller as a "commission fee" for handling the offer. Such a commission fee could, of course, comprise a fixed percentage of the buyer price (or seller, settlement or retail price) and/or a flat fee.

The purchasing system device 310 may also track the fulfillment, acceptance, and redemption of buyer offers. According to the present invention, the purchasing system device 310 collects and disburses payment for products sold through the system as appropriate. For example, the purchasing system device 310 may: (i) collect payment from a buyer when the buyer's offer is fulfilled by a seller; (ii) disburse payment for the product to the retailer at which the redemption code is redeemed; and (iii) collect a commission fee from the seller that accepted the buyer's offer.

Because a particular redemption code may be redeemable at several retailers, the disbursement of payment may be finalized once the buyer takes possession of the product at a local retailer. That is, when the purchasing system device 310 determines that the buyer has taken possession of the product (e.g., a retailer notifies the purchasing system device 310, either in substantially real time or periodically, of the redemption codes that have been redeemed in their stores), the collection and disbursement of funds between the appropriate parties is finalized and the offer status 1312 is updated as appropriate (e.g., to "redeemed" for the redemption code 1302).

Note that, as illustrated in FIGS. 13A and 13B, the buyer's price 1310 (e.g., the price the buyer established when arranging to purchase the product to the purchasing system) may be different than the authorized amount 1320. For example, the transaction having an offer identifier 1301 of "O332-001" involved a buyer's price of $300 and an authorized amount of $330. The extra $30 may act as a cushion against conditions, unforeseen at the time the buyer established the price, that may exist when the buyer takes possession of the product (e.g., the an unexpected tax amount). Similarly, the charged amount 1322 of $319.50 may be yet another amount, based on the conditions that actually existed when the buyer took possession of the product. Note that, in the embodiment where the buyer is charged at the time of acceptance of a buyer offer, instead of an "authorized amount" and "charged amount" an "initial charged amount" and "final charged amount" may be stored instead.

Retailer Account Database (Stored at Purchasing System)

Referring to FIG. 14, a table 1400 represents an embodiment of the retailer account database that may be stored at the purchasing system device 310 (FIG. 3). The table 1400 includes entries defining a retailer at which a buyer may take possession of a product purchased through the purchasing system. The table 1400 also defines fields 1402, 1404, 1406, 1408, 1410, 1412 for each of the entries. The fields specify: a retailer identifier 1402; a total paid by, to date 1404; a total paid to, to date 1406; a current amount owed by 1408; a current amount due to 1410; and a last billing date 1412.

The retailer account database 1400 may be used by the purchasing system device 310 to track how much has been paid by 1404 the corresponding retailer to the purchasing system, to date, and how much has been paid to 1406 the corresponding retailer from the purchasing system, to date. For example, the retailer having a retailer identifier 1402 of "R192-05" has paid a total of $53,250 to the purchasing system "to date" (e.g., since participating in the purchasing system or the beginning of the current financial year). Moreover, the purchasing system has paid a total of $723,900 to that retailer during this time.

The retailer account database 1400 may also be used to track how much is currently owed by 1408 the corresponding retailer to the purchasing system in relation to the last billing date 1412. This amount may be computed, for example, by totaling the amounts related to each completed purchasing system transaction involving that retailer. Likewise, the retailer account database 1400 may be used to track how much is due to 1410 the corresponding retailer from the purchasing system in relation to the last billing date 1412. Of course, the current amount owed by 1408 and current amount due to 1410 may be associated with different last billing dates, if appropriate. The last billing date 1412 may reflect, for example, monthly, weekly or hourly billing.

In general, the purchasing system device 310 tracks the total of settlement prices for redeemed redemption codes or buyer prices with respect to each retailer (for those transactions where the retailer is the seller). Note that an account with a retailer may instead be settled on a per-transaction basis when the buyer takes possession of the product (e.g., in substantially real time).

Note that instead of having, for example, both the current amount owed by 1408 and a current amount due to 1410 amounts, the purchasing system may instead simply track a "settlement amount" for each retailer that reflects, for example, a positive value when money is due to the retailer and a negative value when money is due to the purchasing system.

Seller Account Database

Referring to FIG. 15, a table 1500 represents an embodiment of the seller account database that may be stored at the purchasing system device 310 (FIG. 3). The table 1500 includes entries defining a seller that may sell a product to a buyer through the purchasing system. The table 1500 also defines fields 1502, 1504, 1506, 1508, 1510, 1512 for each of the entries. The fields specify: a seller identifier 1502; a total paid by, to date 1504; a total paid to, to date 1506; a current amount owed by 1508; a current amount due to 1510; and a last billing date 1512.

The seller account database 1500 may be used by the purchasing system device 310 to track how much has been paid by 1504 the corresponding seller to the purchasing system, to date, and how much has been paid to 1506 the corresponding seller from the purchasing system, to date. For example, the seller having a seller identifier 1502 of "S23456" has paid a total of $567,890 to the purchasing system "to date" (e.g., since participating in the purchasing system or the beginning of the current financial year). Moreover, the purchasing system has paid a total of $55,670 to that seller during this time.

The seller account database 1500 may also be used to track how much is currently owed by 1508 the corresponding retailer to the purchasing system in relation to the last billing date 1512. This amount may be computed, for example, by totaling the amounts related to each completed purchasing system transaction involving that seller. Likewise, the seller account database 1500 may be used to track how much is due to 1510 the corresponding seller from the purchasing system in relation to the last billing date 1512. Of course, the current amount owed by 1508 and current amount due to 1510 may be associated with different last billing dates, if appropriate. The last billing date 1512 may reflect, for example, monthly, weekly or hourly billing.

In general, the purchasing system device 310 tracks the total of seller amounts for redeemed redemption codes. Note that an account with a seller may instead be settled on a per-transaction basis when the buyer takes possession of the product (e.g., in substantially real time).

Pricing Database

Referring to FIG. 16, a table 1600 represents an embodiment of the pricing database that may be stored at the retailer device 410 (FIG. 4). The table 1600 includes entries defining a particular product that may be sold through the purchasing system. The table 1600 also defines fields 1602, 1604, 1606 for each of the entries. The fields specify: a product identifier 1602 (which may be the same identifier used by the purchasing system device 310 or a different identifier); a retail price 1604; and a settlement price 1606.

The pricing database 1600 may be used by the retailer device 410 to determine the retail price 1604 and the settlement price 1606 for each product. In general, the settlement price may 1606 be less than, equal to, or more than the retail price 1604 for a product. The settlement price 1606 may also be based on the retailer price 1604 (i.e., 95% of the retail price for products having a retail price less than $100 and 90% for all other products). In this case, a separate settlement price field 1606 may not be needed or may instead be used to store a formula (e.g., settlement price= 1.01×retail price).

The pricing database 1600 may be used by the retailer, for example, to determine the price to be charged to a typical buyer (i.e., the retail price 1604) and the price to be expected from the purchasing system in exchange for providing the product to a buyer when taking possession of a product (i.e., the settlement price) 1606. Whether the retailer will receive the settlement price 1606 may also depend on whether the retailer is acting as the seller.

Accepted Offer Database (Stored at Retailer Device)

Referring to FIG. 17, a table 1700 represents an embodiment of the accepted offer database 1700 that may be stored at a retailer device 410 (FIG. 4). The table 1700 includes entries defining accepted buyer offers wherein the retailer is the seller. The table 1700 also defines fields 1701, 1702, 1704, 1706, 1708 for each of the entries. The fields specify: an offer identifier 1701; a redemption code 1702; a product identifier 1704; a buyer's price 1706; and a status 1708.

Each time the retailer accepts a buyer's offer as a seller, the offer identifier 1701, the redemption code 1702, the product identifier 1704, and the buyer's price (e.g., "first price") 1706 are stored in this database. The status 1708 may also be set to "pending" at this time. The database 1700 may be populated directly by the purchasing system device 310 (e.g., every time a buyer's offer is filled with the retailer as the seller or periodically on a batch basis). This may be accomplished, for example, by periodically taking a "snapshot" of the data (e.g., every 15 minutes) and storing the data regarding filled offers to accepted offer database 1700. According to another embodiment, purchasing system device 310 may automatically e-mail the retailer device 410 as needed with each newly accepted offer so that the retailer device 410 can update this database.

The retailer may use this database, for example, when a redemption code is received from a buyer taking possession of a product using a purchasing system voucher. The retailer device 410 creates a new record in the purchasing system account database 1800 (described with respect to FIG. 18) each time a purchasing system redemption code is redeemed. The retailer device then determines the amount owed by the purchasing system in exchange for honoring the voucher. If the retailer was the seller associated with a particular voucher, the amount provided to the retailer is based on the buyer's price. Thus, the retailer device 410 checks the accepted offer database 1700 to determine whether the retailer has accepted the buyer's price associated with the redemption code of a given transaction. If not, the purchasing system provides the settlement price for the product to the retailer.

Purchasing System Account Database

Referring to FIG. 18, a table 1800 represents an embodiment of the purchasing system account database that may be stored at a retailer device 410 (FIG. 4). The table 1800 includes entries defining a transaction in which a buyer took possession of a product, purchased through the purchasing system, at a retailer. The table 1800 also defines fields 1802, 1804, 1806, 1808, 1810 for each of the entries. The fields specify: a retailer transaction identifier 1802; a redemption identifier 1804; a product identifier 1806; an expected payment 1808; and a payment status 1810.

The retailer transaction identifier 1802 may be, for example, a unique alphanumeric string that identifies a purchasing system transaction. As illustrated in FIG. 18, payment for the transaction having a retailer transaction identifier 1802 of "TR-000-333-111" has been "received." Moreover, with respect to this transaction, a payment of $200 is expected in exchange for the transaction involving the product having a product identifier of "1806."

The retailer device 410 stores information regarding each redeemed purchasing system redemption code. For example, the amounts stored in the expected payment field 1808 which have a corresponding payment status 1810 of "pending" may be totaled when the retailer sends a "bill" to the purchasing system for funds that are due to the retailer (e.g., directly or through a credit card processing system).

Seller Product Database

Referring to FIG. 19, a table 1900 represents an embodiment of the seller product database that may be stored at a seller device 510 (FIG. 5). The table 1900 includes entries defining a product sold by the seller through the purchasing system. The table 1900 also defines fields 1902, 1904, 1906 for each of the entries. The fields specify: a product identifier 1902; a subsidy amount 1904; and a quantity sold 1906.

The product identifier 1902 may be, for example, a unique alphanumeric string that identifies a product sold through the purchasing system. The subsidy amount 1904 may be a number reflecting the amount of subsidy a seller has agreed to provide towards the sale of a product. The quantity sold 1906 may be a number reflect the number of products that have been sold through the purchasing system.

According to one embodiment of the present invention, the seller uses this database to track the subsidy amounts 1904 it has agreed to provide to the purchasing system. According to another embodiment of the present invention, the seller may use this database to determine whether or not to accept a buyer's offer (especially if a manufacturer seller has knowledge of the retail price of a given product).

For example, in one embodiment of the present invention, the buyer offers may be routed to the sellers that determine whether or not to accept them. In this case, the subsidy amount 1904 may be stored locally at the seller devices 510 and the purchasing system may not be aware of the subsidy amounts 1904 the seller is willing to provide. Also, in this case the seller may indicate to the purchasing system what product could potentially be used to fulfill the offer (e.g., by sending an appropriate product identifier to the purchasing system). In response to that the purchasing system may retrieve the settlement price(s) for the product, based on the product identifier, and inform the seller of the maximum seller amount or subsidy amount that may be required. The maximum seller amount or subsidy amount may be based on the highest settlement price the purchasing system may have to provide to a retailer, depending on the retailer at which the buyer elects to take possession of the product. The seller may then, based on this maximum seller or subsidy amount, determine whether or not to accept the buyer offer. The seller may make this determination by, for example, comparing the maximum seller amount or subsidy amount received from the subsidy amount 1904 stored in the database 1900 and accepting the buyer's offer if the maximum subsidy amount or seller amount is not greater than the subsidy amount 1904.

The quantity sold field 1906 of this database may: (i) reflect the number of units of a given product that the purchasing system has sold to date; or (ii) reflect the number of units allotted to the purchasing system (e.g., if a manufacturer limits the quantity that may be sold through the purchasing system).

Issuer, Issuer Account and Seller Account Databases (Stored at Credit Card Processing System Device)

FIGS. 20 to 22 may be used, as described with respect to FIG. 6, in a "pseudo payment identifier as redemption code" embodiment of the present invention. Referring to FIG. 20, a table 2000 represents an embodiment of the issuer database that may be stored at a credit card processing system device 610 (FIG. 6). The table 2000 includes entries defining a credit card issuer. The table 2000 also defines fields 2002, 2004, 2006 for each of the entries. The fields specify: an issuer identifier 2002; an issuer name 2004; and an issuer address 2006.

The issuer identifier 2002 may be, for example, a unique alphanumeric string associated with a credit card issuer. The issuer name 2004 may be, for example, an alphanumeric string containing the name of the credit card issuer associated with the issuer identifier 2002. The issuer address 2006 may be, for example, an alphanumeric string that may be used to communicate with the credit card issuer associated with the issuer identifier 2002.

Referring to FIG. 21, a table 2100 represents an embodiment of the issuer account database that may be stored at a credit card processing system device 610 (FIG. 6). The table 2100 includes entries defining a credit card issuer. The table 2100 also defines fields 2102, 2104, 2106 for each of the entries. The fields specify: an issuer identifier 2102; an amount owed 2104; and a payment due date 2106.

The issuer identifier 2102 may be, for example, a unique alphanumeric string associated with a credit card issuer and may or may not be based on the issuer identifier 2002 stored with respect to the issuer database 2000. The amount owed 2104 may be a number indicating an amount that is owed with respect to the credit card issuer associated with the issuer identifier 2102. The payment due date 2106 may be a date indicating the date by which payment of some or all of the amount owed 2104 may be required with respect to the credit card issuer associated with the issuer identifier 2102.

The issuer database 2000 and issuer account database 2100 may be used by the credit card processing system to identify and track how much is owed by each credit card issuer, including the purchasing system.

Referring to FIG. 22, a table 2200 represents an embodiment of the seller account database that may be stored at a credit card processing system device 610 (FIG. 6). The table 2200 includes entries defining a retailer that provides to a buyer a product purchased through the purchasing system. The table 2200 also defines fields 2202, 2204, 2206, 2208, 2210 for each of the entries. The fields specify: a retailer identifier 2202; an issuer identifier 2204; an amount due 2206; an issuer identifier 2208; and an amount due 2210.

The retailer identifier 2202 may be a unique alphanumeric string associated with a retailer. The retailer associated with the retailer identifier 2202 may have an amount due 2206, 2210 with respect to one or more credit card issuers associated with issuer identifier 2204, 2208. Of course, a due date may also be associated with each of these amounts if appropriate. The seller account database 2200 may be used by the credit card processing system to track how much is owed to each retailer from each credit card issuer, including the purchasing system.

Third Party Subsidy and Third Party Account Databases

Note that the purchasing system may receive a third party subsidy amount from a third party subsidy provider. The third party subsidy amount may be an amount provided by a third party towards a buyer's purchase of a product through the settlement system. For example, an online securities trading company may offer to contribute $30 towards a buyer's purchase of a camera if the buyer opens a trading account. Referring to FIG. 23, a table 2300 represents an embodiment of the third party subsidy database 2300 that may be stored at a purchasing system device 310 (FIG. 3). The table 2300 includes entries defining a third party that provides a subsidy towards a buyer's purchase of a product through the purchasing system. The table 2300 also defines fields 2302, 2304, 2306, 2308 for each of the entries. The fields specify: a third party subsidy identifier 2302; a third party subsidy description 2304; a third party subsidy amount 2306; and a third party identifier 2308.

The third party subsidy identifier 2302 may be a unique alphanumeric string that identifies a particular third party subsidy. The third party subsidy description 2304 may be any information (e.g., text based, graphic, audio-visual) describing the third party subsidy associated with the third party subsidy identifier 2302. The third party subsidy amount 2306 may be number associated with an amount the third party subsidy associated with the third party subsidy identifier 2302 is willing to contribute towards the buyer's purchase of a product. The third party identifier 2308 may be a unique alphanumeric string that identifies a particular third party subsidy provider that is offering the third party subsidy associated with the third party subsidy identifier 2302. Note that a single third party may be offering a number of different third party subsidies.

Referring to FIG. 24, a table 2400 represents an embodiment of the third party account database 2400 that may be stored at a purchasing system device 310 (FIG. 3). The table 2400 includes entries defining a third party. The table 2400 also defines fields 2402, 2404, 2406 for each of the entries. The fields specify: a third party identifier 2402; a third party address 2404; and an amount due from third party 2406. The third party identifier 2402 may be a unique alphanumeric string associated with a third party subsidy provider (and may or may not be based on the third party identifier 2308 described with respect to the third party subsidy database 2300). The third party address 2404 may be an alphanumeric string associated with a way of communicating (e.g., postal address, e-mail address) with the third party associated with the third party identifier 2402. The amount due from third party 2406 may be a number associated with an amount that the third party associated with the third party identifier 2402 should provide to the purchasing system (e.g., for all third party subsidy offers).

These databases 2300, 2400 track how much is owed to the purchasing system by each third party subsidy provider. The purchasing system device 310 may update this database, for example, every time: (i) a buyer accepts a third party offer or satisfies a third party condition, such as by applying for a credit card or subscribing to a magazine; or (ii) a payment is made to the purchasing system by a third party.

For example, the buyer submits an offer which includes a price of $150. Before the offer is submitted to one or more sellers, the buyer is presented with an invitation to open a credit card account, for which the buyer will receive $25 towards the current purchase. The buyer accepts the offer and fills out a credit card application online. The $25 (i.e., the amount of the third party subsidy) is added to the buyer's price by the purchasing system before an attempt is made to fill the buyer's offer. Thus, if a product exists in the product database 700 that fulfills the buyer's requirements and has an associated minimum acceptable price of $165, the buyer's offer may only be acceptable if the $25 is used. According to an embodiment of the present invention, when the buyer's offer is not accepted by the purchasing system, the $25 is not provided to the buyer in another form (i.e., the $25 is used to increase a buyer's price but is not directly paid to the buyer).

Settlement System Methods

Figure 25:
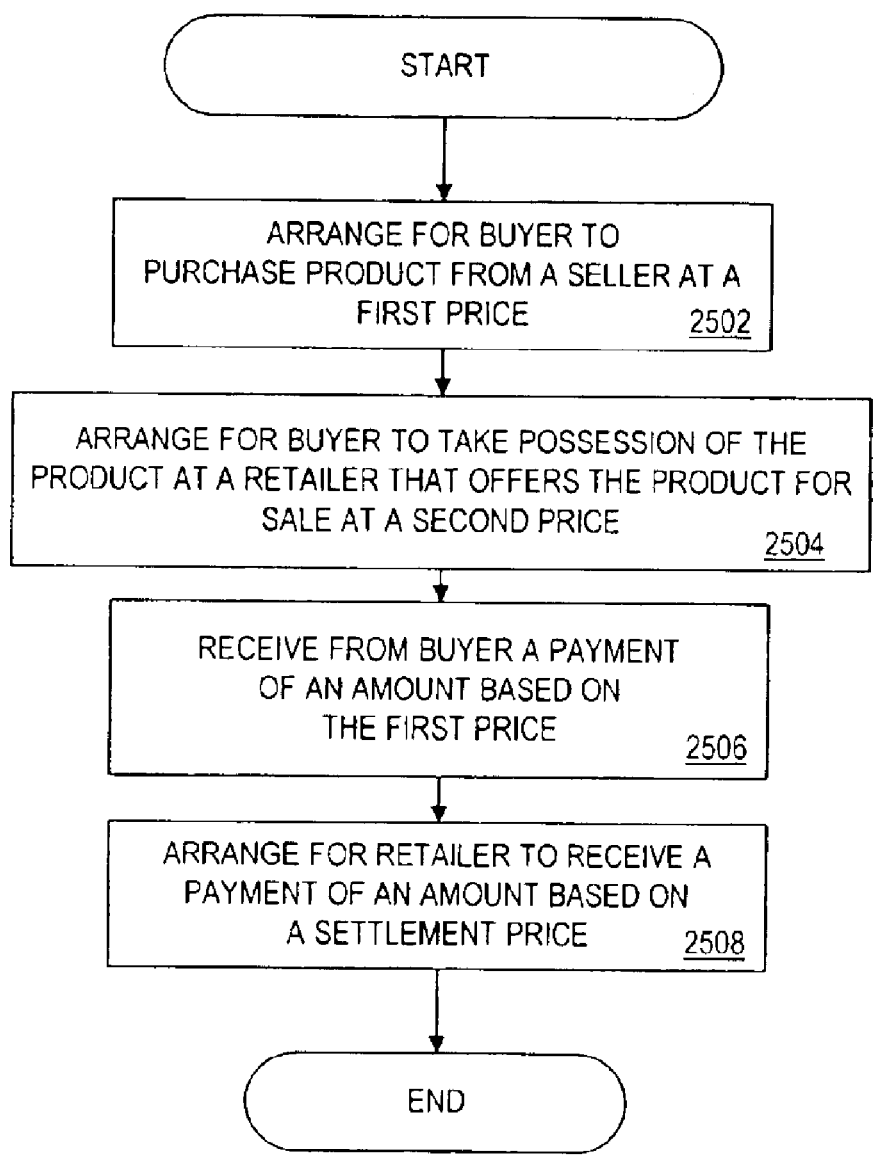
FIG. 25 is a flow chart illustrating a settlement system method in which a buyer takes possession of a product at a retailer according to an embodiment of the present invention.

FIG. 25 is a flow chart illustrating a settlement system method, with respect to the purchasing system device 310, in which a buyer takes possession of a product at a retailer according to an embodiment of the present invention. The flow chart in FIG. 25, as well as the other flow charts discussed herein, are not meant to imply a fixed order to the steps; an embodiment of the present invention can be practiced in any order that is practicable.

At 2502, the purchasing system arranges for a buyer to purchase a product from a seller at a first price, and arranges for the buyer to take possession of the product at a retailer that offers the product for sale at a second price at 2504. According to one embodiment of the present invention, the seller may be a party different from the retailer (e.g., a product manufacturer or the purchasing system itself).

The purchasing system also receives from the buyer a payment of an amount based on the first price at 2506. The actual amount received may differ from the first price if, for example, a tax, penalty or commission is imposed on the sale. At 2508, the purchasing system arranges for the retailer to receive a payment of an amount based on a settlement price. According to one embodiment of the present invention, the retailer receives this payment from the purchasing system. According to another embodiment of the present invention, the retailer receives this payment from another party, such as the seller.

Figure 26:
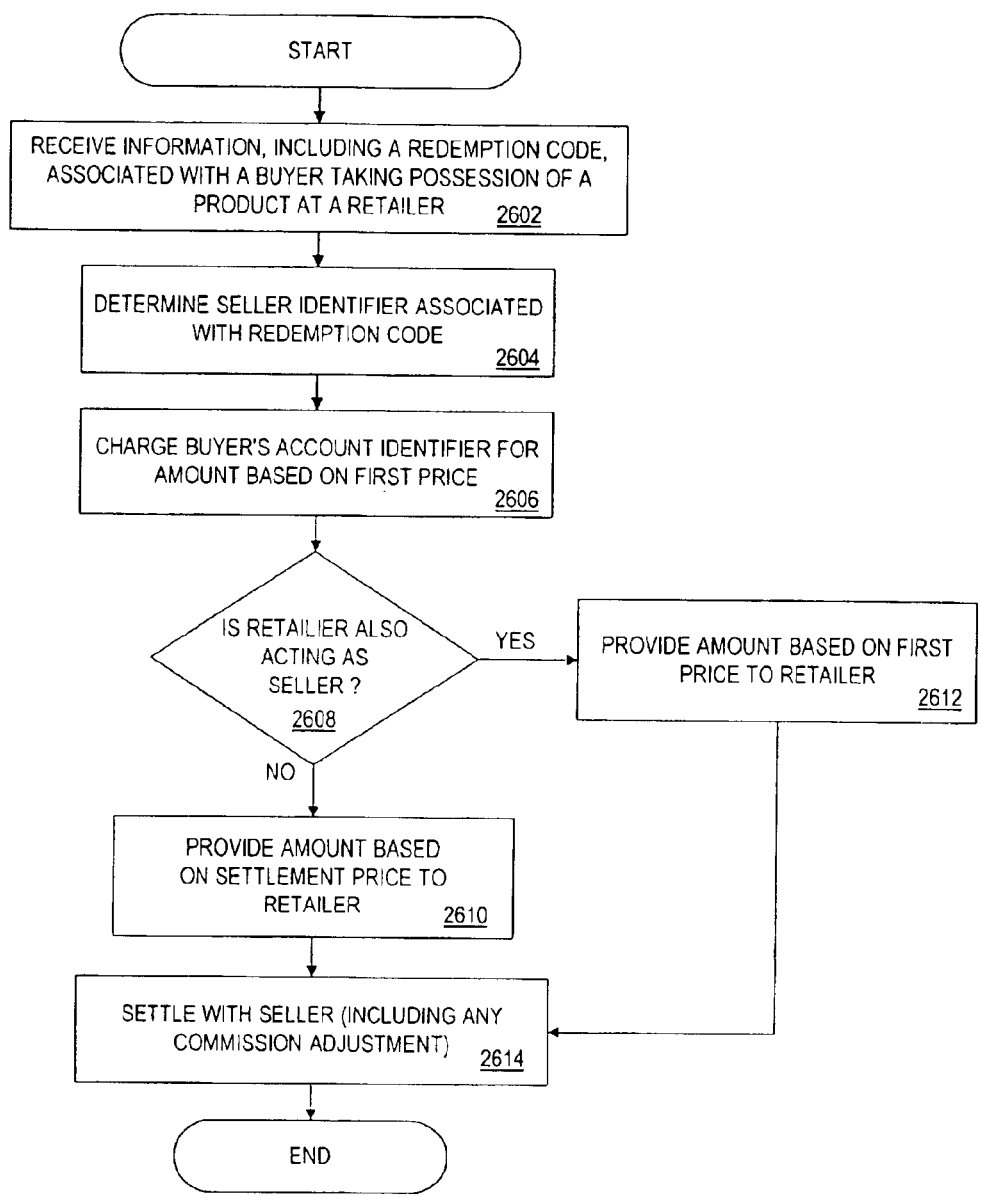
FIG. 26 is a flow chart illustrating a purchasing system method according to an embodiment of the present invention.

FIG. 26 is a flow chart illustrating a purchasing system method according to an embodiment of the present invention. At 2602, the purchasing system receives information, including a retailer identifier and a redemption code, associated with a buyer taking possession of a product at a retailer. At 2604, the seller identifier associated with the redemption code is determined, and the buyer's account identifier is charged an amount based on the first price at 2606. Additional charges, such as a sales tax and a commission, may also be applied if appropriate.

If the purchasing system determines that the seller is also the retailer at 2608, an amount based on the first price is provided to the retailer at 2612. If the seller is not the retailer at 2608, an amount based on the settlement price is provided to the retailer at 2610. According to one embodiment of the present invention, the retailer also provides a commission amount to the purchasing system (which may be subtracted from the first price or the settlement price).

The purchasing system then receives any payments and/or a commission amount from the seller at 2614 (e.g., if the first price exceeded the settlement price). Depending on the seller price, the settlement price and the buyer price (and on whether the purchasing system or seller provided a settlement price to the retailer), the purchasing system may instead provide a payment to the seller instead (e.g., if the settlement price exceeded the first price).

Figure 27A:
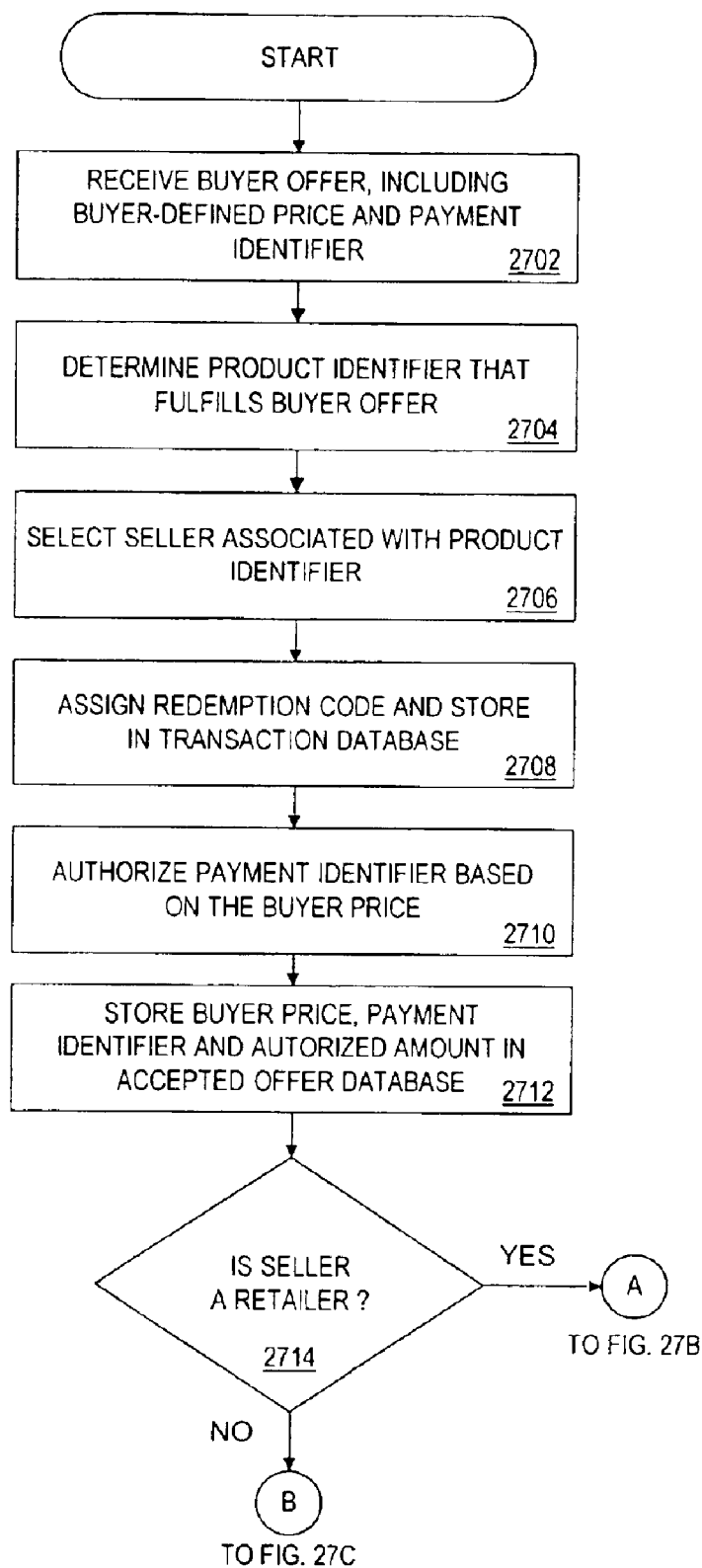
FIGS. 27A to 27C are flow charts illustrating a purchasing system method according to another embodiment of the present invention.
Figure 27B:
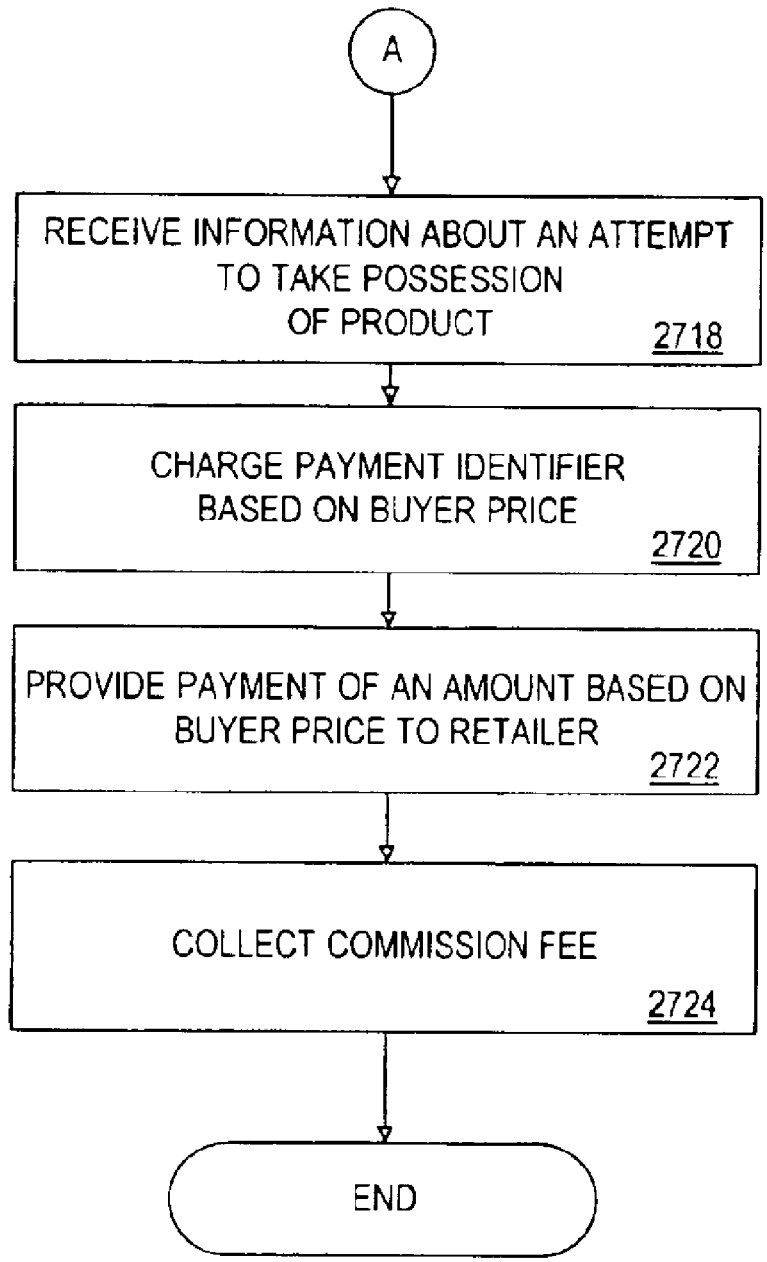
Figure 27C:
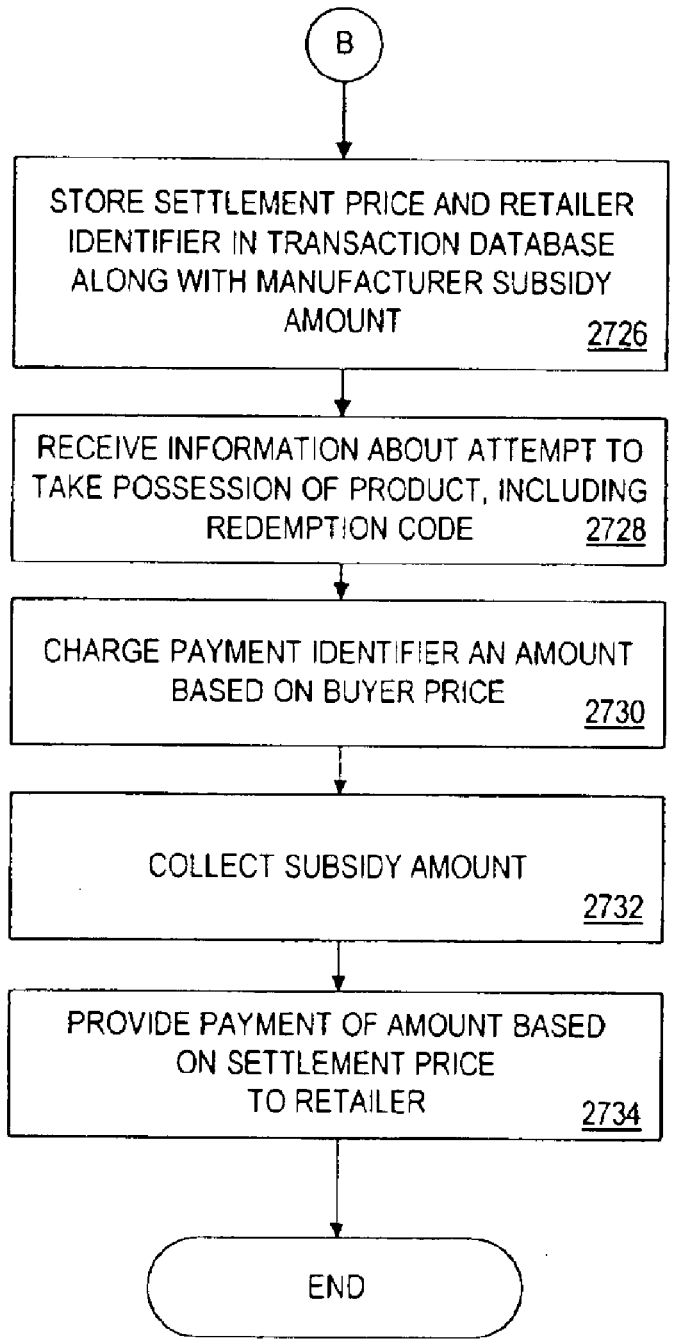

FIGS. 27A to 27C are flow charts illustrating a purchasing system method, including subsidy amounts, according to another embodiment of the present invention. At 2702, a buyer offer is received, including a buyer price and a payment identifier. The purchasing system determines a product identifier that fulfills the buyer offer at 2704 and selects a seller associated with that product at 2706.

Note that when a third party subsidy is involved in a transaction, the value of the third party subsidy may be added to the buyer's price before the purchasing system attempts to find a product that fulfilled the buyer's offer.

At 2708, a redemption code is assigned to the transaction and stored in a new record of the accepted offer database 1300 in association with the product identifier and the seller identifier. At 2710, the purchasing system authorizes the buyer's payment identifier for an amount equal to the buyer's price and any applicable sales tax. At 2712, the buyer's price, the payment identifier, and the authorized amount are stored in the buyer's record of the accepted offer database 1300.

If it is determined that the seller is a retailer at 2714, the method shown in FIG. 27B is performed as will now be described. Information about an attempt to take possession of the product is received from the retailer at 2718, and the payment identifier is charged an amount based on the buyer price at 2720. At 2722, a payment of an amount based on the buyer price is provided to the retailer, and the purchasing system collects a commission fee (if any) at 2724 before the process is complete.

If it is determined that the seller is not a retailer at 2714 (as shown in FIG. 27A), the method shown in FIG. 27C is performed as will now be described. A manufacturer's subsidy amount corresponding to the product identifier (if any) is determined at 2726, and information about an attempt to take possession of the product is received from a retailer at 2728. The buyer's payment identifier is charged an amount based on the buyer price at 2730. At 2732, the purchasing system collects a subsidy amount (if any), and a payment of an amount based on the settlement price is provided to the retailer and at 2734 before the process is complete.

According to another embodiment of the present invention, instead of transmitting payments for each individual transaction, the purchasing system provides a batch payment. For example, the purchasing system may receive a bill for a batch of transactions from each given retailer periodically. This may be done, for example, through a credit card processing system.

Figure 28:
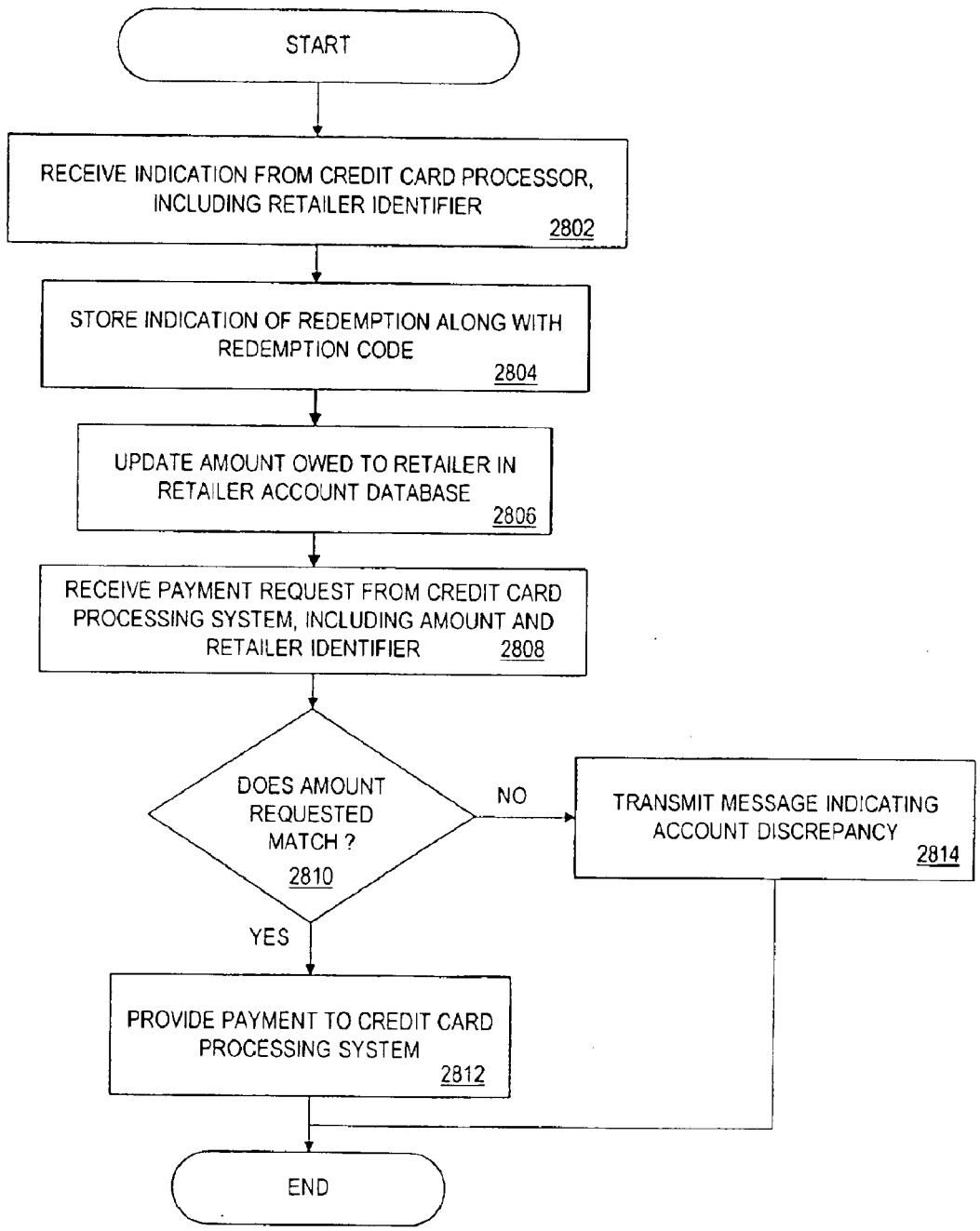
FIG. 28 is a flow chart illustrating a pseudo payment identifier batch settlement method according to an embodiment of the present invention.

FIG. 28 is a flow chart illustrating a pseudo payment identifier batch settlement method according to one embodiment of the present invention.

According to this embodiment, the purchasing system tracks the redemption of products from each retailer. Note that a bill may not be received, but instead a credit card processing system may be authorized to debit an account associated with the purchasing system as necessary. Such an arrangement may be made, in fact, between any of the parties disclosed herein (e.g., sellers, retailers). Upon receiving a periodic bill from a credit card processing system, the purchasing system verifies that the amount requested from the retailer agrees with the predicted amount indicated by redeemed records. In particular, at 2802 the purchasing system receives an indication, including a retailer identifier, from a credit card processing system that a buyer has redeemed a purchasing system voucher. An indication of redemption is stored along with the redemption code at 2804.

At 2806, the purchasing system updates the amount owed to the retailer (based on the received retailer identifier) in the retailer's record of the seller account database 1500, such as by using the settlement price for the product associated with that retailer. At 2808, a payment request is received from the credit card processing system, including a payment amount and a retailer identifier.

If the amount of the payment request matches the amount indicated in the seller account database 1500 at 2810, the appropriate amount is provided to the credit card processing system (to be provided to retailer) at 2812. If, on the other hand, the amounts do not match at 2810, a message indicating an account discrepancy is sent to the retailer or the credit card processing system at 2814.

Figure 29:
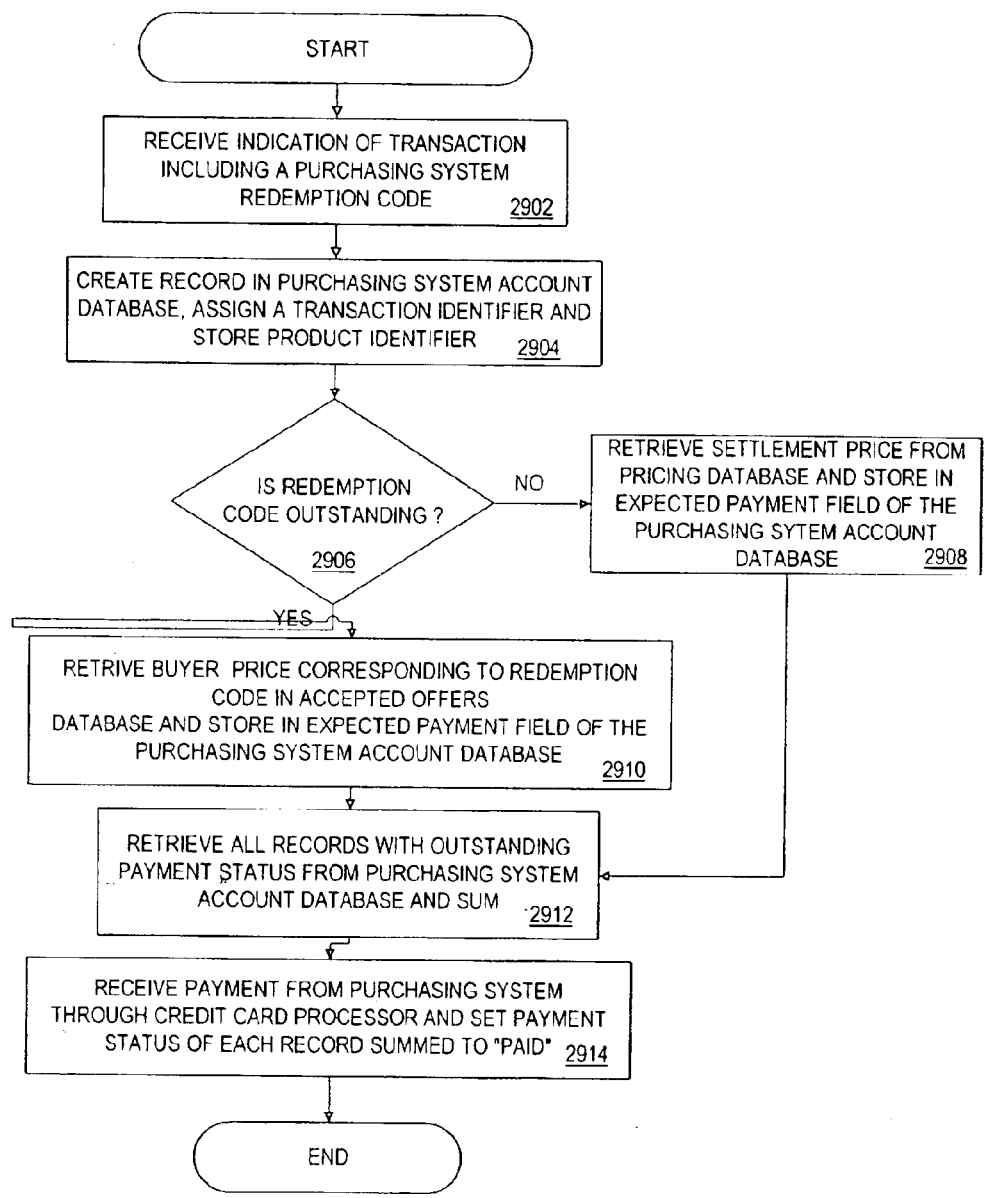
FIG. 29 is a flow chart illustrating a retailer method according to an embodiment of the present invention.

FIG. 29 is a flow chart illustrating a retailer method according to an embodiment of the present invention. The retailer receives an indication of a transaction, including a purchasing system redemption code, from a buyer at 2902 and assigns a transaction identifier. A transaction record is created in the purchasing system account database 1800, and the transaction identifier is stored along with the product identifier included in the transaction at 2904.

If the redemption code does not match an outstanding redemption code in the accepted offer database 1700 at 2906, the retailer retrieves the settlement price corresponding to the product from the pricing database 1600 and stores it in the expected payment field 1808 of the purchasing system account database 1800 at 2908. If the redemption code matches an outstanding redemption code in the accepted offer database 1700 at 2906, the retailer retrieves the buyer's price from the accepted offer database 1700 and stores it in the expected payment field 1808 of the purchasing system account database 1800 at 2910.

The retailer retrieves all records with outstanding payment status from the purchasing system account database 1800 at 2912. These amounts owed are added, and the result is included in a payment request is transmitted to the purchasing system. (e.g., through a credit card processing system). When payment is received, the appropriate payment status fields 1810 are updated at 2914.

Figure 30:
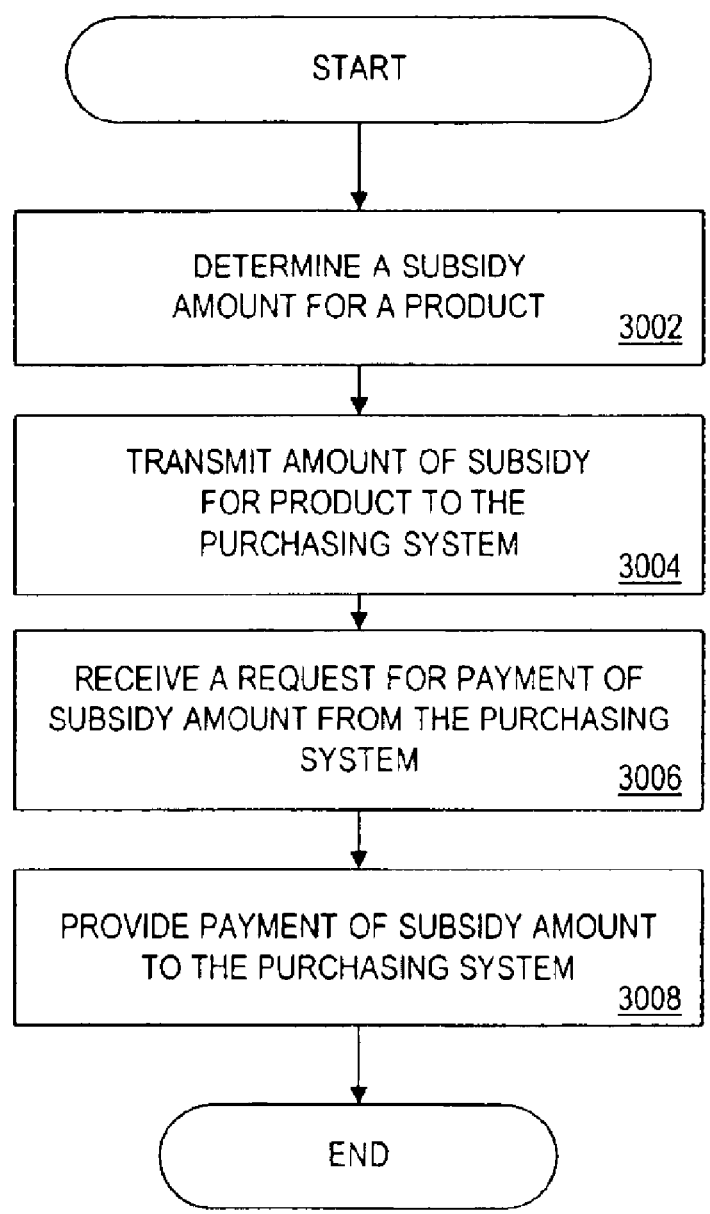
FIG. 30 is a flow chart illustrating a seller method according to an embodiment of the present invention.

FIG. 30 is a flow chart illustrating a seller method, where the seller is different from the retailer, according to an embodiment of the present invention. The seller determines a subsidy amount for a product, if any, at 3002. The subsidy amount for the product is transmitted to the purchasing system at 3004. At 3006, the seller receives a request for funds from the purchasing system and provides payment of the subsidy amount at 3008. At the time of requesting funds, the purchasing system may also transmit an indication of the offers that have been accepted using the manufacturer's products, with a detailed account of how much is owed for each accepted offer (e.g., how the amount of requested funds was determined). A manufacturer may be interested in such information to assess and predict demand for a product, or a type of product.

Note that if a manufacturer specifies a quantity of a product to be sold through the purchasing system, the manufacturer may pre-pay the subsidy amounts for the whole quantity products. For example, if the manufacturer provides the purchasing system with 100 units of a product and a $50 subsidy for each unit, the manufacturer may simply prepay the $5,000(100×$50=$5,000) to the purchasing system. If the purchasing system has not sold the 50 units within a predetermined period of time, the purchasing system may repay a portion of the prepayment, according to one embodiment of the present invention.

FIGS. 1 to 30 describe only some of possible embodiments according to the present invention. Several other embodiments will now be briefly described to illustrate various applications of the present invention. These examples are presented only to demonstrate the wide applicability of the present invention. The examples do not constitute a definition of all possible embodiments or all possible applications. Those skilled in the art will understand that there are many more applications of the present invention consistent with the present disclosure. Further, although the following examples are briefly described for clarity, those skilled in the art will understand how to make any changes, if necessary, to the above-described apparatus and methods to accommodate these and other embodiments and applications.

According to one embodiment of the present invention, a buyer may be required to pay part of, or all of, a commission fee to the purchasing system. For example, a buyer may pay $1 for each submitted offer. In another example, the buyer may pay a fixed fee or a fixed percentage of the offer price (or whichever is greater) to the purchasing system device 310 when a buyer offer is accepted.

According to another embodiment of the present invention, when a buyer offer is accepted a retailer scans the product bar code—or enters an ID number—into a "reservation" system and puts the product behind the counter at the service desk until the buyer arrives. For example, the retailer may have implemented a Telxon Wireless Retail Management System, which includes a wireless remote scanning inventory device. Thus, store personnel, upon receiving an offer for a product, may accept the offer and take the product off the shelf. The product bar code may be using, for example, a PTC 960SL Wireless Mobile Information Manager, deducting the product from inventory and reserving it in association with the buyer identifier. The buyer may present his identifier upon arrival at the retailer (e.g., the buyer's voucher identifier serves as the buyer and reservation identifier) and be given the product.

According to yet another embodiment of the present invention, instead of being charged the price of the product online at the point of a seller's acceptance of a buyer's offer, the buyer may be allowed to pay the established price directly to the retailer when he or she arrives at the retailer to take possession of the product. In such an embodiment, the buyer would "reserve" an established price online (rather than purchase the product online and take possession at a local retailer). The purchasing system device 310 would store the buyer's primary offer information in a similar manner to that described with respect to other embodiments—but would not require the buyer to guarantee payment when submitting the buyer offer. Once the buyer offer is accepted by a seller, the acceptance would be stored at the purchasing system device 310. A voucher may be printed for the buyer in the above described manner, with the addition of the offer price. When the buyer attempts to redeem the redemption code at a local retailer, the retailer: (i) retrieves the reserved price from the purchasing system device 310 or from a local database; or (ii) reads the needed information from the voucher. The retailer collects the online price from the buyer at the POS and communicates the redemption to the purchasing system device 310, either in real time or in a batch process at a later time. The retailer and the purchasing system device 310 then settle the transfer of payment as necessary.

In another embodiment of the present invention, the retailer does not open a back-channel with the purchasing system device 310 during the transaction. Instead, the information regarding the redemption of the redemption code (e.g., the product identifier, the retailers at which it is redeemable, the accepted price) is encoded onto the voucher itself. Such encoding may be in the form of, for example, a bar code.

According to another embodiment of the present invention, only retailers with current inventory (based on real time inventory checks) or who potentially have the product in stock (based on purchase orders from the manufacturer, or daily inventory notification downloads) will receive a buyer offer or be listed on a purchasing system voucher.

Another embodiment of the present invention lets the buyer select a time window and geographic region within which the buyer will take possession of the product. The purchasing system determines which stores will have the product during the specified time period based on, for example, statistical likelihood. If the buyer does not take possession of the product within the time window, the purchasing system device 310 may, for example: (i) invalidate the voucher charge the buyer a penalty; or (ii) increase the price of the product. The price may be increased, for example, by predefined increments for each day the buyer fails to take possession of the product.

According to still another embodiment of the present invention, an extra fee may be charged for "guaranteed" availability at a local store. When submitting an offer, the buyer checks off a "guaranteed availability at a particular retailer" button. Upon receiving an acceptance of the buyer's offer, the purchasing system device 310 determines which, if any, retailer currently has the product in stock and communicates with the retailer to have the product put aside for the buyer (this may be done, for example, via e-mail or facsimile). The extra fee that the buyer pays for this guaranteed availability may be disbursed (the entire or partial amount) to the retailer which puts the product aside.

It is also possible, according to another embodiment of the present invention, for the seller to ship the product to the buyer if the buyer cannot find the product in a local retailer within a predefined time period. In this case, the seller may "guarantee" the product to the buyer. If the buyer cannot find the product, a purchasing system service representatives may help track the product down. If the product cannot be found, the purchasing system device 310 notifies the manufacturer, who ships the product to the buyer at no extra charge.

According to another embodiment of the present invention, the voucher contains commands that change the retail price to the price named by the buyer. The command may be, for example, to determine an appropriate amount to subtract from the retail price such that the product costs $X. The voucher may also contain a command that prompts the POS to instruct the buyer to swipe the credit card used to bind the buyer offer. The POS then verifies that the credit card has the same number that is embedded in the voucher's bar code. If so, the price is applied to the product and the scanned credit card can be used to make the purchase. This lets the buyer's credit card act as a private key.

According to another embodiment of the present invention, the purchasing system device 310 tracks the redemption rate of vouchers at retailers. When, for example, a week has passed and the buyer has not taken possession of the product, the purchasing system generates an e-mail that lets the buyer either cancel the contract (maybe in exchange for a penalty amount) or have the product shipped. Also, after a buyer has taken possession of the product, a "thank you" message can be sent from the purchasing system (e.g., via e-mail) along with other types of offers (e.g., for additional products the buyer may be interested in purchasing).

In a similar way, a buyer may present a credit card or frequent shopper card when making a purchase at the POS, and the purchasing system device 310 may determine if a reservation exists for another product the store typically stocks. If the buyer does have a reservation, the POS can prompt the cashier to remind the buyer about the reservation.

Another embodiment of the present invention is directed to manufacturers that sell slightly altered products through different retailers, such as products with different model numbers and/or slightly different features. In this case, the voucher issued to the buyer may be valid for different types of products depending on the retailer. The identifier (e.g., make/model number) of each product may be printed directly on the voucher next to the corresponding retailer name, leaving it up to the buyer or store personnel to ensure that the buyer takes possession of the correct product.

Similarly, the voucher may contain several bar codes, one for each retailer, that contain the encoded product identifier corresponding to each retailer. According to another embodiment, a separate voucher may be issued for each retailer and, once it is determined by the purchasing system device 310 that the buyer has redeemed one voucher, the other associated voucher be voided. For example, each voucher can have the same voucher identifier or redemption code, and when the purchasing system receives a signal at a retailer indicating that a redemption code has been redeemed, it invalidates any corresponding vouchers with the same redemption code.

According to still another embodiment of the present invention, a redemption code may be redeemable for products from different sellers. For example, several sellers may have agreed to accept a buyer's offer. Instead of selecting one seller to fulfill the buyer's offer, the purchasing system device 310 may give the buyer the option of selecting any of the accepting sellers. This option may be presented to the buyer directly at the Web site, before a redemption code is issued (in which case the redemption code would be issued for whichever seller's product the buyer elects), or the redemption code may be issued for different sellers (and/or different products) and the buyer indicates his selection at the point of redemption (i.e., by selecting which retailer and/or which product).

According to another embodiment of the present invention, the purchasing system presents the buyer with a number of retailers that have the product available, and the associated price at each retailer, letting the buyer select one of the prices. For example, a buyer may be willing to pay a little more for a product if he or she can take possession of the product at a retailer located near his or her home. In another embodiment of the present invention, the purchasing system device 310 selects retailers based on distance from the buyer's home address.

According to another embodiment of the present invention, prices available to a buyer through the purchasing system device 310 vary based on the buyer (e.g., the buyer's transactional history with the purchasing system device 310) or the buyer's location (e.g., based on a telephone number area code or the buyer's home address ZIP code). For example, the settlement price may be based on the number of transactions previously completed by the buyer with the purchasing system (e.g., if the buyer previously completed no transactions the minimum selling price is $200, if the buyer previously completed one transaction the minimum price is $195, and so on). A "complete" transaction may comprise, for example: (i) submitting an offer to the purchasing system device 310; (ii) having an offer accepted by the purchasing system device 310; or (iii) redeeming a redemption code at a retailer.

If a seller specifies a certain quantity of a product available in a location to be sold through the purchasing system device 310, a certain number of redemption codes may be issued based on a statistical likelihood of redemption. That is, the number of redemption codes issued may be greater than the allocated available supply, and the redemption codes may be authorized for redemption at the retailer POS until the designated supply is depleted. If a buyer attempts to redeem a redemption code after the supply has been depleted, the purchasing system device 310 may transmit a counter-offer to the buyer at the POS or service desk of the retailer.

According to another embodiment of the present invention, instead of specifying a settlement price, a seller can specify a maximum subsidy amount that that will be provided to the purchasing system device 310 for each product sold. Thus, when determining whether to accept a buyer's offer for a given product, the purchasing system device 310 may determine: (i) the subsidy amount provided by the manufacturer for the product; and (ii) the settlement price due to a retailer for the product. If, for example, the offer plus the subsidy amount is at least equal to the settlement price, the purchasing system device 310 may accept the buyer offer. The purchasing system device 310 may also, in some cases, determine that a monetary loss up to a predetermined amount is acceptable in order to increase the volume of sales. In this case, the purchasing system device 310 would accept an buyer's offer if the buyer's price plus the manufacturer's subsidy amount was not below the predetermined acceptable loss amount (in effect, the purchasing system device 310 is further subsidizing the buyer's purchase).

According to another embodiment of the present invention, the redemption information sent from the purchasing system to the buyer is similar to a product manufacturer coupon. That is, a voucher can be recognized by a retailer to be worth, for example, the difference between the retail price for the product and the buyer price. By way of example, a buyer may arrange with the purchasing system to purchase a television for $190. The buyer brings a voucher to a retailer that normally sells the product for $200 (i.e., the retail price). In this case, the retailer may recognize that the voucher is redeemable for $10 towards the purchase of the product. If the buyer brought the voucher to another retailer at which it was redeemable, where the product was normally sold for $210, that retailer would recognize that the voucher is redeemable for $20. In other words, in such an embodiment, the actual value that the voucher is redeemable for depends on the retail price of the retailer at which the buyer takes possession of the product. The retailer may then be subsequently reimbursed the difference between the retail price and the buyer price by the purchasing system.

According to another embodiment of the present invention, instead of the purchasing system transmitting redemption information to the buyer, the redemption information is instead sent from the buyer to the purchasing system. For example, the buyer may supply his or her name, address, social security number, telephone number and/or a password to the purchasing system. In this case, the buyer can provide the redemption information to the retailer to take possession of the product.

According to another embodiment of the present invention, the purchasing system may establish a price between a buyer and seller for a product that fulfills at least one product requirement without specifying a particular product that will be provided to the buyer. For example, the purchasing system may establish that the buyer will pay $200 for a 21 inch screen television with a remote control. The product requirement may also, for example, describe a suggested retail price or average retail price associated with the product that will be provided to the buyer without specifying the particular product. Note that the price established between the buyer and the seller (e.g., the $200) may be proposed by the purchasing system, the seller or the buyer. A particular product (e.g., a particular model television available from a particular manufacturer) is then selected and provided to the buyer at the retailer. Note that either the purchasing system, the seller or the retailer may select the particular product. If the retailer is to select the particular product, a voucher identifying the product requirements may be transmitted to the buyer. If the purchasing system or seller is to select the particular product, the voucher may, if desired, identify the particular product that has been selected.

In another embodiment, rather than defining a maximum subsidy amount, the manufacturer specifies a subsidy amount that will be provided to the purchasing system regardless of the buyer's price (i.e., not a maximum subsidy amount where the manufacturer may actually end up paying less than the maximum amount if the buyer's price is high enough). In this embodiment, it is up to the purchasing system to determine whether or not to accept a given buyer offer.

For example, a manufacturer may provide the purchasing system with a $50 subsidy for each product X sold through the purchasing system. The settlement price for the product is $190. A buyer submits a price of $150 with a product description that the purchasing system determines product X meets. The purchasing system accepts the buyer's offer price and fulfills the buyer's offer with product X. Thus, the purchasing system makes a $10 profit off of the transaction (i.e., collects $150 from the buyer, collects $50 from the manufacturer, and pays $190 to the retailer).

The purchasing system may have a minimum profit amount used to determine which buyer offers to accept. Such a minimum profit amount may also be negative at times. For example, the administrator of the purchasing system may determine that a loss on transactions is acceptable for a time in order to build sales volume. Or the purchasing system may determine whether or not to accept a particular buyer's offer based on an average running profit. Thus, some offers may be accepted at a loss if there are others that result in a high enough profit that the average offer profit is positive.

According to another embodiment of the present invention, the purchasing system (and not the seller) determines a buyer price directly. In this embodiment of the settlement system, the manufacturer makes a separate agreement with at least one retailer and the purchasing system. In the agreement with the retailer, the manufacturer sets a price for which the retailer will redeem or honor a purchasing system. The retailer may agree to provide a product through the purchasing system for a price lower than the retail price for the product. The manufacturer's agreement with the purchasing system may include (i) which of the manufacturer's products (e.g. model number, color, size, etc.) the purchasing system can sell; (ii) the quantity of a particular product the purchasing system can sell; and (iii) a monetary amount that will be provided to the purchasing system by the manufacturer for each specified product sold through the purchasing system. The purchasing system collects buyer offers for products and determines at what price to the products will be sold.

According to another embodiment of the present invention, the purchasing system uses the amount provided by the manufacturer to reimburse the retailer at which the buyer takes possession of the product. The amount of money provided to the purchasing system by the manufacturer may be on a per-product basis ($50 per product) or on a bulk inventory basis (e.g., $20,000 to sell 200 products). The purchasing system may also be made aware of the value agreed upon between the manufacturer and the retailer.

According to another embodiment of the present invention, the contract the manufacturer has with the retailer may specify terms under which the retailer agrees to honor purchasing system vouchers. For example, the contract may specify products the retailer has in stock after a certain predetermined date will be made available to the purchasing system. Thus, the retailer has a predetermined amount of time to try and sell the manufacturer's products in inventory at the retail price. After that time, the manufacturer may make the products in inventory available to the purchasing system. Another term of a contract between the manufacturer and the retailer may specify a rate of sale of a particular product. If the retailer's selling rate of this product falls below a predetermined threshold, the manufacturer has the option of making a certain quantity of the products available for local pick-up sale through the purchasing system. The selling rate specified in the contract may depend on the characteristics of the product. For example, the manufacturer may require a higher selling rate for perishable products or products that have a short product life. The manufacturer does not want the retailer's shelves to be filled up with expired or obsolete products, especially if fresh or updated version are available. Thus, the manufacturer may allow the retailer time to sell the products, or to achieve a preferred sales rate, at the retailer's preferred price and profit margin. If, however, the retailer still has products in stock after a certain time, or is not selling enough of the products, the manufacturer gives the purchasing system access to a certain quantity of that product.

In another variation of the invention, the retailer may also have an agreement with the purchasing system to ensure that the purchasing system preferentially uses that retailer to fill a buyer offer. The retailer may agree to pay the purchasing system a fee, in effect helping to subsidize the customer offers, in exchange for the privilege of being targeted by the purchasing system. For example, a retailer may pay $2 for every transaction they receive through the purchasing system. Thus, if a customer makes an offer for a certain brand and model of a television set, and the purchasing system determines that several retailer are available for filling that offer, the purchasing system may select that retailer. There are, of course, other fee plans that a retailer may agree to in exchange for being targeted by the purchasing system. Some examples of fee plans between the retailer and the purchasing system include: (i) a flat monthly fee; (ii) a fixed or variable percentage of the sales total received by the retailer through the purchasing system; (iii) a percentage from each transaction; and (iv) a fixed fee for each transaction.

According to another embodiment of the present invention, the purchasing system may choose to optimize revenues or profits by setting a minimum acceptance price for any given product. In other words, the purchasing system may at times accept offers on which it suffers a monetary loss in order to promote overall traffic and revenues through the system. At other times, the purchasing system may wish to only accept offers that are profitable. For example, consider the case where a retailer has agreed with the manufacturer to honor a price of $175 for a camera and the manufacturer has agreed to give the purchasing system $50 for each camera sold. The purchasing system may use this $50 to make the retailer whole. Thus, if the purchasing system accepts an offer for the camera from a customer for $125, it has to use the $50 allotted by the manufacturer to make the retailer whole (i.e., use it to bring the total value the retailer receives for the camera up to the $175 agreed upon by the manufacturer and the retailer). Any offer above $125 will be profitable for the purchasing system, because it keeps any value left from the $50 after making the retailer whole. If the purchasing system accepts an offer for $130, only $45 is needed to make the retailer whole and a $5 profit is made from the transaction.

The purchasing system may choose to optimize profits based on individual sales or batch processes. If the profit is determined from each individual sale, only offers above $125 would be accepted in the above example. If the batch process profit model is used, the average sale price has to be above $125. So in the batch process model, some offers below $125 may be accepted in the above example if enough offers above $125 are received for the average price to result in being over $125. The purchasing system in this batch process model may constantly re-calculate the average price received thus far in determining whether to accept an incoming offer.

Although the manufacturer may negotiate a settlement price with each retailer individually for each product, the manufacturer may instead set the same settlement price for a given product with each participating retailer. Similarly, the settlement price the manufacturer sets with each participating retailer for a given product can be based on: (i) the quantity of the product typically purchased by the retailer from the manufacturer; (ii) the quantity of the product typically sold by the retailer; or (iii) the quantity of the product in stock at the manufacturer at the time the agreement is made or at the time a buyer takes possession the product from the retailer. In other words, a retailer who historically sells more of a product will be given a different settlement amount than one who sells less of the item.

According to another embodiment of the present invention, there are several settlement prices associated with each given product, each with at least one associated condition. For example, the settlement price may be based on: (i) the amount of the product in stock at the retailer at the time the buyer takes possession of the product; (ii) the number of units of the product provided to purchasing system buyers at the retailer within a predefined time period (e.g. the settlement price is $50 if the retailer provided less than 10 product units to buyers within the previous thirty days, and the settlement price is $60 if the retailer provided 10 or more product units within the previous thirty days): (iii) the time of day/year at which the buyer takes possession the product at the retailer; or (iv) the amount of time elapsed between the time the buyer established the buyer's price for the product online and the time he or she takes possession of product up at the retailer.

According to another embodiment of the present invention, the retailer is reimbursed the full retail price for any product provided to a purchasing system buyer. A manufacturer accepts a buyer named price online and provides the amount necessary to make the retailer whole. In other words, the manufacturer subsidizes the buyer's purchase. For example, a participating retailer sells television X for a retail price of $250. A buyer names a price of $200 for television X. The manufacturer of television X accepts the buyer's price and agrees to provide a $50 subsidy to the purchasing system in order to make the retailer whole. Once the buyer picks up the television at the retailer, the purchasing system transmits the $200 paid by the buyer to the retailer as well as the $50 provided by the manufacturer necessary to reimburse the retailer the full retail price for television X. Additionally, the purchasing system charges the manufacturer a $10 commission fee for processing the transaction.

According to still another embodiment, the subsidy necessary to make the retailer whole is provided by the purchasing system and there is no manufacturer involvement. Thus, the purchasing system has access to the retailer's retail prices for various products. The purchasing system evaluates a buyer named price for a product and, if t accepts the price, it provides the price plus any subsidy necessary to make the retailer whole when the buyer takes possession of the product at the retailer.

According to another embodiment of the present invention, the purchasing system authorizes a freeze for an amount of funds greater than the buyer's price plus an applicable sales tax (e.g., 5% greater). This is to provide a cushion to the purchasing system in case something unforeseen happens at the point of sale when the buyer takes possession of the product at the retailer. For example, the buyer may take possession of the product in a sales tax region that requires a greater sales tax than that applied by the purchasing system (e.g., the purchasing system determined the applicable sales tax based on the buyer's home address but the buyer actually redeemed the redemption code in a neighboring state, with a higher tax rate). The credit card processing system charges the purchasing system a fee for each authorization of a credit card account (a typical fee is 25¢ per authorization). Thus, if the purchasing system were to authorize a certain amount, but the buyer actually should be charged more than the authorized amount (e.g., due to a higher than expected sales tax) the purchasing system would need to send another authorization through the credit card processing system for the increase—and thus pay another fee. In authorizing an amount greater than what should be necessary, the purchasing system is only paying one authorization fee and is free to subsequently process a charge that is less than the authorized fee. Accordingly, in this embodiment of the present invention, the purchasing system would store the amount it authorized when the buyer's offer was accepted. Then when it received the data from the retailer regarding the final conditions of the transaction during which the redemption code was redeemed (e.g. the address of the retailer at which the redemption code was used), the purchasing system would determine the appropriate amount to charge to the buyer's account.

According to another embodiment of the present invention, rather than authorizing an extra amount, the processing system charges or authorizes the exact amount the buyer is expected to owe, and any necessary adjustments are handled at the retailer. The buyer may pay any adjustment necessary, based on the final conditions of the transaction when he or she takes possession of the product, directly to the retailer. In such a case, the retailer notifies the purchasing system, and, if the adjustment requires a reimbursement to the buyer, the retailer may provide this reimbursement to the buyer directly (e.g., out of the cash drawer). Accordingly, the purchasing system may add the reimbursement to the settlement amount it owes the retailer.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of operating a purchasing system, comprising:
    arranging through a communication network for a buyer to (i) purchase a product from a seller at a first price, and (ii) take possession of the product at a retailer that offers the product for sale at a second price, wherein the retailer is not the seller;
    receiving from the buyer a payment of an amount based on the first price; and
    arranging for the retailer to receive payment of an amount based on a settlement price in exchange for providing the product to the buyer.

2. The method of claim 1, wherein the settlement price is based on the second price.

3. The method of claim 2, wherein the settlement price is equal to the second price.

4. The method of claim 2, wherein the settlement price is a percentage of the second price.

5. The method of claim 2, wherein the settlement price is more than the second price.

6. The method of claim 2, wherein the settlement price is further based on a commission amount.

7. The method of claim 1, wherein the settlement price is not solely a function of the second price.

8. The method of claim 1, wherein the settlement price is not based on the second price.

9. The method of claim 1, wherein said receiving payment from the buyer comprises charging a financial account associated with the buyer.

10. The method of claim 9, wherein the payment is received at a tune based on when the purchasing system arranges for the buyer to purchase the product.

11. The method of claim 9, wherein the payment is received at a time based on when the buyer takes possession of the product at the retailer.

12. The method of claim 9, wherein said receiving payment comprises receiving payment of an amount based on the first price plus a penalty amount.

13. The method of claim 12, wherein the penalty amount is imposed when the buyer has not took possession of the product from the retailer within a predetermined period of time.

14. The method of claim 13, wherein the penalty amount is based on a cost associated with shipping the product to the buyer.

15. The method of claim 1, wherein said arranging for the buyer to purchase the product comprises:
    receiving a buyer offer, including a buyer-defined first price and information about the product, from the buyer; and
    determining if the buyer offer will be accepted.

16. The method of claim 15, wherein the information about the product includes at least one of: a product category; a product class; a product feature; a product manufacturer; and a product identifier.

17. The method of claim 15, wherein the buyer offer includes a payment identifier.

18. The method of claim 15, wherein said determining comprises at least one of: (i) sending information about the buyer offer to at least one seller; and (ii) locally determining if the buyer offer will be accepted.

19. The method of claim 1, wherein the first price is set by the seller.

20. The method of claim 1, wherein the first price is set by the buyer.

21. The method of claim 1, wherein the first price is set by the purchasing system.

22. The method of claim 1, wherein said arranging for the buyer to purchase the product comprises evaluating at least one of: the first price; the settlement price; a seller price; a subsidy amount; a commission amount; and a minimum acceptable price.

23. The method of claim 22, wherein said evaluation further comprises evaluating a minimum profit amount.

24. The method of claim 23, wherein said evaluation comprises comparing the minimum profit amount to the first price less the settlement price.

25. The method of claim 23, wherein said evaluation comprises comparing the minimum profit amount to the first price and the subsidy amount less the settlement price.

26. The method of claim 23, wherein the minimum profit amount is a negative amount.

27. The method of claim 22, wherein said arranging for the buyer to take possession of the product comprises selecting at least one product from a plurality of possible products.

28. The method of claim 22, wherein said arranging for the buyer to take possession of the product comprises selecting at least one retailer from a plurality of possible retailers.

29. The method of claim 22, wherein said arranging for the buyer to take possession of the product comprises selecting a plurality of retailers.

30. The method of claim 22, wherein said evaluation comprises:
    comparing the first price with a minimum acceptable price; and
    comparing the minimum profit amount to the first price and the subsidy amount less the settlement price.

31. The method of claim 22, wherein said arranging for the buyer to purchase the product is only performed if (i) first price is at least equal to the minimum acceptable price; and (ii) the minimum profit amount is at least equal to the first price and the subsidy amount less the settlement price.

32. The method of claim 1, wherein said arranging for the buyer to purchase the product comprises arranging for the seller to sell the product to the buyer at a seller price.

33. The method of claim 32, wherein said arranging for the seller to sell the product further comprises evaluating a minimum acceptable price below which a product will not be sold.

34. The method of claim 33, wherein the minimum acceptable price is set by the seller.

35. The method of claim 33, wherein the minimum acceptable price is set by the purchasing system.

36. The method of claim 32, wherein the first price is not equal to the seller price.

37. The method of claim 33, comprising exchanging payment of a seller amount with the seller, the seller amount being based on the first price and the settlement price.

38. The method of claim 1, wherein said arranging for the buyer to take possession of the product comprises sending redemption information to buyer.

39. The method of claim 1, wherein said arranging for the buyer to take possession of the product comprises:
receiving from the retailer information related to an attempt to take possession of the product; and
sending to the retailer a verification authorizing the buyer to take possession of the product.

40. The method of claim 1, wherein said arranging for the retailer to receive payment of the settlement price comprises paying the settlement price to the retailer.

41. The method of claim 40, wherein said arranging for the buyer to take possession of the product comprises selecting a plurality of retailers and the settlement price is paid to the retailer at which the buyer took possession of the product.

42. The method of claim 1, wherein said arranging for the buyer to purchase the product comprises arranging for a seller to sell the product to the buyer, and said arranging for the retailer to receive payment of the settlement price comprises arranging for the retailer to receive payment of the settlement price from the seller.

43. The method of claim 1, further comprising receiving payment of a subsidy amount from a subsidy provider.

44. The method of claim 43, wherein the subsidy provider comprises at least one of: a manufacturer of the product; a seller of the product; the retailer; and a third party subsidy provider.

45. The method of claim 43, wherein said arranging for the buyer to purchase the product comprises arranging for a product manufacturer to sell the product to the buyer at a seller price, and said receiving payment of a subsidy amount comprises adjusting a seller amount exchanged with the manufacturer.

46. The method of claim 43, wherein said arranging for the buyer to purchase the product comprises arranging for the retailer to sell the product to the buyer at a seller price, and said receiving payment of a subsidy amount comprises adjusting the settlement price paid to the retailer.

47. The method of claim 43, wherein the subsidy amount is variable and further includes a maximum subsidy amount.

48. The method of claim 43, wherein the subsidy amount is associated with a plurality of transactions performed by the purchasing system.

49. The method of claim 1, further comprising receiving payment of a commission amount from a commission provider.

50. The method of claim 49, wherein the commission provider comprises at least one of: a manufacturer of the product; a seller of the product; the retailer; and the buyer.

51. The method of claim 49, wherein the commission amount is based on at least one of: a predetermined amount; a percentage of the first price; a percentage of the settlement price; and a percentage of a seller price.

52. The method of claim 49, wherein said receiving payment of the commission amount comprises adjusting at least one of: the first price; the settlement price; and a seller amount exchanged with a seller.

53. The method of claim 1, wherein the settlement price is not equal to the second price.

54. The method of claim 1, wherein the first price is not equal to the second price.

55. The method of claim 1, wherein the first price is not equal to the settlement price.

56. The method of claim 1, further comprising subsidizing the purchase of the product.

57. The method of claim 56, wherein the purchasing system subsidizes the purchase of the product based on at least one of: subsidies provided to other buyers; past subsidies provided to the buyer; and a maximum purchasing system subsidy amount.

58. The method of claim 1, wherein the purchasing system arranges for a plurality of buyers to take possession of a plurality of products at the retailer.

59. The method of claim 58, wherein the purchasing system arranges for the retailer to receive a payment corresponding to each settlement price as each of the plurality of products is provided.

60. The method of claim 58, wherein the purchasing system arranges for the retailer to receive a payment corresponding to a plurality of settlement prices after the retailer has provided a plurality of products.

61. A method of operating a purchasing system, comprising:
receiving, from a buyer through a communication network, information about a product to be purchased from a seller at a first price;
receiving payment based on the first price from the buyer;
arranging for the buyer to take possession of the product at a retailer that offers the product for sale at a second price, wherein the retailer is not the seller;
sending to the retailer verification information enabling the retailer to authorize the buyer to take possession of the product; and
arranging for the retailer to receive payment of a settlement puce in exchange for providing the product to the buyer.

62. The method of claim 61, wherein the received information comprises a buyer offer, the first price is a buyer-defined price, and the information about the product includes at least one of: a product category; a product class; a product feature; and a payment identifier.

63. The method of claim 62, further comprising determining if the buyer offer will be accepted.

64. The method of claim 63, wherein said determining comprises at least one of:
(i) sending information about the buyer offer to at least one seller; and
(ii) locally determining if the buyer offer will be accepted.

65. The method of claim 1, wherein said arranging for a buyer to purchase a product comprises evaluating at least one of: the first price; the settlement price; a seller price; a subsidy amount; a commission amount; and a minimum acceptable price.

66. The method of claim 61, further comprising:

receiving a subsidy amount from a subsidy provider, wherein the subsidy amount is at least equal to the difference between the first price and the settlement price.

67. The method of claim 1, wherein said sending to the retailer verification information comprises:

sending redemption information to the buyer;

receiving from the retailer information related to an attempt to take possession of the product; and sending to the retailer a verification authorizing the buyer to take possession of the product.

68. The method of claim 67, wherein the redemption information and the information related to an attempt to take possession of the product comprise a redemption code.

69. The method of claim 68, wherein the redemption code is a pseudo payment identifier.

70. The method of claim 69, wherein the pseudo payment identifier is one of a pseudo: credit card number; debit card number; and banking account number.

71. The method of claim 69, wherein the pseudo payment identifier is uniquely associated with the purchase of the product by the buyer.

72. The method of claim 71, wherein said receiving from the retailer the pseudo payment identifier comprises receiving the identifier through a credit card processing system.

73. The method of claim 71, wherein the pseudo payment identifier is provided on a voucher, and the retailer sends the voucher to the purchasing system as a record of charge.

74. The method of claim 71, wherein said arranging for the buyer to take possession of the product at a retailer further comprises adjusting a spending limit associated with the pseudo payment identifier.

75. The method of claim 74, wherein said adjusting a spending limit comprises establishing a minimum spending amount and a maximum spending amount based on the settlement price.

76. The method of claim 75, wherein the information related to an attempt to take possession of the product comprises a purchase price and said sending a verification is only performed if the purchase price is more than the minimum spending amount and less than the maximum spending amount.

77. The method of claim 74, wherein said adjusting comprises adjusting the spending limit based on one of: the second price; the settlement price; and the first price.

78. The method of claim 77, wherein said adjusting is further based on one of: a penalty amount; and a tax amount.

79. The method of claim 74, wherein said adjusting is based on one of (i) an average; and (ii) the highest of a plurality of settlement prices or retail prices associated with the product.

80. The method of claim 74, wherein the spending limit is re-adjusted when the buyer takes possession of the product at the retailer.

81. The method of claim 67, wherein the information received from the retailer comprises:

a sixteen digit pseudo credit card number, including four digits associated with the purchasing system and twelve digits associated with the buyer's purchase of the product; and an expiration date.

82. The method of claim 67, wherein said receiving payment of the buyer price from the buyer is only performed after said sending of the verification to the retailer.

83. The method of claim 67, further comprising:

receiving, after the verification is sent to the retailer, payment of a subsidy amount from a subsidy provider.

84. A method of operating a purchasing system, comprising:

receiving, from a buyer through a communication network, a buyer offer, including information about a product to be purchased, a first price and a payment identifier;

determining if the buyer offer will be accepted by evaluating at least one of: the first price, a settlement price to be paid to a retailer in exchange for providing the product to the buyer, a seller price to be paid to a seller of the product, a subsidy amount to be paid by a subsidy provider, a commission amount to be paid by a commission provider, and a minimum acceptable price;

receiving from the buyer payment of the first price using the payment identifier;

sending a pseudo payment identifier to the buyer;

receiving the pseudo payment identifier from the retailer;

sending to the retailer a verification authorizing the buyer to take possession of the product; and arranging for the retailer to receive payment of the settlement price.

85. The method of claim 84, further comprising:

adjusting a spending limit associated with the pseudo payment identifier when the pseudo payment identifier is sent to the buyer; and re-adjusting the spending limit when the buyer takes possession of the product at the retailer.

86. A purchasing system device, comprising:

a processor; and a storage device coupled to said processor and storing instructions adapted to be executed by said processor to:

arrange through a communication network for a buyer to (i) purchase a product from a seller at a first price, and (ii) take possession of the product at a retailer, different from the seller, that offers the product for sale at a second price;

receive from the buyer a payment of an amount based on the first price; and arrange for the retailer to receive payment of an amount based on a settlement price in exchange for providing the product to the buyer.

87. A purchasing system apparatus, comprising:

means for arranging through a communication network for a buyer to (i) purchase a product from a seller at a first price, and (ii) take possession of the product at a retailer, different from the seller, that offers the product for sale at a second price;

means for receiving from the buyer a payment of an amount based on the first price; and means for arranging for the retailer to receive payment of an amount based on a settlement price in exchange for providing the product to the buyer.

88. A medium storing instructions adapted to be executed by a processor to perform a method for operating a purchasing system, said method comprising:

arranging through a communication network for a buyer to (i) purchase a product from a seller at a first price, and (ii) take possession of the product at a retailer, different from the seller, that offers the product for sale at a second price;

receiving from the buyer a payment of an amount based on the first price; and arranging for the retailer to receive payment of an amount based on a settlement price in exchange for providing the product to the buyer.

89. A method of using a purchasing system, comprising:

arranging with the purchasing system, through a communication network, to purchase a product from a seller at a first price;

paying an amount based on the first price to the purchasing system;

receiving redemption information from the purchasing system;

providing the redemption information to a retailer that offers the product for sale at a second price; and taking possession of the product at the retailer.

90. A method of operating a purchasing system, comprising:

arranging through a communication network for a buyer to render payment equal to a first price, through the communication network, to a seller for a product, the product being offered for sale by the seller for the first price;

arranging for the buyer to take possession of the product at a retailer that offers the product for sale at a second price; and arranging for the retailer to receive payment of a settlement price in exchange for providing the product to the buyer.

91. The method of claim 90, wherein the settlement price is the first price when the seller is the retailer.

92. The method of claim 90, further comprising:

determining if the seller is the retailer.

93. The method of claim 92, wherein the seller is a party other than the retailer and the settlement price is based on the second price.

94. The method of claim 92, wherein the seller is the retailer and the settlement price is based on the first price.

95. The method of claim 92, wherein the seller is the retailer and the settlement price is based on the second price.

96. A method of operating a purchasing system, comprising:

arranging through a communication network for a buyer to (i) purchase a product from a seller at a first price, and (ii) take possession of the product at a retail that offers the product for sale at a second price, wherein the retailer is not the seller;

arranging for the buyer to provide to the retailer a payment of an amount based on the first price; and arranging for the retailer to receive payment of an amount based on a difference between the first price and a settlement price in exchange for providing the product to the buyer.

97. A method of operating a purchasing system, comprising:

arranging through a communication network for a buyer to (i) purchase a product from a seller at a first price, and (ii) take possession of the product at a retail that offers the product for sale at a second price, wherein the retailer is not the seller;

determining if the second price is less than the first price; and if the second price is less than the first price, arranging for the buyer to purchase the product from the seller at no more than the second price.

* * * * *

UNITED STATES PATENT AND TRADEMARK OFFICE
CERTIFICATE OF CORRECTION

PATENT NO. : 7,039,603 B2
APPLICATION NO. : 09/348566
DATED : May 2, 2006
INVENTOR(S) : Walker et al.

It is certified that error appears in the above-identified patent and that said Letters Patent is hereby corrected as shown below:

In claim 10, column 43, line 66, REPLACE the word "tune" with the word --time--.

In claim 13, column 44, lines 8, REPLACE the word "took" with the word --taken--.

In claim 31, column 45, line 2, INSERT the word --the-- before the word "first".

In claim 38, column 45, line 23, INSERT the word --the-- before the word "buyer".

In claim 61, column 46, line 49, DELETE the word "puce" and REPLACE with the word --price--.

In claim 67, column 47, line 6, DELETE the number "1" and REPLACE with the number --61--.

In claim 96, column 50, line 12, DELETE the word "retail" and REPLACE with the word --retailer--.

In claim 97, column 50, line 26, DELETE the word "retail" and REPLACE with the word --retailer--.

Signed and Sealed this

Twenty-fourth Day of April, 2007

JON W. DUDAS
*Director of the United States Patent and Trademark Office*